US012772934B1

(12) United States Patent
Calmer et al.

(10) Patent No.: US 12,772,934 B1
(45) Date of Patent: Oct. 27, 2026

(54) SYSTEMS AND METHODS FOR DISRUPTING THE FLOW OF GRAIN THROUGH A CONCAVE COMBINE TO IMPROVE THE HARVEST THEREOF

(71) Applicant: CALMER HOLDING COMPANY, LLC, Lynn Center, IL (US)

(72) Inventors: Marion Calmer, Alpha, IL (US); Andrew Dahl, Lynn Center, IL (US); Jay Dahl, Alpha, IL (US); Joe Edmonson, Alpha, IL (US)

(73) Assignee: Calmer Holding Company, LLC, Lynn Center, IL (US)

( * ) Notice: Subject to any disclaimer, the term of this patent is extended or adjusted under 35 U.S.C. 154(b) by 0 days.

(21) Appl. No.: 19/191,973

(22) Filed: Apr. 28, 2025

Related U.S. Application Data

(60) Provisional application No. 63/757,186, filed on Feb. 11, 2025, provisional application No. 63/757,208, filed on Feb. 11, 2025.

(51) Int. Cl.
*A01F 12/26* (2006.01)
*A01F 7/06* (2006.01)

(52) U.S. Cl.
CPC .............. *A01F 12/26* (2013.01); *A01F 7/067* (2013.01)

(58) Field of Classification Search
CPC ........... A01F 12/26; A01F 12/28; A01F 7/067
See application file for complete search history.

(56) References Cited

U.S. PATENT DOCUMENTS 1,099,070 A * 6/1914 McConnell ............. A01F 12/28 460/109
2,159,664 A 5/1939 Lindgren
2,686,523 A 8/1954 Young
3,568,682 A 3/1971 Knapp
4,003,384 A 1/1977 Komancheck
4,004,404 A 1/1977 Rowland-Hill
4,075,823 A 2/1978 Rowland-Hill
(Continued)

FOREIGN PATENT DOCUMENTS

BR 102015006974 B1 * 12/2020

OTHER PUBLICATIONS

"Concave, Front, Small Wire", Abilene Machine, Online Product Listing, 8 pages 2023.
(Continued)

*Primary Examiner* — Alicia Torres
(74) *Attorney, Agent, or Firm* — Rooney IP, LLC

(57) ABSTRACT

A disruptor combines a MOG limiter and a cover plate. The MOG limiter is operatively attached to the MOG limiter, such as through direct or integral attachments. The MOG limiter can be a quarter wrap MOG limiter, and the MOG limiters and cover plates can be specifically configured to attach to left and right sides of the combine concave, respectively. The disruptor can further include an over-center latch. A material other than grain (MOG)-disrupting assembly comprises a plurality of the disruptors and a combine concave. The disruptor can disrupt and abrade grain by allowing the MOG limiting components of the MOG limiting inserts to protrude above a top surface of the combine concave, which causes a rippled effect. The disruptor can further employ a staircase-shaped leading edge that disrupts and abrades grain with a similar, rippled effect.

6 Claims, 50 Drawing Sheets

(56) References Cited

U.S. PATENT DOCUMENTS

| | | | | |
|---|---|---|---|---|
| 4,383,652 | A | 5/1983 | Osborne | |
| 4,711,075 | A | 12/1987 | Strong | |
| 4,711,252 | A | 12/1987 | Bernhardt | |
| 4,796,645 | A | 1/1989 | Kuchar | |
| 5,024,631 | A * | 6/1991 | Heidjann | A01F 12/26 460/109 |
| 5,489,239 | A | 2/1996 | Matousek | |
| 5,569,080 | A | 10/1996 | Estes | |
| 5,919,087 | A | 7/1999 | Strong | |
| 6,119,442 | A | 9/2000 | Hale | |
| 6,193,604 | B1 | 2/2001 | Ramp | |
| 6,358,142 | B1 | 3/2002 | Imel | |
| 6,485,364 | B1 | 11/2002 | Gryspeerdt | |
| 6,530,833 | B2 | 3/2003 | Imel | |
| 6,958,012 | B2 * | 10/2005 | Duquesne | A01F 12/28 460/109 |
| 7,001,268 | B2 | 2/2006 | Puryk et al. | |
| 7,059,961 | B2 | 6/2006 | Schenk | |
| 7,118,475 | B2 | 10/2006 | Schenk | |
| 7,166,026 | B2 | 1/2007 | Ricketts | |
| 7,285,043 | B2 | 10/2007 | Foster | |
| 7,393,274 | B2 | 7/2008 | Voss | |
| 8,133,100 | B2 | 3/2012 | Regier | |
| 8,313,361 | B2 | 11/2012 | Flickinger | |
| 8,454,416 | B1 | 6/2013 | Estes | |
| D687,659 | S * | 8/2013 | MacKenzie | D6/682.2 |
| 8,628,390 | B2 | 1/2014 | Baltz | |
| 8,690,652 | B1 | 4/2014 | Estes | |
| 8,721,411 | B2 | 5/2014 | Reiger | |
| 9,119,349 | B2 * | 9/2015 | Ricketts | A01F 12/26 |
| 9,504,204 | B2 | 11/2016 | Kile | |
| RE46,401 | E | 5/2017 | Estes | |
| 9,723,791 | B1 | 8/2017 | Kile | |
| 9,820,442 | B2 | 11/2017 | Matousek | |
| 10,045,487 | B1 * | 8/2018 | Robertson | A01F 12/185 |
| 10,405,494 | B2 | 9/2019 | Regier | |
| 10,412,895 | B2 * | 9/2019 | Theisen | A01F 12/28 |
| 10,440,893 | B2 | 10/2019 | Kile | |
| 10,602,667 | B2 | 3/2020 | Ritter | |
| 10,609,867 | B1 | 4/2020 | Kile | |
| 10,716,259 | B2 | 7/2020 | Matousek et al. | |
| 10,716,260 | B2 | 7/2020 | Robertson | |
| 10,779,474 | B2 | 9/2020 | Ritter | |
| 10,849,275 | B2 | 12/2020 | Estes | |
| 10,869,427 | B2 | 12/2020 | Robertson | |
| 10,905,050 | B2 | 2/2021 | Robertson | |
| 11,116,136 | B2 | 9/2021 | Robertson | |
| 11,122,743 | B2 | 9/2021 | Robertson | |
| 11,277,969 | B2 | 3/2022 | Van Hullebusch et al. | |
| 11,317,566 | B2 | 5/2022 | Koudela | |
| 11,470,783 | B2 | 10/2022 | Lauer | |
| 11,497,171 | B2 | 11/2022 | Theisen | |
| 11,877,538 | B1 | 1/2024 | Calmer | |
| 11,985,920 | B2 | 5/2024 | Kile | |
| 11,997,952 | B2 | 6/2024 | Robertson | |
| 2005/0197176 | A1 * | 9/2005 | Foster | A01F 12/24 460/108 |
| 2014/0171164 | A1 * | 6/2014 | Foster | A01F 12/26 460/107 |
| 2024/0147912 | A1 | 5/2024 | Kile | |

OTHER PUBLICATIONS

Concave for John Deere Combines SH236605, Shoup Parts, [retrieved on Apr. 26, 2022]. Retrieved from the Internet: <URL:vvvvvv.shoupparts.com/SH236605-Concave>, 4 pages.

John Deere, Product Catalog, www.JohnDeere.com, 128 pages, Spring 2021.

* cited by examiner

600

600

600

SYSTEMS AND METHODS FOR DISRUPTING THE FLOW OF GRAIN THROUGH A CONCAVE COMBINE TO IMPROVE THE HARVEST THEREOF

CROSS REFERENCE TO RELATED APPLICATIONS

This application claims priority under 35 U.S.C. § 119 (e) to provisional patent application U.S. Ser. No. 63/757,186, filed Feb. 11, 2025. This application additionally claims priority under 35 U.S.C. § 119 (e) to provisional patent application U.S. Ser. No. 63/757,208, filed Feb. 11, 2025. These provisional patent applications are hereby incorporated by reference in its entirety herein, including without limitation: the specification, claims, and abstract, as well as any figures, tables, appendices, or drawings thereof.

TECHNICAL FIELD

The present disclosure relates generally to an apparatus and method applicable to the harvest of agricultural crops including a variety of small grain crops. A persistent problem presented to farmers in the threshing operation is the separation of the grain from the plant's stems, leaves, weeds, volunteer plants, and other trash or foreign materials, all of which is referred to as material(s) other than grain (MOG), which are all introduced to the combine in the harvest operation. Critical to maximizing the capture of the grain in harvest and the return obtained by the farmer is the robust, yet efficient separation of the grain from MOG. In particular, but not exclusively, the present disclosure relates to the selective use of threshing devices, MOG limiting devices, and disruptors that improve the function of a concave positioned within the combine.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

With the introduction of the rotor combine, farmers have enjoyed the benefit of more robust and efficient harvests. The combine provides threshing action with movement and pressure supplied by the circulating rotor. This moves the harvested material around and back in the rotor or threshing chamber of the combine. Keeping this chamber relatively full operates to utilize the ears, pods, heads, panicles, or other seed producing areas of the harvested plant, to act as abrading surfaces for each other thereby benefiting from the constant rubbing action as the harvested material moves in the chamber. The mechanics of this abrasive action are generally understood to produce a forceful rubbing so as to frictionally separate the seeds—i.e., the grain from the material other than grain (MOG).

The concaves followed by the separator grates provide the openings within the chamber to remove the threshed grain. Concaves may be removed and reinstalled within the combine, but this is an arduous and time-consuming task. As a result, historically, in the use of concaves, one size fits all whether large grain or small grain harvest. This compromise resulted in grain being unduly retained within the rotor chamber and being ground to fines or discharged out the rear of the combine with the MOG, or MOG departing the chamber with the threshed grain. When MOG passes through with the grain, this impacts the effectiveness of the sieves and can also contribute to grain being discharged out the back of the combine.

Various efforts to change the geometry of the concaves improved efficiency in some instances. Cover plates were also used to hold the harvested material within the chamber for a greater period of time to increase the threshing and attempt to obtain better separation of the MOG from the grain—again improving efficiency in some instances.

Applicant has engaged in agronomic studies in an effort to improve the consistency and efficiency of the threshing operations within the chamber of the combine. These analyses have included expedited removal of the threshed grain from the chamber or retaining the harvested materials within the chamber, the differentiation dependent in some instances upon the grains, crop conditions, and OEM combines involved in the studies.

Applicant has determined that improved grain threshing efficiency may be achieved by using a modified cover plate in combination with the concave to more aggressively thresh the grain. With use of disruptors from the present disclosure, it was found that such increased threshing operation was particularly effective and was made more so when the altered plate/concave configuration was positioned at the beginning of the process, thus using slot #1 for the concaves.

One embodiment of this invention uses an elevated insert bar positioned on the cover plate so as to insert within the gap of the crossbars. Use of the cover plate assembly retains the harvested material within the chamber. With the cover plate attached, the elevated insert bars extend above the top of the crossbars and provide substantial additional surface area to interact with the harvested material to open up pods and otherwise separate the grain from the plant. A further embodiment can position this elevated insert bar to present the leading edge of the threshing action when the harvested material encounters the concave. Yet another embodiment of the invention is the ability to independently cover some or all of the concave so as to adjust the overall aggressive threshing activity to maximize the grain separation from the harvested plants and thereafter quickly remove the grain from the rotor chamber. This later operation of removal of the grain from the chamber may be facilitated with MOG Limiters which allow for the grain to exit while retaining the MOG in the chamber.

Thus, there exists a need in the art for novel systems and methods for disrupting the flow of grain through a concave combine to improve the harvest thereof.

SUMMARY

The following objects, features, advantages, aspects, and/or embodiments are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

The disruptors, MOG limiters, and cover plates disclosed herein can be used in a wide variety of applications.

It is preferred the disruptors, MOG limiters, and cover plates be safe, cost effective, and durable. For example, the disruptors, MOG limiters, and cover plates can be adapted to resist excessive heat, static buildup, corrosion, and/or mechanical failures (e.g. cracking, crumbling, shearing, creeping) due to excessive impacts and/or prolonged exposure to tensile and/or compressive forces acting on the apparatus.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the disruptors, MOG limiters, and cover plates Methods can be practiced which facilitate use, manufacture, assembly, maintenance, and repair of the disruptors, MOG limiters, and cover plates which accomplish some or all of the previously stated objectives.

The disruptors, MOG limiters, and cover plates can be incorporated into systems or kits which accomplish some or all of the previously stated objectives.

It is a further object, feature, and/or advantage of the present disclosure to independently utilize each of the series of MOG limiter, cover plates, and disruptors, also described herein as inserts. In one embodiment the insert may be approximately one-quarter of the circumference of the rotor or approximate 50% of the length of the concave openings, and such insert may be referred to as a Quarter Wrap insert. In another embodiment, the insert may be of a length to cover all or nearly all of the openings on one or both sides of the concave which limiter may be referred to as a Half Wrap insert.

It is still yet a further object, feature, and/or advantage of the present disclosure to improve upon the efficiency of the harvest of soybeans or other small grains where concave cover plates have heretofore been used.

It is still yet a further object, feature, and/or advantage of the present disclosure to install a one or more of the inserts which may be placed on either side of the concave or on both sides of the concave. In total, at least four independently actuatable Quarter Wrap inserts may be installed on each concave. In one embodiment a first plurality of inserts are arranged in series and attach to the right side of the concave and arranged in series; and a second plurality of inserts are arranged in series and are attached to a left side of the concave and arranged in series. In one embodiment a first plurality/series of inserts and a second plurality/series of inserts are arranged in parallel. The inserts can approximate one-half of the curvilinear length of a concave referred to herein as Quarter Wrap inserts or inserts, however it is to be appreciated that embodiments exists where the inserts can approximate one third, one quarter, one fifth, etc. of the curvilinear length of the concave, thereby bringing the total number of independently actuatable MOG limiting devices employed on a single concave to six, eight, ten, etc. In various embodiments, each insert operates to regulate and distribute the flow of MOG in all rotary combines, single or dual rotor designs, passing through the combine in both the rotor chamber and cleaning system.

A first embodiment of a modified concave includes an enhanced side flow rail, a C-clamp end, a first-end round bar drive, a second end plate, a quarter wrap center catch, an enhanced flow center rail, 0.625 inch diameter round bars, a left over-center catch, and a right over-center catch.

A second embodiment of a modified concave includes an enhanced side flow rail, a C-clamp end, a first-end round bar drive, a second end plate, a quarter wrap center catch, an enhanced flow center rail, 0.375 inch rub bars with 0.125 inch prouds, 0.625 inch diameter round bars, a left over-center catch, and a right over-center catch.

A third embodiment of a modified concave includes an enhanced side flow rail, a C-clamp end, a first-end round bar drive, a second end plate, a quarter wrap center catch, an enhanced flow center rail, 0.25 inch flat rub bars, 0.625 inch diameter round bars, a left over-center catch, and a right over-center catch.

A fourth embodiment of a modified concave includes an enhanced side flow rail, a C-clamp end, a first-end round bar drive, a second end plate, a quarter wrap center catch, an enhanced flow center rail, 0.375 inch flat rub bars, 0.625 inch diameter round bars, a left over-center catch, and a right over-center catch.

It is still yet a further object, feature, and/or advantage of the present disclosure to provide a hinged connection in the middle of the concave to grab on to each of the first plurality of inserts and the second plurality of inserts. The hinged connection can be a hook.

It is still yet a further object, feature, and/or advantage of the present disclosure to be able to install one or more inserts which allows for controlled and adjustable restrictions of the concave gaps. When secured in place, the insert aligns the inserts against one side of the round bars of the concave or may position the inserts somewhere within the gap between the round bars to provide more restricted openings to more beneficially impact the capture of grain and the rejection of MOG.

It is still yet a further object, feature, and/or advantage of the present disclosure to widen the air gap between round bars to provide better solutions for harvest of corn, while simultaneously being able to narrow air gaps for harvest of soybeans. For example, ¼ wrap inserts can be quickly installed and/or interchanged to provide an application specific approach for the harvest of corn or soybeans.

It is still yet a further object, feature, and/or advantage of the present disclosure to uniformly distribute grain and MOG in the threshing and separation chambers of the combine. For example, the inserts described herein can balance an amount of MOG from a rotor area of the combine to a sieve area (also referred to as the cleaning system) of the combine and allow balance of grain throughput from the rotor area to the sieve area with respect to the left side of the concave to the right side of the concave.

It is still yet a further object, feature, and/or advantage of the present disclosure to thresh most of the grain so that it falls out as quickly as possible so that it goes into the auger bed, which is beneath the rotor. Then, it is desirable to separate and to drop the last grain onto the auger bed before the grain exits the rotor and goes onto the ground as rotor loss. The last of the grain should ideally drop out at the last separating grate.

It is still yet a further object, feature, and/or advantage of the present disclosure to maintain the use of the OEM sieves, which are non-adjustable sieves (large and heavy components).

It is still yet a further object, feature, and/or advantage of the present disclosure to place a highest importance on the choice of combines, inserts, and cover plates for the concaves that are in positions #1-#3.

It is still yet a further object, feature, and/or advantage of the present disclosure to improve harvest of grain such that there is 40% less grain loss (~1 kernel/sq ft; 2 soybeans per square foot); an increase in ground speed; less damaged grain; and/or less frustration to the operator of the combine.

It is still yet a further object, feature, and/or advantage of the present disclosure to adjust or achieve a proper balance in the expedited separation of grain into the processing and cleaning system of the combine while retaining MOG within the rotary chamber to be passed out the back, which balance may allow for the removal of bottom sieve in the cleaning system which often operates to disrupt air flow blowing chaff out of the combine and away from the pathway moving grain up to the storage bin.

The present disclosure addresses difficulties presented by the moisture level of the grain being harvested. For example, with corn the use of inserts operates to improve the concave flow-through of small kernel corn in low moisture conditions while preventing the passage of MOG into the cleaning system. In general, as grain moisture in the harvested crop decreases, the usefulness of inserts increases.

The present disclosure addresses difficulties in harvesting small grains including small kernel corn after installing the concaves. For example, it may be necessary to level the rotor after installing the concaves described herein, else the threshing efficiency of the concaves can be diminished. In yet another example, one or more additional inserts can be added and/or removed at various positions in the threshing and separation chambers (e.g. positions #1-#7) when harvesting tougher crops so as to more fully remove and/or reduce white caps in the sample. In yet another example, the rear separation grates can be rotatably moved into an "up" position, wherein spacers are removed and stored in a closed post.

Disruptors can be used to improve the threshing capability of the rasp bar threshing cylinder while simultaneously capturing additional threshed grain.

The selective use of inserts, including the selective use of same within a single concave, can help balance the flow of MOG and grain through the combine such that it is more equally distributed when passing through various chambers of said combine. This can allow for the better and more efficient harvest a wider variety of crop types without needing to spend large amounts of time installing and uninstalling non-adjustable cover plates, inserts, and the like that at present plague the art.

The cover plate and/or disruptor can include an elongated plate body, such as a curvilinear plate, dimensioned to be positioned between two parallel arcuate rails of a threshing concave grate assembly. The curvilinear plate preferably does not span the entire length of said arcuate rails. The curvilinear plate of the cover plate assembly is preferably constructed of a single plate of high strength material such as metal, high strength plastics or composite fabric material. For example, the curvilinear plate can be constructed of steel plating that is permanently bent in an arcuate shape matching the exterior arcuate shape of a threshing concave grate assembly. The curvilinear plate can also be constructed of flexible, high strength materials such as stainless steel or woven composite materials, or alternatively, the cast into a predetermined arcuate shape. It is to be appreciated the material that the elongated body is constructed of may also have a natural porosity and permeability. For example, the elongated body of the cover plate and/or disruptor may be constructed of a metal mesh or composite material having organic porosity and permeability characteristics. This can help regulate moisture release from the cover plates should they become wet.

The present disclosure addresses difficulties presented while harvesting in-field. For example, the clearance between the rotor and concaves can be increased and/or decreased during operation of the combine. In yet another example, the operator may increase and/or decrease the rotational speed of the rotor. In yet another example, the operator may alter a velocity of fan speeds. In yet another example, the operator may adjust a distance between the chaffer, sieve(s), concave(s), grate(s), and/or components thereof (e.g., calibrating a position of the louvers that are included in the bottom sieve), etc.

Crops such as rice, wheat, and barley comprise three main parts: the grain—the seeds located at the top; the chaff—the seeds' dry coatings; and the stalk—the overall stem of the plant. Not all three parts are edible. Only the grain can be collected for use in bread and cereal production, which is edible. The other two-chaff and stalk—have to be removed. Threshing refers to the task of separating grain from its attached crop. This grain preparation task comes after the reaping process. Winnowing takes place right after threshing. The process of winnowing frees the grain from the chaff.

The present disclosure addresses difficulties in efficiently threshing grain and those presented by dirty samples. For example, unthreshed grain can be placed in a return of the combine for re-threshing. In some embodiments, the return runs at least at 50% full for proper re-threshing. Where a dirty sample is concerned, a power shut down may be required so that any grain and chaff in the auger bed and/or top chaffer can be dislodged, and the combine can return to more evenly distribute material across the top chaffer and/or bottom sieve.

The inserts disclosed herein can be used in a wide variety of applications for the harvest of a number of crops including, but not limited to soybeans, wheat, oats, rye, barley, sorghum, flax, sunflowers and canola, alfalfa, clover, and also low yielding corn.

It is preferred the threshing systems, accessories, and configurations disclosed herein be safe, cost effective, and durable. For example, the ease of installation and removal allows the farmer to only install and utilize the inserts and cover plates when needed for the specific grain being combined thereby reducing wear. Further, the radial geometry and profile of the inserts and cover plates, and the composition of the steel from which they are constructed, allow for extended use over the years while resisting excessive abrasive wear and/or mechanical failures (e.g. cracking, crumbling, shearing, creeping) due to excessive impacts and/or prolonged exposure to tensile and/or compressive forces which may act upon the inserts and cover plates when positioned within the rotor chamber of an operational combine.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the combine.

Methods can be practiced which facilitate use, manufacture, assembly, maintenance, and repair of inserts and cover plates which accomplish some or all of the previously stated objectives.

The inserts can be incorporated independently into the harvest system of a combine, single rotor or dual rotor, or may be included in kits which provide additional components to accomplish some or all of the previously stated objectives. For example, kits that upgrade existing concaves or upgrade existing combines with concaves are disclosed herein. The kits can include pairs of inserts that are intended to span half of the length of the concave and half of the width of the concave, and further, pairs of quarter-wrap cover plates. These kits can be installed on said concaves and/or combines depending on the crop to be harvested or the conditions in which harvest occurs. The components in the kit are easily interchanged. The kits can include various numbers of pairs of inserts and cover plates, depending on the climate in which the kit is expected to be used.

In some combines, it may be advantageous to use a full-length insert plate which covers one-half of the concave. One instance involves a combine structure wherein the shortened insert does not work due to connection problems resulting from lack of access from one side of the rotor chamber.

The adjustable use of the present disclosure provides the user the ability to more precisely balance the MOG retention within the rotor chamber and the release of grain from the rotor chamber and, also, to balance the distribution of material released from the rotor chamber onto the sieve for more efficient cleaning of the grain and increased retention of the grain during the harvest process. In areas where a smaller grain such as soybeans is harvested, immediately followed by the harvest of a large grain such as corn, the ability to adjust or easily remove inserts is important to facilitation of a seamless harvest which allows for optimum use of good weather days. It is also desirable to be able to adjust the size of the gaps and/or openings in the concave without needing to remove the inserts, to better accommodate a wider range and/or varying in field conditions (e.g., changing moisture conditions).

In some embodiments of some aspects of the present disclosure there includes a disruptor for a concave in a combine harvester, including rails that are parallel to one another and curvilinear in shape such that the rails have a complementary geometry to a shape of the concave. The disruptor further includes a back plate attached atop the rails comprising a continuous material extending between the rails. The disrupter additionally includes ridges positioned on the back plate extending away from the back plate in a direction opposite the rails, wherein the ridges span a width of the back plate and are spaced equally apart from one another along a length of the back plate.

According to additional aspects of the embodiment, hinge points at distal ends of the rails and extended mounting portions at a side of the rails opposite the hinge points.

According to additional aspects of the embodiment, each of the extended mounting portions transition to a flat surface, wherein the disruptor further comprises an over-center latch assembly attached to the flat surface of each of the extended mounting portions.

According to additional aspects of the embodiment, the ridges are parallelepiped and extend substantially orthogonally away from the back plate.

According to additional aspects of the embodiment, the ridges comprise a rectangular cross section.

According to additional aspects of the embodiment, ridge extensions extending from a top of the ridges.

According to additional aspects of the embodiment, back plate ramps at distal ends of the back plate angle in a same direction that the ridges extend.

According to additional aspects of the embodiment, ridge stabilizers extending from the back plate to the ridges, wherein each ridge includes two ridge stabilizers on a first side of each of the ridges.

According to additional aspects of the embodiment, the ridge stabilizers are wider at a base of the ridge stabilizers than at distal ends thereof.

According to additional aspects of the embodiment, rub bar contacts positioned on the back plate and adjacent at least one ridge on a second side of the at least one ridge and shaped as a concave configured to interface with rub bars on the concave.

According to additional aspects of the embodiment, cross supports beneath the back plate and extending between the rails for structural support between the back plate and the rails.

According to additional aspects of the embodiment, a concave assembly comprising a plurality of the disruptors and further comprising the concave.

According to additional aspects of the embodiment, the plurality of disruptors comprise a left disruptor configured to attach to the left-side of the combine concave and a right disruptor configured to attach to the right-side of the combine concave.

According to additional aspects of the embodiment, the ridges are configured to be inserted in between rub bars of the concave when attached to the concave such that the ridges extend past the rub bars.

According to additional aspects of the embodiment, the concave comprises a cross frame and hooks at distal ends of the concave for attaching to the plurality of disruptors.

According to additional aspects of the embodiment, the rub bars abut the ridges forming a stair-like relationship between the rub bars and ridges.

According to additional aspects of the embodiment, a MOG limiter.

According to additional aspects of the embodiment, a cover plate.

According to other embodiments of additional aspects of the present disclosure, a disruptor including a back plate comprising a curvilinear shape complementary to a shape of a concave of a combine harvester, rails extending upwardly from lateral ends of the back plate, ridges traversing a gap between the rails and extending upwardly from the rails, and ridge extensions comprising staircase-shaped leading edges atop the ridges.

According to other embodiments of additional aspects of the present disclosure, a kit for a combine harvester, comprising: a concave comprising an upper concave connector, a lower concave connector, a first side frame, a second side frame, and rub bars equally spaced throughout the concave extending from the first side frame to the second side frame and bounded by each of the upper concave connector, the lower concave connector, the first side frame, and the second side frame; wherein the concave further comprises a center frame extending from the upper concave connector to the lower concave connector in between the first side frame and the second side frame; a disruptor comprising: rails attached to a back plate comprising a curvilinear shape configured to be fitted to the concave, wherein a width of the back plate extends from the first side frame to the center frame; ridges attached to the back plate and extending upwardly from the back plate each comprising a rectangular cross-section and configured to extend upwardly through the rub bars of the concave; and a MOG limiter comprising: rails comprising a curvilinear shape configured to be fitted to the concave; and cross bars extending between the rails, each parallel to one another and configured to extend upwardly through the rub bars of the concave.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

The subject matter of the present disclosure relates to the subject matter of co-owned, co-pending U.S. Pre-grant Pub. No. US 2024/0172595 A1; co-owned and co-pending patent application Ser. No. 19/012,144 filed Jan. 7, 2025; co-owned and co-pending U.S. patent application Ser. No. 19/012,532 filed Jan. 7, 2025; co-owned, U.S. Pat. No. 12,225,855 B2, issued Feb. 18, 2025; U.S. Design Pat. No. D1,058,613, issued Jan. 1, 2025; and co-owned, co-pending Int'l Hague application Ser. No. 35/003,389, filed Feb. 11, 2025. Each of the aforementioned applications for patents and/or industrials designs are hereby incorporated by reference in their entireties herein, including without limitation: the specifications, drawings, tables, and appendices thereof.

Figure 1:
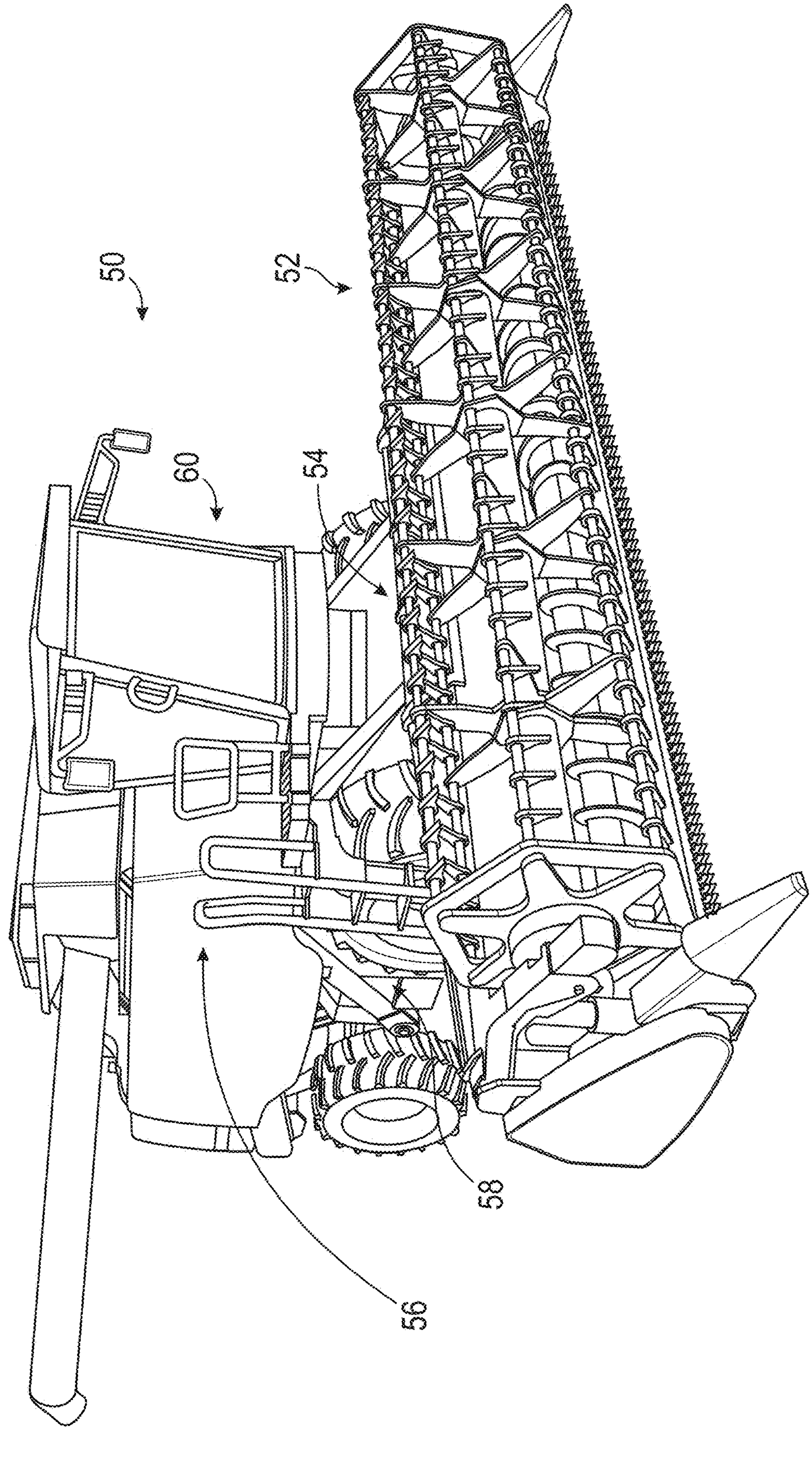
FIG. 1 (Prior Art)
FIG. 1 shows a perspective view of a prior art example of a combine in which embodiments of the present disclosure may be used.

FIG. 1 shows a typical combine harvester 50 which can utilize the embodiments described herein. The combine harvester 50 typically includes a header 52 to interact with crops, a conveyer 54 to take the crops that have been cut by the header 52 into the combine 50, a threshing chamber 56 to receive the cut crops from the conveyer, the threshing chamber 56 containing a rotor surrounded by a cage of concaves to separate grain from the crop, a cleaning system 58 located below the threshing chamber to catch separated grain and any MOG (material other than grain) on sieves which filter grain through the sieves and release MOG out a back of the combine, and a cab 60 for a user to sit in and operate the combine. As will be described herein, systems, kits, and devices of the present disclosure relate to components within the threshing chamber 56 to improve the combine harvester's 50 performance.

Rotor combines utilize an internal chamber wherein the harvested plant material including the grain is passed from the head of the combine into the threshing chamber or rotor chamber. This rotor chamber processes the material by a threshing operation and a concurrent separation operation. A series of curved apparatus are positioned at the bottom of the rotor chamber whereat grain is allowed to drop out of the chamber 56 into the cleaning system which operates to clean the grain then convey and store the grain in the grain bin or tank in the combine. As an example of this set up, the John Deere single rotary combines have seven curved apparatus running from the front of the chamber rearwardly and positioned side-by-side in positions #1-#7. Positions #1-#3 (positioned closest to the header, see, e.g., FIG. 2) are customarily referred to as the threshing section and are occupied by threshing concaves, and positions #4-#7 (positioned further away from the header along the cage surrounding the rotor) are customarily referred to as the separation section and are occupied by separation grates.

The symptoms indicative of inefficiency in the harvest of small grains such as soybeans include the presence of unthreshed pods in the grain tank or bin of the combine, excessive return tailings, MOG in the grain tank, split beans, and/or sieve loss. A primary contributor to these symptoms involves the combine which historically has utilized a single concave design in the threshing of multiple grains, larger and smaller in size.

The combine concaves are a key part of a combine harvester, with two vital roles in the harvesting process: freeing seeds from plants (threshing), and moving them away from the chaff (winnowing). The quality of the harvested crop depends significantly on the quality and configuration of combine concaves in use which form the cage surrounding the rotor within the threshing chamber.

Figure 2:
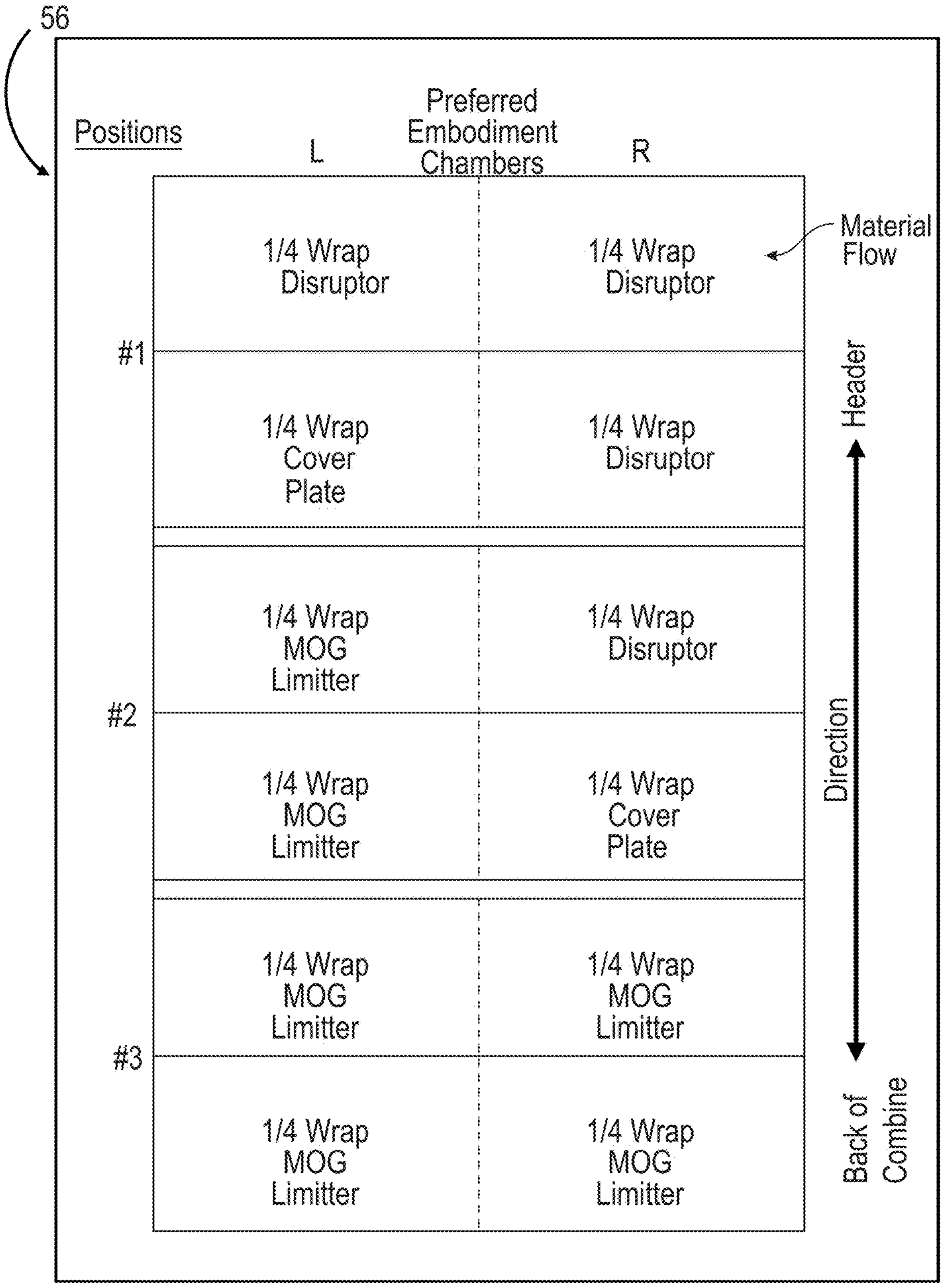
FIG. 2 shows a schematic view of concaves within a threshing chamber of the combine of FIG. 1 that employs an example configuration of a plurality of distinct combinations of concaves with disruptors, MOG limiters, and/or cover plates for distinct concave position(s) according to aspects of the present disclosure.

FIG. 2 shows a schematic view of looking downward at concaves lined up within the threshing chamber 56. As explained above, the concaves can be placed for example in positions #1-#7, in which positions #1-#3 are shown. For orientation purposes, a directional continuum arrow generally presents how the concaves would be placed within a combine (such as the combine 50 shown in FIG. 1) the continuum beginning with the header 52 and ending with a back of the combine. As shown, moving in a direction of lower concave positions indicates moving closer to a header of the combine (e.g., moving from position #2 to position #1), whereas moving in a direction of higher concave positions (e.g., positions #2 to position #3, or position #6 to position #7 not shown) indicates moving closer to a back of the combine.

The concaves shown in FIG. 2 do not completely surround the rotor within the threshing chamber 56. Rather, the concaves shown take up a bottom portion of surrounding the rotor wherein a single concave can comprise anywhere from a ¼ to ½ of a circumference of the rotor. The concaves shown in FIG. 2 take up approximately ½ of the circumference of the rotor within the threshing chamber, wherein a left column L represents ¼ of the circumference of the rotor (and half of the concave) on a left side of the combine harvester 50, and a right column R represents ¼ of the circumference of the rotor (and the other half of the concave) on a right side of the combine harvester 50. Each concave within the rotor includes two left column L inserts and two right column R inserts.

As will be described herein, multiple inserts can take place within each concave. As shown in FIG. 2, these inserts can comprise one of a disruptor, a cover plate, or a MOG limiter. As shown, the position #1 concave includes three disruptors and one cover plate, wherein the flow of materials (counterclockwise if viewing the combine harvester 50 from a front of the combine harvester 50) travels from the right side of the concave to the left side of the concave (direction of material flow). Thus, with two disruptors on the right side, grain and MOG will interface first with the disruptors and then as the grain and MOG continues to rotate around the rotor the grain and MOG will pass over the cover plate and disruptor on the left side. The grain and MOG will continue to rotate around in this manner while also being moved towards the back of the combine. As such, after grain and MOG rotates around and interfaces with the concave in position #1, the grain and MOG will then continue to rotate and then interface with the concave in position #2, and then the concave in position #3, and so on.

In some embodiments, it should be appreciated that the concave can be divided into six, eight, or ten equal sections instead of the four quarter sections that are shown throughout FIGS. 14-21.

FIGS. 3-7 show a concave 100. The concave 100 includes an upper concave connecter 102 on a first side 103, a lower concave connector 104 on a second side 105, a first side frame 106, a second side frame 108, a center frame 110, rub bars 112, a cross frame 114, cross frame apertures 116, hooks 118, and alignment apertures 120.

The upper concave connector 102 is separated from the lower concave connector 104 by the first side frame 106, the second side frame 108, and the center frame 110. Each of the first side frame 106, the second side frame 108, and the center frame 110 are attached to the upper concave connector 102 on the first side 103 and the lower concave connector 104 on the second side 105. The upper concave connector 102 comprises two flat surfaces that extend from the first side frame 106 to the second side frame 108. The lower concave connector 104 comprises a U-shaped bracket shape extending from the first side frame 106 to the second side frame 108. Each of the first side frame 106, the second side frame 108, and the center frame 110 comprise a curvilinear shape, namely, an arc with a continuous curve (non-jointed) intended to partially surround a rotating rotor without being strictly confined to a constant radius (it can include straight portions therein). The upper concave connector 102, the first side frame 106, the lower concave connector 104, and the second side frame 108 comprise a boundary for the concave 100, and the center frame 110 is additional support extending from the upper concave connector 102 and the lower concave connector 104 centered between the first side frame 106 and the second side frame 108.

The concave 100 further comprises rub bars 112 extending from the first side frame 106 to the second side frame 108. The rub bars 112 can be cylindrical in shape. Each of the rub bars 112 are parallel to one another and are parallel to the upper concave connector 102 and the lower concave connector 104. When viewed from a side or at a profile view which can best be seen in FIG. 5, the rub bars 112 can emerge ever so slightly inwardly (or over) each of the first side frame 106, the second side frame 108, and the center frame 110 to cause MOG and grain (when being spread over a surface of the concave) to interface with the rub bars 112 in a jostled motion rather than smoothly gliding over any of the first side frame 106, the second side frame 108, or the center frame 110.

At a position along a length of the first side frame 106, the second side frame 108, and the center frame 110 in between the upper concave connector 102 and the lower concave connector 104, the cross frame 114 extends from the first side frame 106 to the second side frame 108. The cross frame 114 can comprise two cross frames, a first cross frame and a second cross frame, in which the first cross frame extends from the first side frame 106 to the center frame 110 and the second cross frame extends from the center frame 110 to the second side frame 108. The cross frame 114 includes cross frame apertures 116 therethrough. As seen in the figures, eight cross frame apertures 116 are shown (or four cross frame apertures 116 per each of the first cross frame and the second cross frame).

At each of end of the concave 100 are the hooks 118. The hooks 118 each extend outwardly from the concave 100 from the upper concave connector 102 and from the lower concave connector 104. There is one hook per every fourth of the concave 100 to assist with holding one of a MOG limiter, a disruptor, or a cover plate against an exterior surface of the concave 100, as discussed in conjunction with FIG. 2 which shows various examples of these inserts taking up quarter portions of any given concave. These hooks 118 in combination with the cross frame apertures 116 secure inserts to the concave 100. The hooks 118 are designed to be placed juxtaposed the cross frame apertures 116 such that any given insert will have a single hook 118 at one end of the insert and a pair of cross frame apertures 116 at a second end of the insert. As such, the hooks 118 are placed on each end of the concave 100 (the upper concave connector 102 and the lower concave connector 104) and the cross frame apertures 116 are placed at a center of the concave 100 to face each end of the concave 100. The alignment apertures 120 can further aid in securing inserts to the concave 100 and are positioned on the center frame 110 of the concave.

Figure 3:
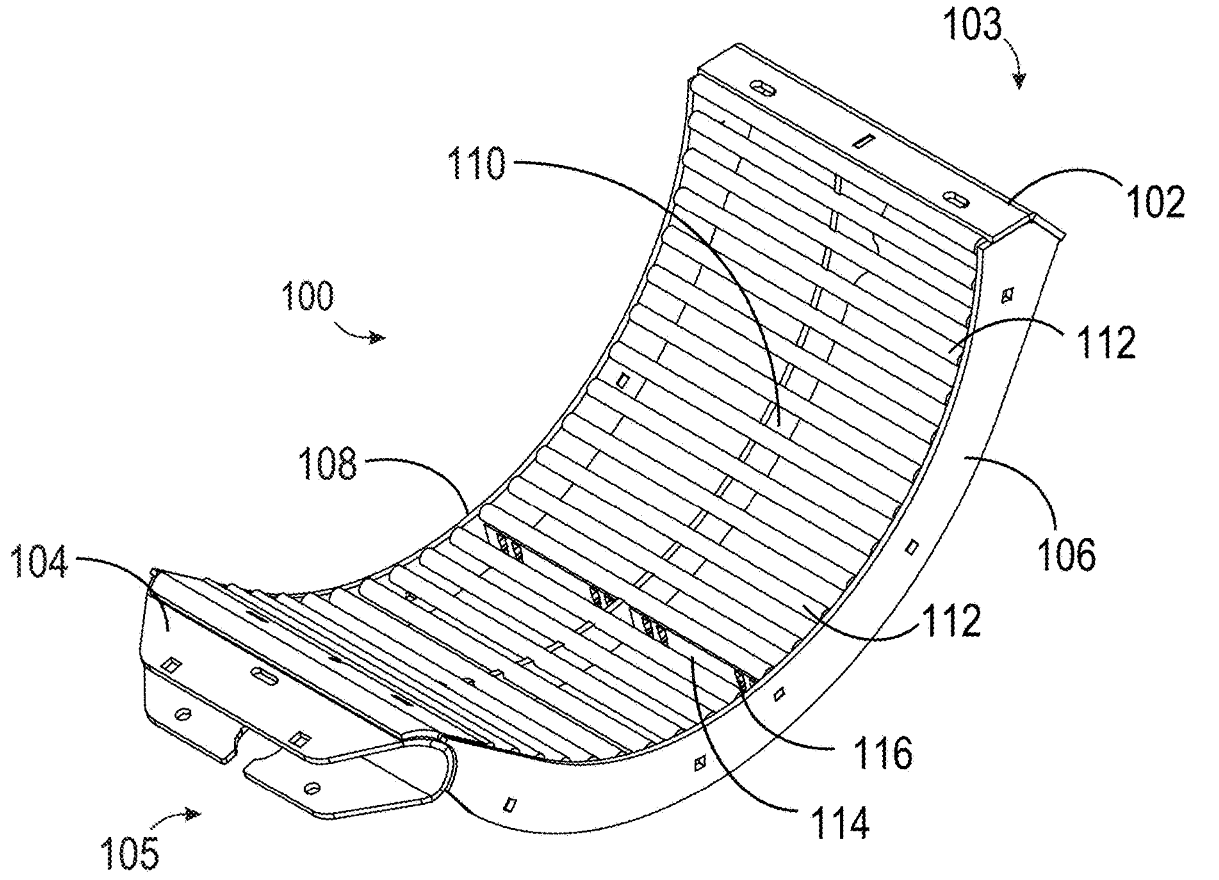
FIG. 3 shows a first perspective view of a first combine concave.
Figure 4:
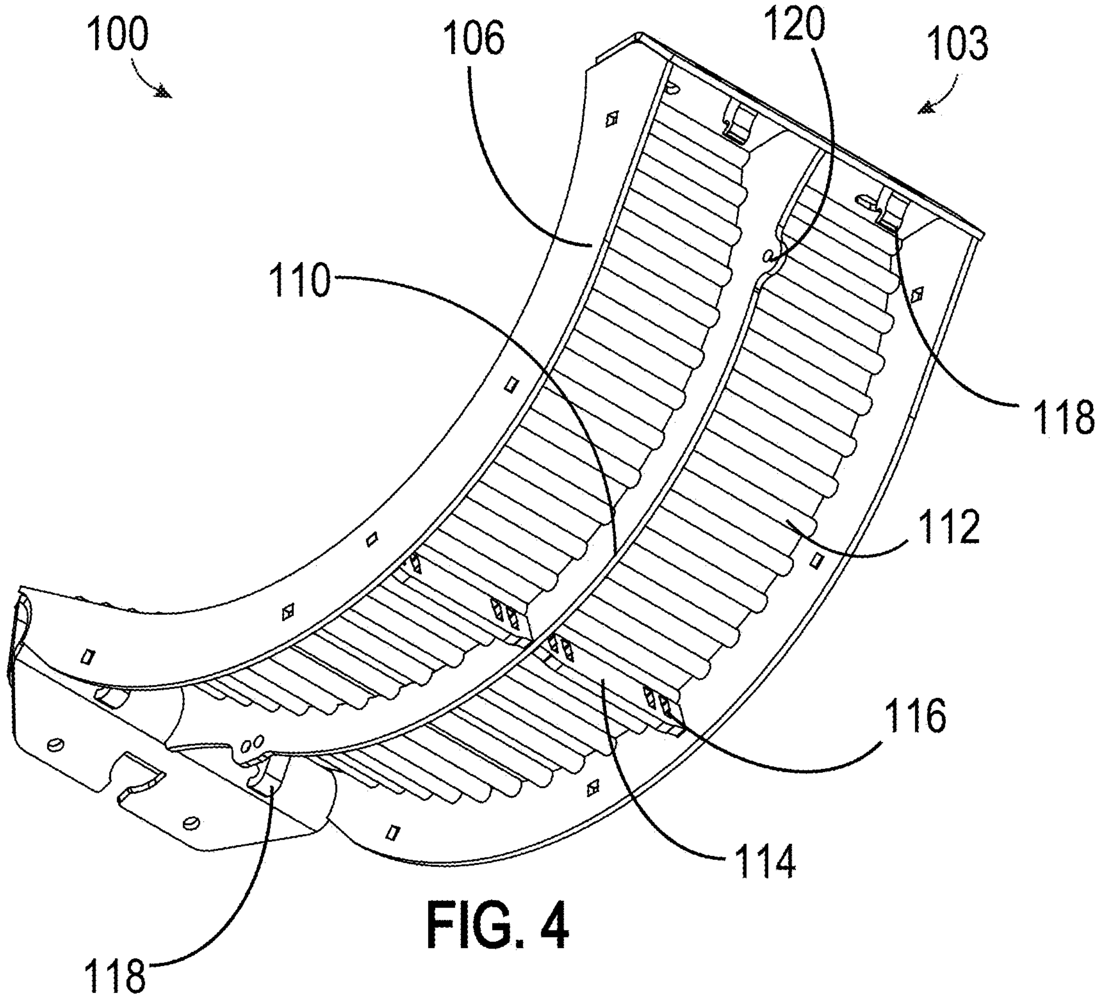
FIG. 4 shows a second perspective view of the first combine concave of FIG. 3.
Figure 5:
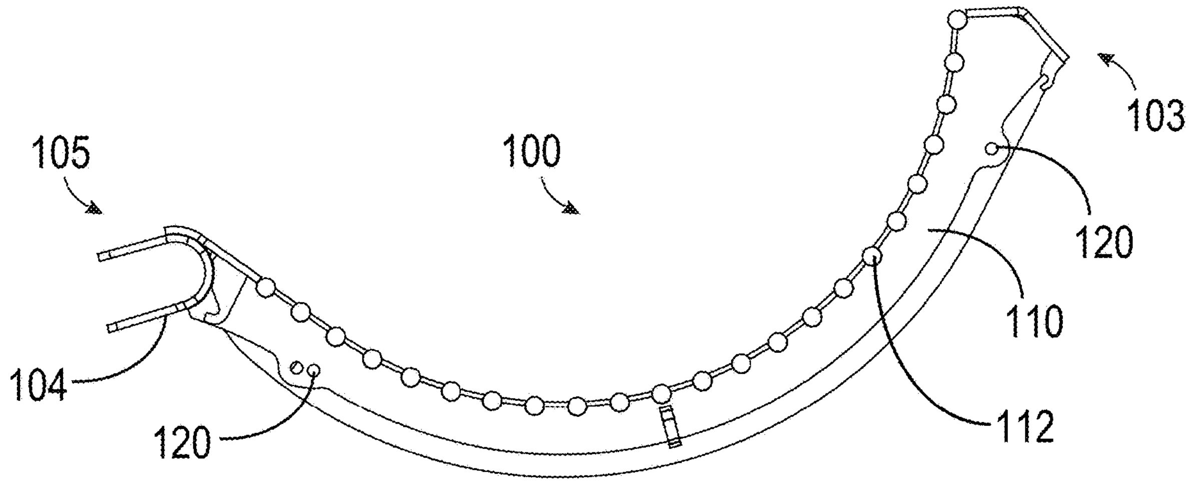
FIG. 5 shows a front elevation sectional view of the first combine concave of FIG. 3.
Figure 6:
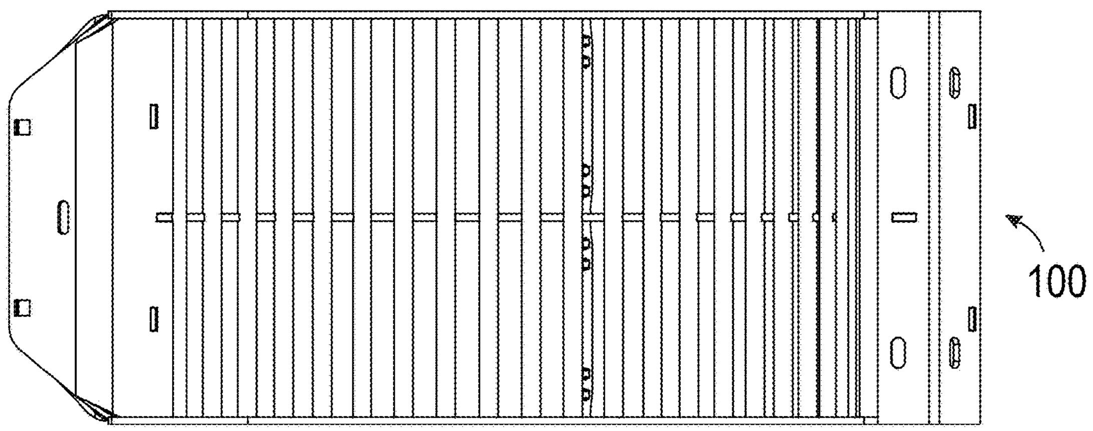
FIG. 6 shows a top plan view of the first combine concave of FIG. 3.
Figure 7:
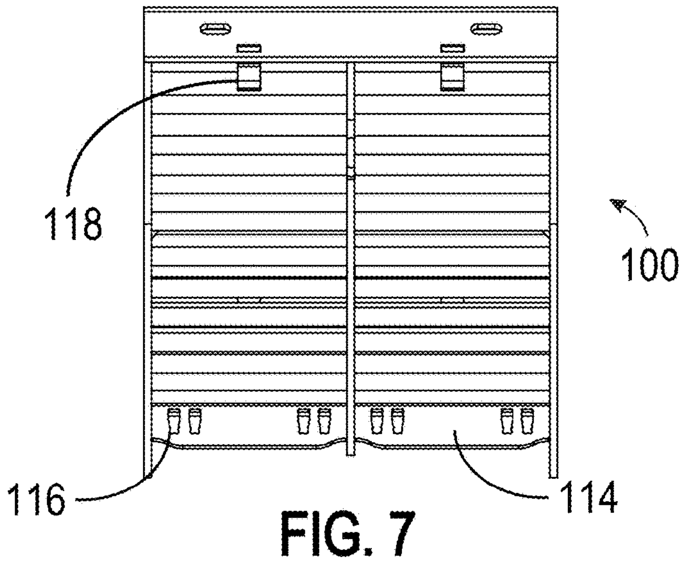
FIG. 7 shows a right-side elevation view of the first combine concave of FIG. 3.
Figure 8:
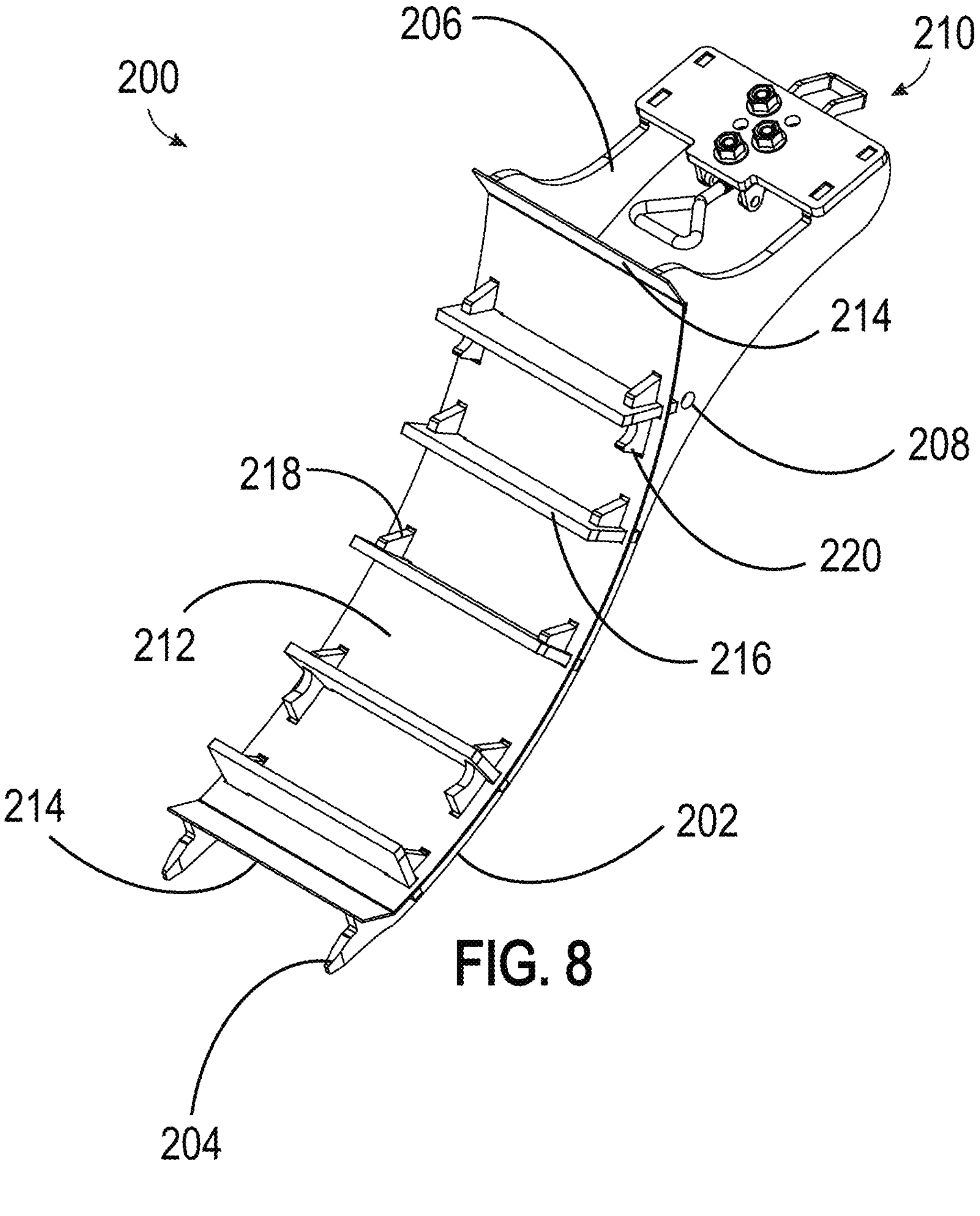
FIG. 8 shows a first perspective view of a first left disruptor for the first combine concave of FIG. 3.

In the concave 100 having the center frame 110 on the underside as shown in FIG. 3 and utilizing a disruptor or a MOG limiter (as depicted in FIGS. 18-22, and 33-37), there are four quadrants existing on the underside of the concave 100. The farmer can install MOG limiters in one or all four quadrants of the concave 100 (which is shown at position #3 in FIG. 2) to enhance the retention of MOG within the rotor chamber of the combine.

As shown in FIGS. 3-7 concaves 100 are elongated, heavy, and curvilinear. In the combine 50, several concaves 100 work in tandem to thresh and separate grain from MOG and are positioned in series. The concaves 100 represent a substantial expense if differing concave designs are used by the farmer. Further, concaves 100 are difficult and time-consuming to change out in a combine. At harvest, time is critical to take-in the crop at the optimal time as conditions for harvest change with the weather. Thus, the dilemma presented to the farmer is which concave design to use within the combine and whether to change-out the concaves or live with what is in place when the combine is originally set-up for harvest.

For example, concaves 100 that are used in the harvest of smaller grains can include narrower gaps and/or openings to limit the amount of MOG that drops out of the chamber and into the cleaning system. Concaves 100 that are intended for the harvest of larger grains should include gaps that still allow the larger grains to drop out of the chamber and into the cleaning system.

The concaves 100 are generally constructed from stainless steel or plastic. The materials that are used to construct the concaves 100 should be high-quality durable materials that stand up to wear and tear over repeated use without losing their threshing efficiency.

The concaves 100 are also preferably kept in good condition so that they can effectively separate grain from chaff without becoming clogged or damaged by stray stones or other foreign objects in the field. Maintenance of the concaves 100 can be a key part of achieving optimal performance for the concaves 100. The concaves 100 must not only be kept free from debris, but also the farmer should periodically evaluate whether the openings in the concaves 100 are an appropriate size for the crop to be harvested.

However, because of the aforementioned hardship(s) associated with changing out the concaves 100, it is highly desired to be able to use concaves 100 that are suitable for both larger and smaller grains. One such solution is to always use concaves 100 that are suitable for larger grains, and to attach removable inserts which narrow the gaps and/or openings when harvesting smaller grains or entirely close off the openings. The removable inserts could, for example, attach to the concaves 100 at the hooks 118 and cross frame apertures 116 shown in FIGS. 3-7.

A condition addressed by embodiments of the present disclosure involve the harvest of high moisture grain. In such conditions, the grain is more likely to clump or bridge the gap between concave rub bars. In such situations, MOG limiters can quickly go from helping eliminate MOG in harvested material to plugging of said gaps.

In breakdown of the threshing section of the rotor chamber of a combine, experimentation and study with the harvest of soybeans has shown that historically pods fall through the concave in the forward or #1 position due in substantial part to the failure to retain the pods within the rotor chamber to allow the pod-on-pod abrading action created by the revolving rotor and attached rasp bars which functions to open the pods and separate the beans therein. Excessive amounts of MOG historically are the function of MOG not being retained within the rotor chamber and falling through the concaves at positions #2 and #3. If OEM filler inserts are used in positions #2 and/or #3, the resultant problem is often loss of harvest yield due to the retention of the beans within the rotor chamber resulting in abrasive fracturing or crushing or their loss out the back end of the combine with the MOG.

The present disclosure is designed to address the issue of retaining MOG within the rotor chamber by metering the removal of grain from the rotor chamber. The disruptors, MOG limiters, and cover plates thereby allow for the timely and efficient removal of the beans or other small grains, including small kernel corn, from the threshing portion of the rotor chamber of the combine. The more quickly the separated grain is removed from the rotor chamber, the lesser the process load is placed on the threshing and separation functions which increases the overall efficiency of the harvest process while maintaining heightened integrity of the grain.

The present disclosure allows the farmer to balance the load of the harvest operation in a variety of different ways.

For example, several embodiments disclosed herein allow for more control over the volume of MOG dropping out of the rotor chamber to the sieve area.

In another respect, the present disclosure allows for a balance of grain throughput from rotor chamber to the sieve area. This balance relates to the constant volume flow of grain deposited through the concaves on left side versus right side. Historically, experimentation and study show that rotary combines deposit grain out of the rotor chamber heavily on the right side in what may be referred to as the 3-6 o'clock position when viewed from a position standing behind the combine. As the grain is transferred back to the cleaning area wherein the sieve is positioned, the right side of the sieve receives the majority of the material that exited the rotor chamber for cleaning while the left side of the sieve receives substantially lesser material for cleaning. Thus, the right side of the sieve is overloaded which negatively impacts its efficiency of properly separating grain from the remaining MOG and allows a greater amount of grain to be lost out of the back end of the combine. With the present disclosure, the farmer can fine tune the combine to balance out the loading of the back end to improve grain cleaning and retention for deposit in the grain tank.

FIGS. 8-12 show a disruptor 200 for the right side of the concave 100 and FIGS. 13-17 show a disruptor 300 for the left side of the concave 100. The disruptor 200, 300 includes rails 202, 302, hinge points 204, 304, extended mounting portions 206, 306, alignment apertures 208, 308, an over-center latch assembly 210, 310, a back plate 212, 312, back plate ramps 214, 314, ridges 216, 316, ridge stabilizers 218, 318, rub bar contacts 220, 320, and cross supports 222, 322.

The rails 202, 302 are curvilinear and are intended follow a same shape or be contoured to a shape that the concave 100 forms so as to be form fitted to an exterior surface of the concave 100 when attached thereto. The disruptors 200, 300 each include at least two rails 202, 302 which are parallel to one another. The rails 202, 302 include at their ends the hinge points 204, 304 and the extended mounting portions 206, 306, wherein the hinge points 204, 304 are at ends opposite the extended mounting portions 206, 306, and the hinge points 204, 304 comprise distal ends of the rails 202, 302, whereas the extended mounting portions 206, 306 need not extend from the rails 202, 302 at the distal ends opposite the hinge points 204, 304 but can extend from the rails 202, 302 substantially near the distal ends opposite the hinge points 204, 304. The hinge points 204, 304 comprise substantially pointed or rounded ends such that the rails 202, 302 begin tapering to form the hinge points 204, 304. Furthermore, the alignment apertures 208, 308 can be positioned anywhere along the rails 202, 302 and extend through the rails 202, 302 so as to align with the alignment apertures 120 on the concave 100.

The extended mounting portions 206, 306 extend outwardly away from the rails 202, 302 as a part of each of the two rails on each of the disruptors 200, 300, and transition into flat surfaces to which the over-center latch assembly 210, 310 can attach to. Each of the flat surfaces can form a common plane with one another such that it eases attachment of the over-center latch 210, 310 thereto. The extended mounting portions 206, 306 can be any shape that accomplish this extension transition such as rectangular, triangular, rhombus, stadium, oval, wavy combinations of any of these, lattice or truss structures with apertures extending therethrough, etc. The over-center latch assembly 210, 310 can attach downwardly (facing the flat surfaces at distal ends of the extended mounting portions 206, 306) or upwardly (facing away from the flat surfaces at distal ends of the extended mounting portions 206, 306), depending on a preference of the user or operator as to how a loop of the over-center latch attaches to the hooks 118 of the concave 100 in addition to which direction the over-center latch 210, 310 will be accessible from. The over-center latch assembly 210, 310 will be discussed in greater detail in conjunction with FIGS. 106-107.

The disruptor 200, 300 further includes the back plate 212, 312 attached atop the rails 202, 302. The back plate 212, 312 comprises a solid sheet of material that follows contours of the rails 202, 302. As such, the back plate 212, 312 is curvilinear in shape and will fit snuggly against the rub bars 112 of the concave 100 when placed against an exterior of the concave 100. A width of the back plate 212, 312 extends over each of the rails 202, 302. Further, the back plate 212, 312 additionally comprises back plate ramps 214, 314 that extend inwardly (with respect to a direction of curvature of the back plate 212, 312) at distal ends of the back plate 212, 312. In this regard, the back plate 212, 312 can fit snugly against exterior surfaces of the rub bars 112 of the concave 100 and the back plate ramps 214, 314 increase an amount of surface area contact against the rub bars 112 of the concave 100 by angling towards the rub bars 112 so as to reduce an amount of MOG and/or grain that can get stuck in between the rub bar 112 and the back plate 212, 312.

The disruptors 200, 300 further comprise the ridges 216, 316 positioned on a top of the back plate 212, 312. As shown in FIGS. 8-17, the ridges 216, 316 span substantially a width of the back plate 212, 312 and extend away from the back plate 212, 312 inwardly (with respect to a direction of curvature of the back plate 212, 312). The ridges 216, 316 are intended to extend in between the rub bars 112 of the concave 100. As such, the ridges 216, 316 can be spaced such that a single ridge 216, 316 can extend between each of a gap between rub bars 112 on the concave 100. The ridges 216, 316 can be secured to the back plate 312, 312 via weld. The ridges 216, 316 can include portions that extend through back plate 212, 312 and attach or clamp onto the rails 202, 302.

The ridges 216, 316 can be additionally held in place via the ridge stabilizers 218, 318. The ridge stabilizers 218, 318 comprise studs or teeth protruding from the back plate 212, 312 to grasp the ridges 216, 316. The ridge stabilizers 218, 318 can be any suitable shape to accomplish this, so long as the shape includes direct physical contact with the ridges 216, 316. As shown, the ridge stabilizers 218, 318 comprise partial frustum shapes including angled portions extending away from the back plate 212, 312 with substantially flat tops in which a portion of the partial frustum shape is not angled but is flush with an outer surface of the ridges 216, 316. These outer surfaces of the ridges 216, 316 extend substantially orthogonally away from the back plate 212, 312, whereas the ridge stabilizers 218, 318 comprise thicker base portions in contact with back plate 212, 312 and thinner distal portions away from the back plate 212, 312 thus increasing stabilizing capacity of holding the ridges 216, 316 with diagonal geometry much like trusses on a bridge while also slightly reducing weight of the disruptors 200, 300 by refraining from including ridge stabilizers 218, 318 that are a uniform thickness or ridge stabilizers 218, 318 that span a same height or width as the ridges 216, 316.

As shown in the figures, rub bar contacts 220, 320 can also abut the ridges 216, 316. As opposed to the ridge stabilizers 218, 318, the rub bar contacts 220, 320 are specifically shaped to cradle the rub bars 112 on the concave 100. In this regard, when the disruptors 200, 300 are positioned on the concave 100 the rub bars 112 will sit snugly within the rub bar contacts 220, 320 which are each shaped as a concave configured to hold a cylindrical shaped object thereon. The rub bar contacts 220, 320 are positioned adjacent the ridges 216, 316 such that the rub bars 112 will abut the ridges 216, 316 that are adjacent the rub bar contacts 220, 320 and additionally each of the ridges 216, 316 when the ridges 216, 316 are spaced uniformly on the disruptor 200, 300.

As shown in the figures, the rub bar contacts 220, 320 are consistent in their placement of always being on a side of the ridges 216, 316 that is opposite the ridge stabilizers 218, 318. However, as can be readily seen as a difference between the disruptor 200 shown in FIGS. 8-12 and the disruptor 300 shown in FIGS. 13-17, the rub bar contacts 220 of the disruptor 200 in FIGS. 8-12 are each placed on a side of the ridges 216 that face the hinge points 204 rather than the over-center latch assembly 210. In contrast, the rub bar contacts 320 of the disruptor 300 in FIGS. 13-17 are each placed on a side of the ridges 316 that face the over-center latch assembly 310 rather than the hinge points 304. In this regard, when the disruptors 200, 300 are placed opposite one another on an exterior of the concave 100, the ridges 216, 316 will always be on a same side of the rub bars 112 for purposes of MOG-and-grain's direction of flow within the concave 100 around the rotor in the threshing chamber 56. This configuration is most readily seen in FIG. 20 in which the rub bars 112 are always on a left side of the ridges 216, 316 despite having the disruptor 200 and the disruptor 300 facing opposite one another.

Figure 9:
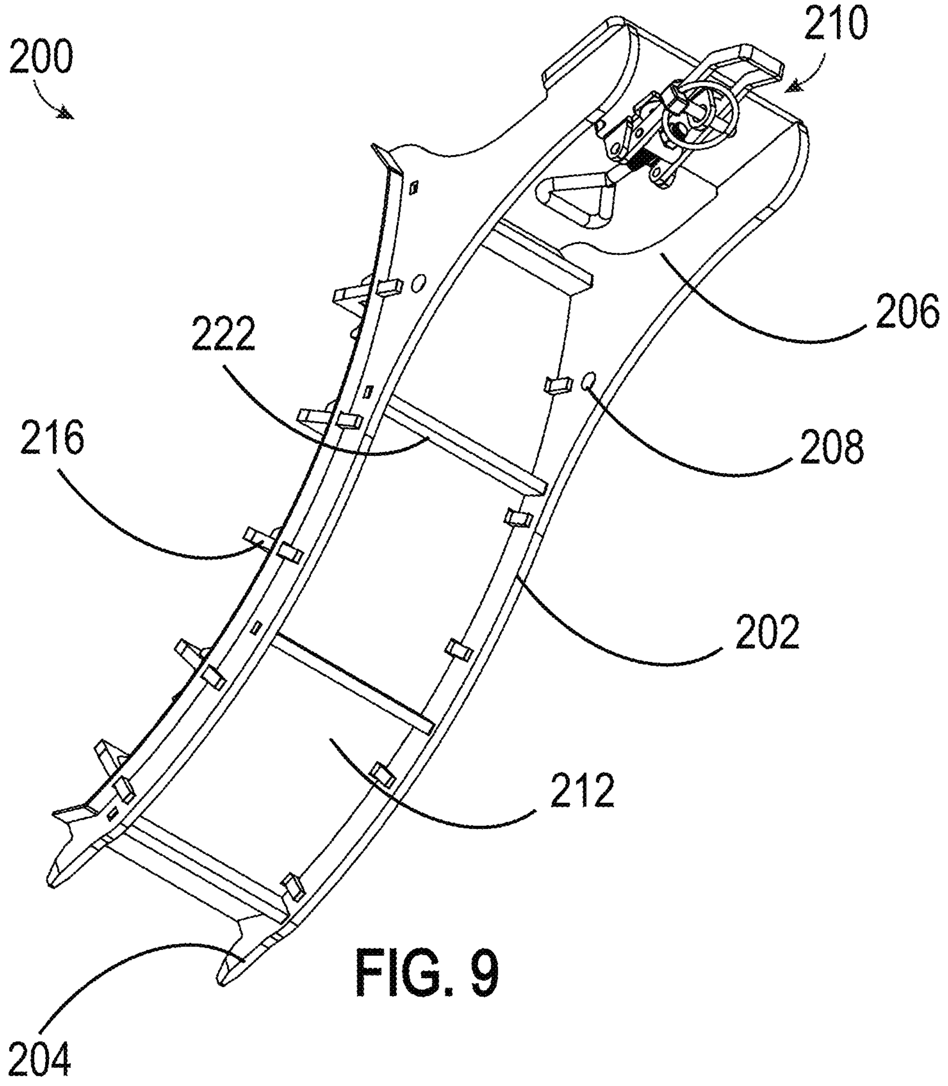
FIG. 9 shows a second perspective view of the first left disruptor of FIG. 8.
Figure 10:
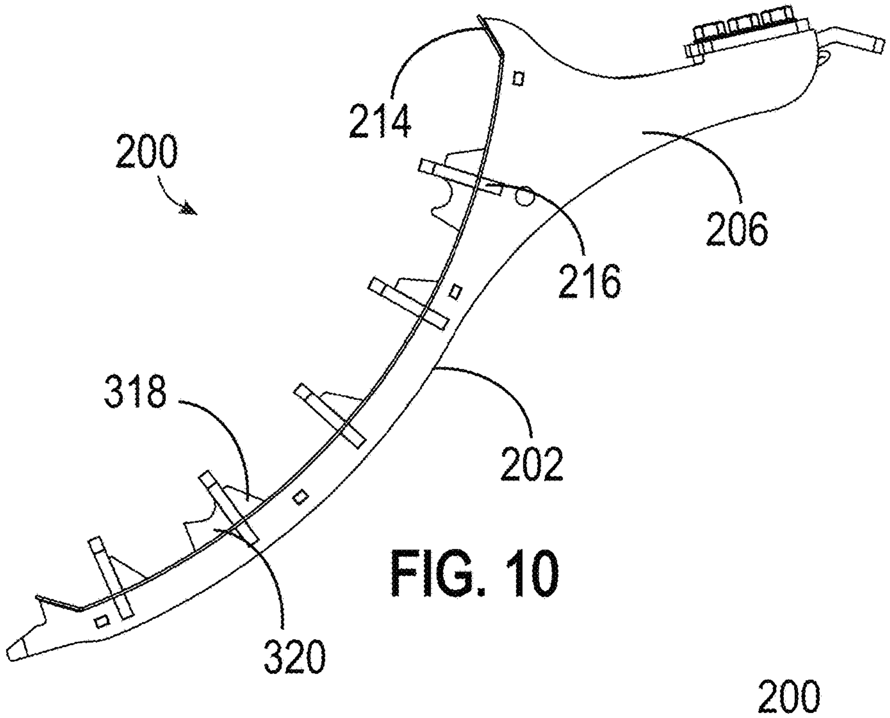
FIG. 10 shows a front elevation view of the first left disruptor of FIG. 8.
Figure 12:
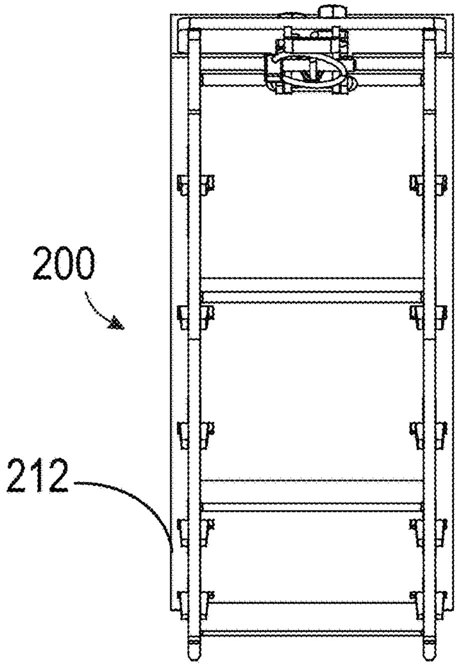
FIG. 12 shows a right-side elevation view of the first left disruptor of FIG. 8.
Figure 11:
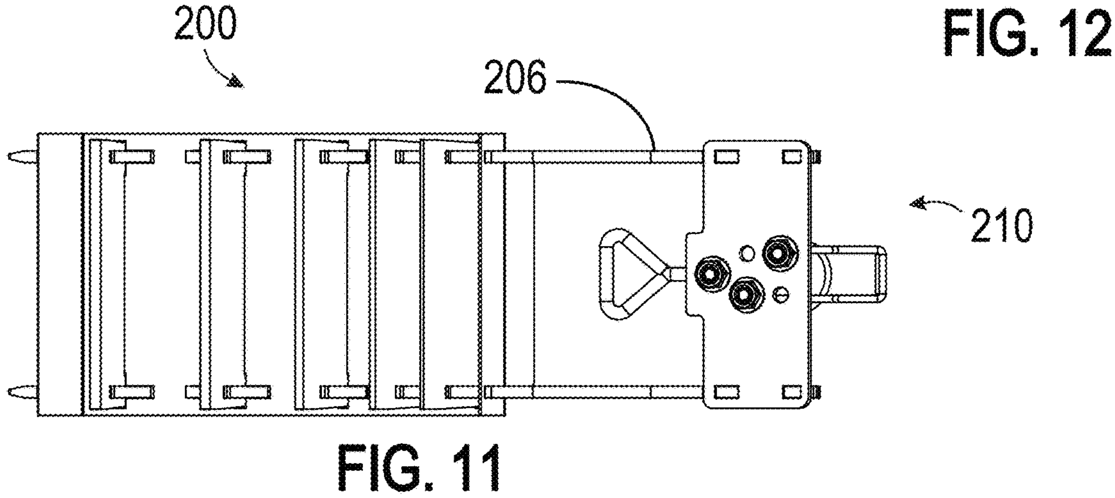
FIG. 11 shows a top plan view of the first left disruptor of FIG. 8.
Figure 13:
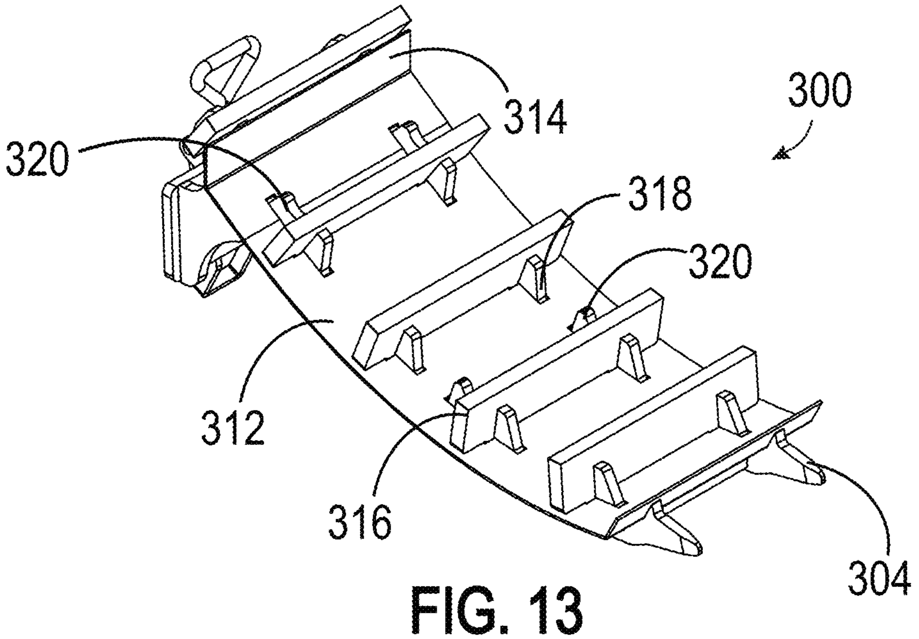
FIG. 13 shows a first perspective view for a first right disruptor for the first combine concave of FIG. 3.
Figure 14:
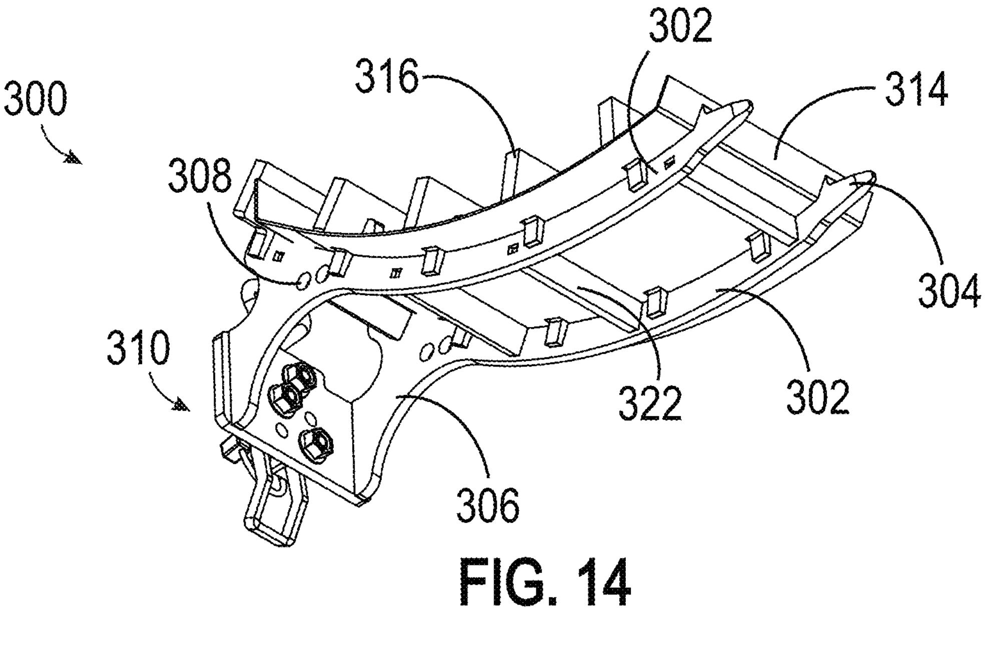
FIG. 14 shows a second perspective view of the first right disruptor of FIG. 13.
Figure 15:
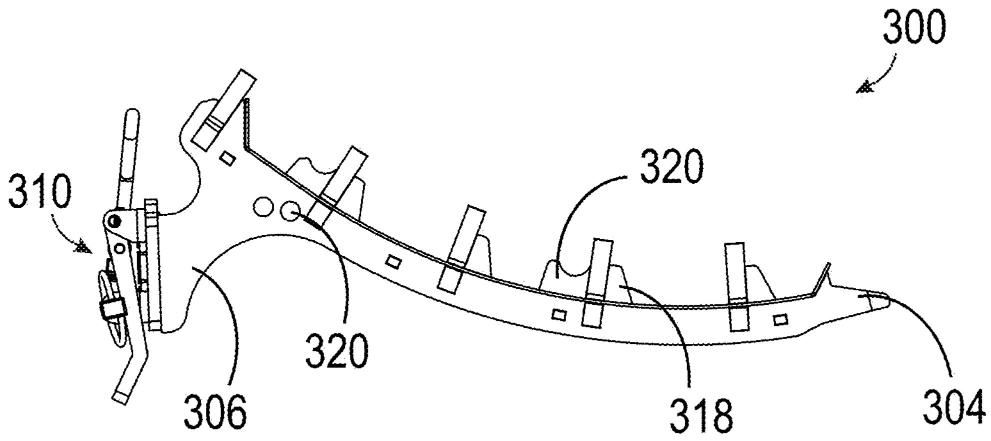
FIG. 15 shows a front elevation view of the first right disruptor of FIG. 13.
Figure 16:
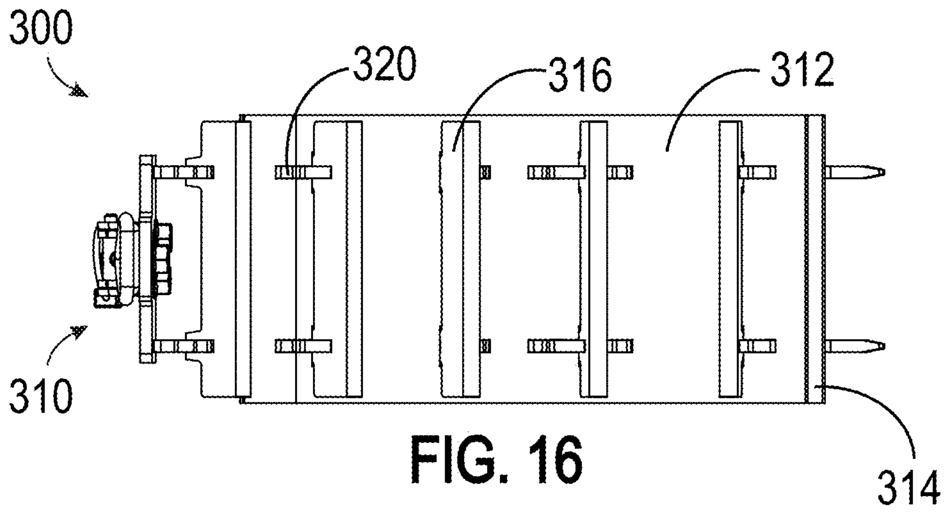
FIG. 16 shows a top plan view of the first right disruptor of FIG. 13.
Figure 17:
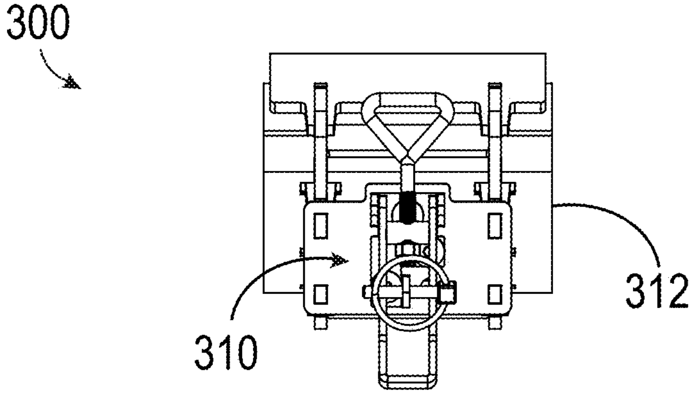
FIG. 17 shows a left-side elevation view of the first right disruptor of FIG. 13.
Figure 18:
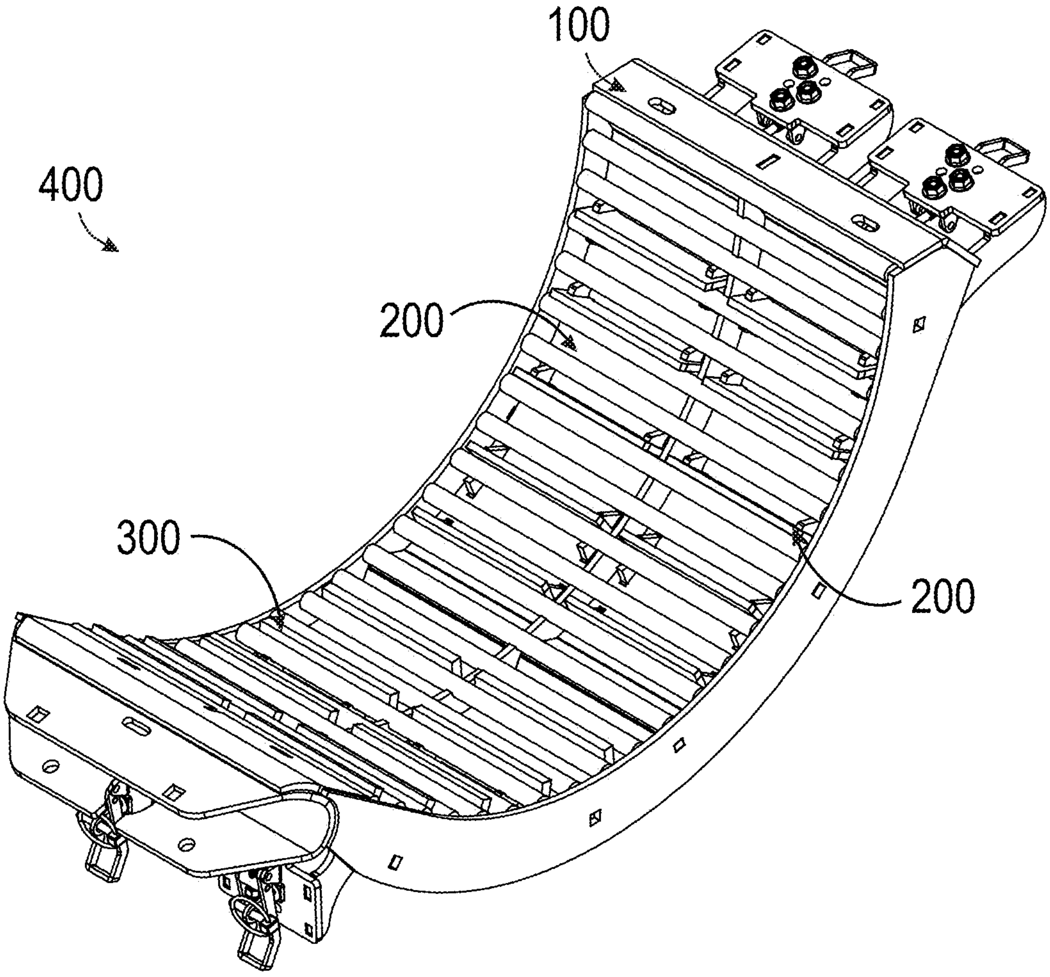
FIG. 18 shows a first perspective view of a first operational, MOG-disrupting assembly employing the first combine concave of FIG. 3, the first left disruptor of FIG. 6, and the first right disruptor of FIG. 13.
Figure 19:
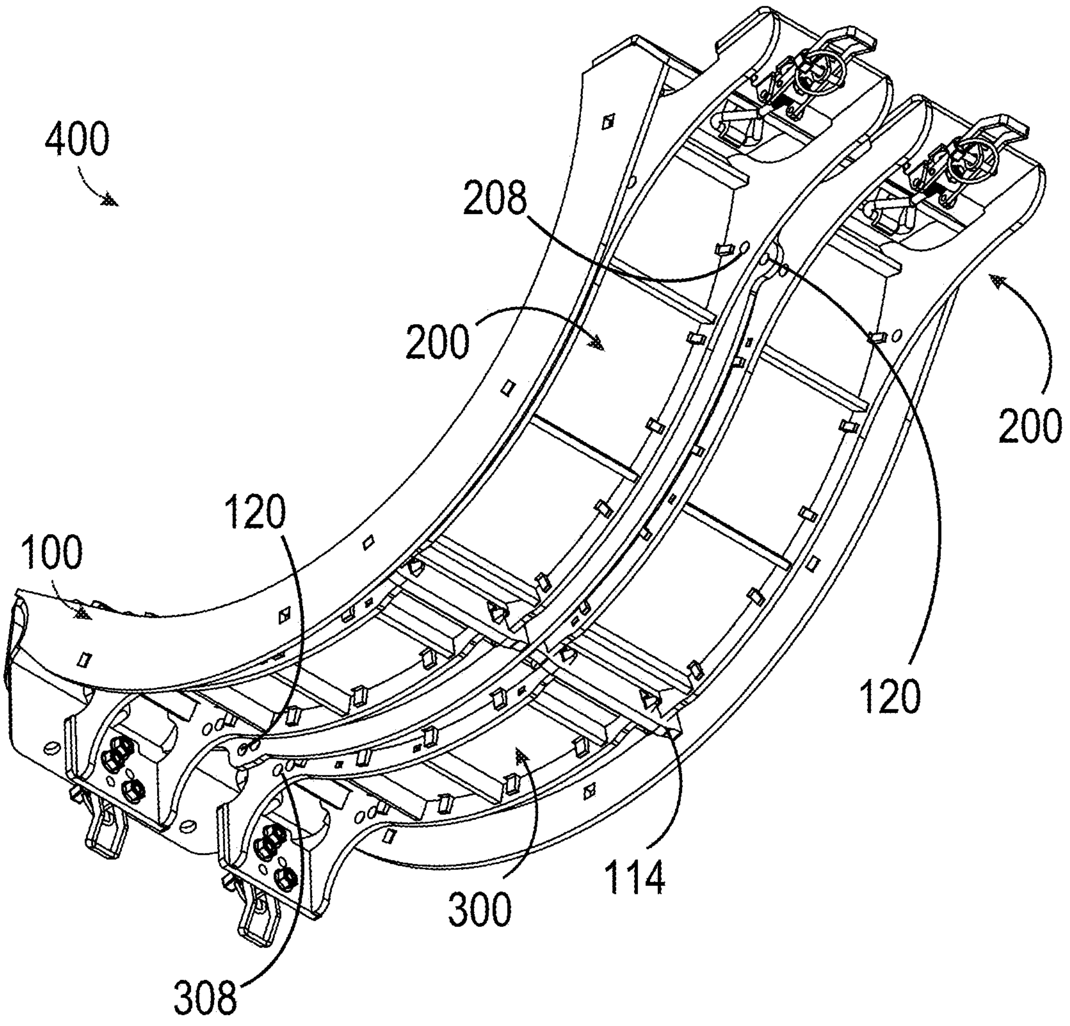
FIG. 19 shows a second perspective view of the first operational, MOG-disrupting assembly of FIG. 18.

Furthermore, cross supports 222, 322 can be seen in FIGS. 9 and 14 which comprise bars that extend between the rails 202, 302 for additional structural support to the disruptors 200, 300. The cross supports 222, 322 can be substantially parallelepiped in shape and can be spaced evenly along a bottom of the back plate 212, 312.

FIGS. 18-22 show a concave assembly 400, which includes disruptors 200, 300 filling each position on an exterior of the concave 100.

As shown in FIGS. 18-22, the hinge points 204, 304 are inserted through the cross frame apertures 116 on the cross frame 114. Once inserted through, loops on the over-center latch assemblies 210, 310 interface with the hooks 118 and are latched down onto the hooks 118. Tension between the hooks 118 and over-center latch assemblies 210, 310 in addition to tension against the cross frame 114 from the hinge points 204, 304 maintain or support the disruptors 200, 300 against the exterior of the concave 100 without falling off. Additional support can be added by inserting a lock through the alignment apertures 120 which align with the alignment apertures 208, 308 though this is not required.

As shown in the figures, a width of the back plates 212, 312 substantially spans a width of a distance between the first side frame 106 and the center frame 110 or alternatively the second side frame 108 and the center frame 110. This aids in preventing MOG and/or grain from falling through the concave 100.

Figure 20:
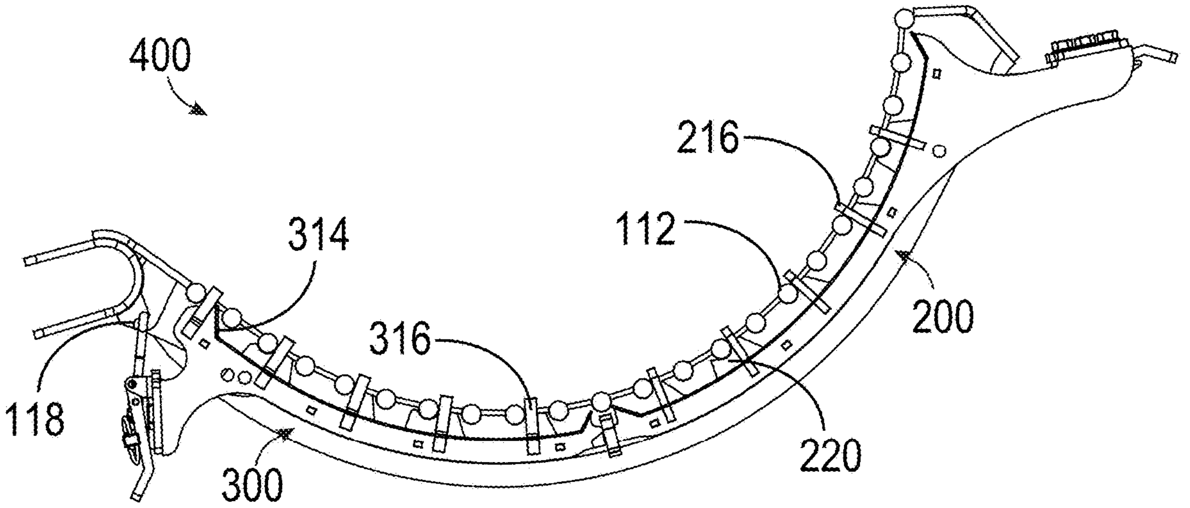
FIG. 20 shows a front elevation sectional view of the first operational, MOG-disrupting assembly of FIG. 18.
Figure 21:
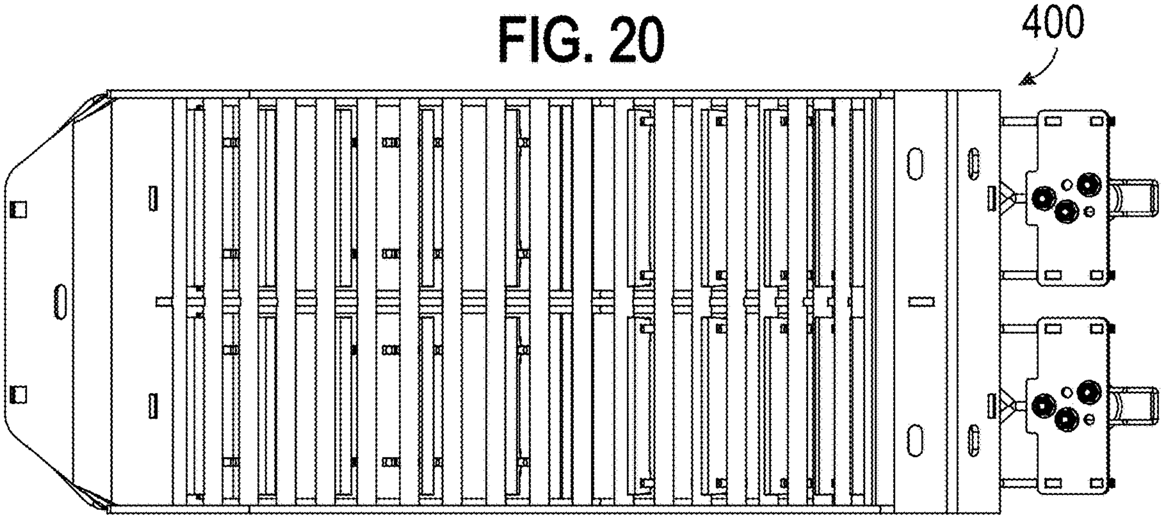
FIG. 21 shows a top plan view of the first operational, MOG-disrupting assembly of FIG. 18.
Figure 22:
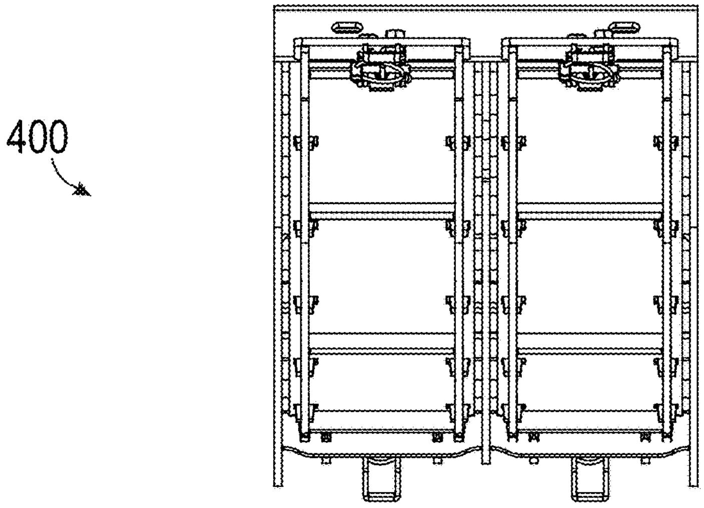
FIG. 22 shows a right-side elevation view of the first operational, MOG-disrupting assembly of FIG. 18.
Figure 23:
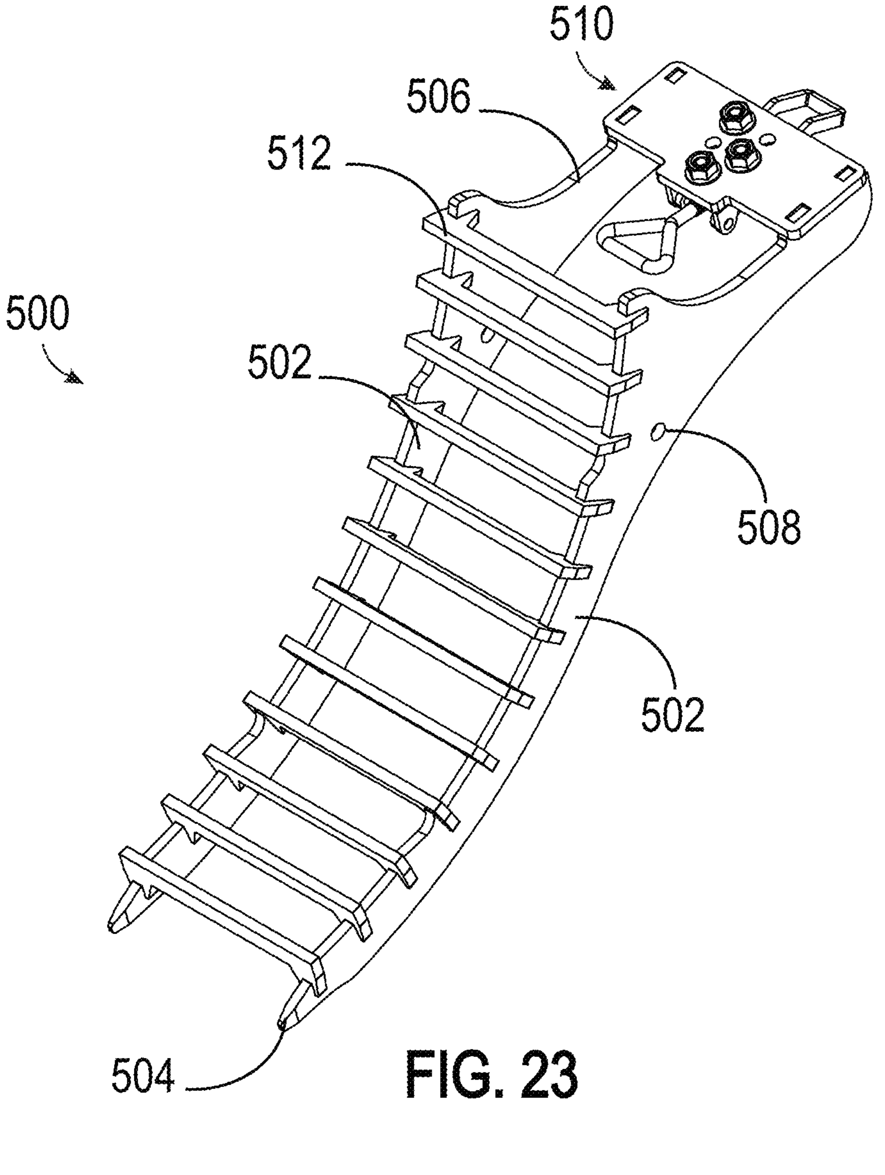
FIG. 23 shows a first perspective view of a first left MOG limiter for the first combine concave of FIG. 3.
Figure 24:
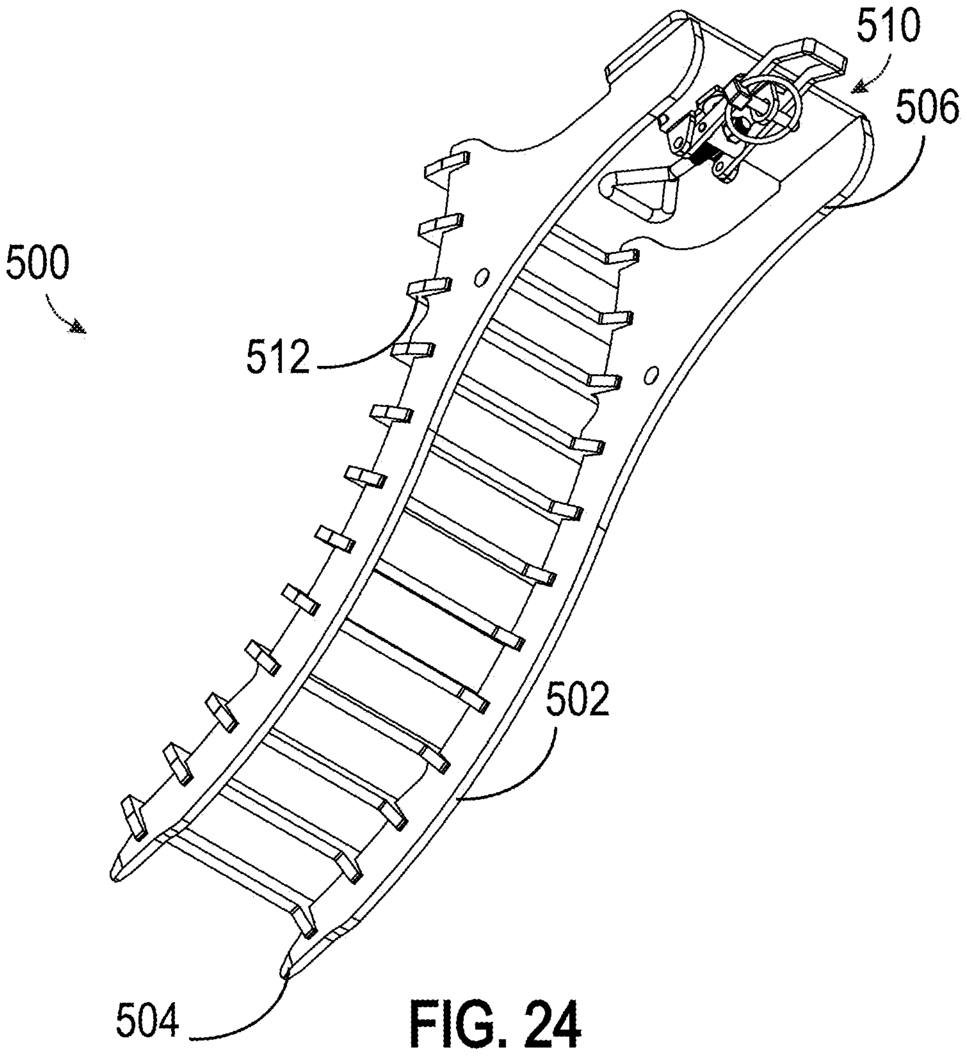
FIG. 24 shows a second perspective view of the first left MOG limiter of FIG. 23.
Figure 25:
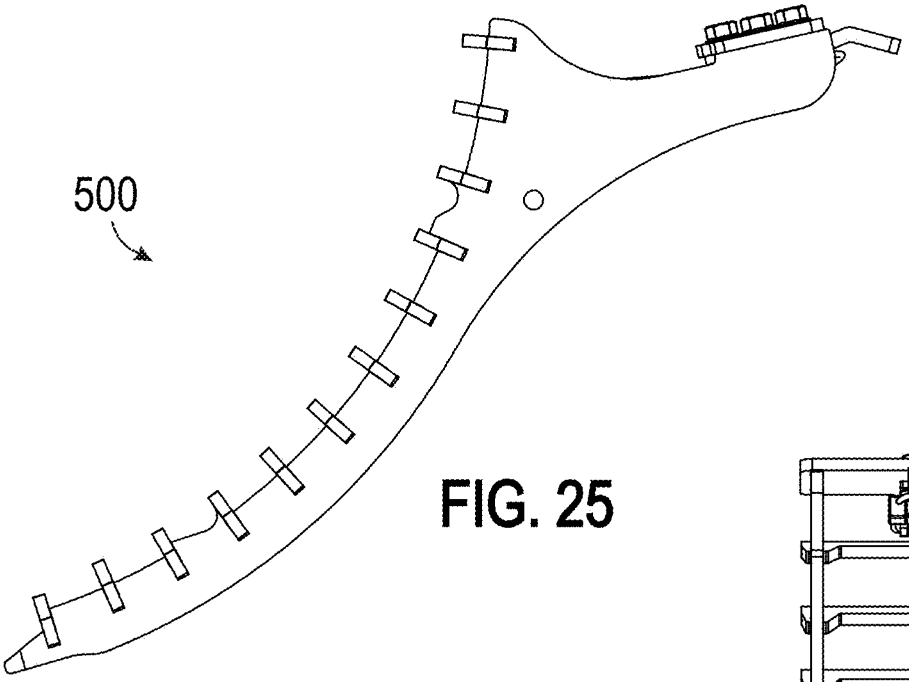
FIG. 25 shows a front elevation view of the first left MOG limiter of FIG. 23.
Figure 27:
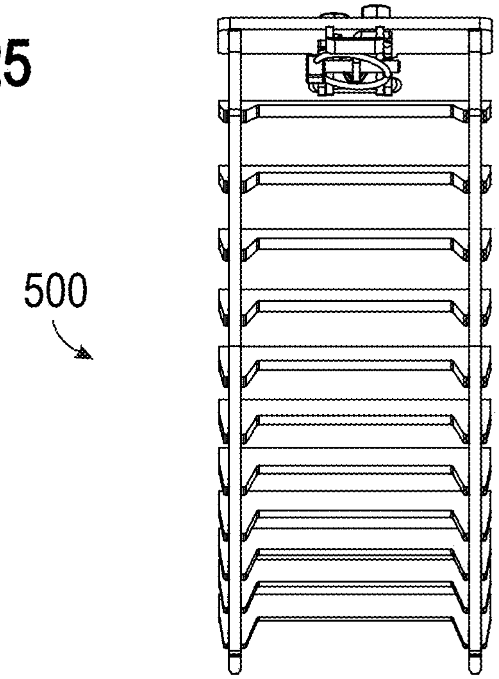
FIG. 27 shows a right-side elevation view of the first left MOG limiter of FIG. 23.
Figure 26:
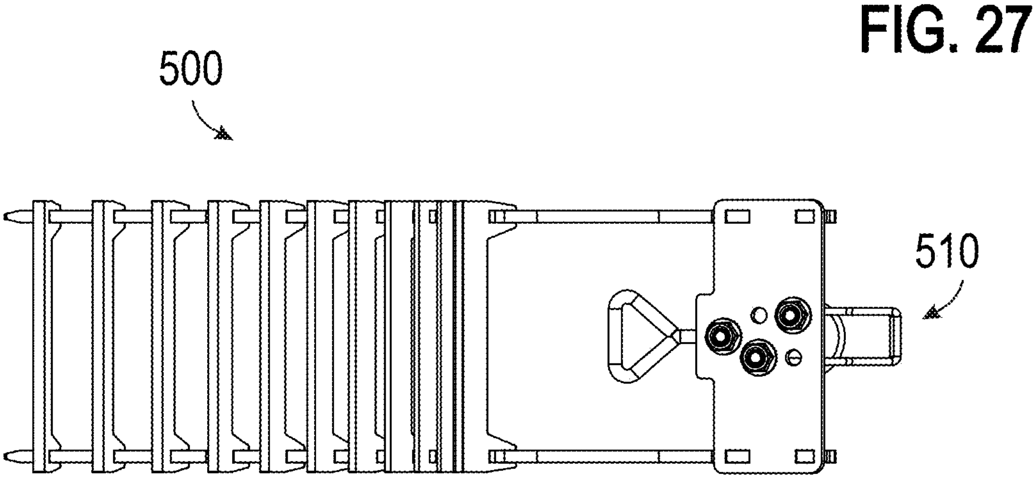
FIG. 26 shows a top plan view of the first left MOG limiter of FIG. 23.
Figure 28:
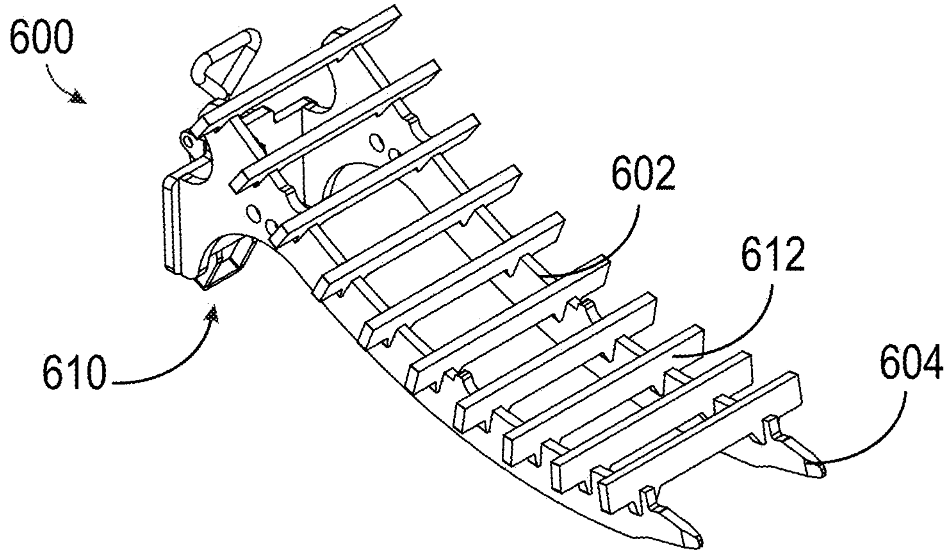
FIG. 28 shows a first perspective view for a first right MOG limiter for the first combine concave of FIG. 3.
Figure 29:
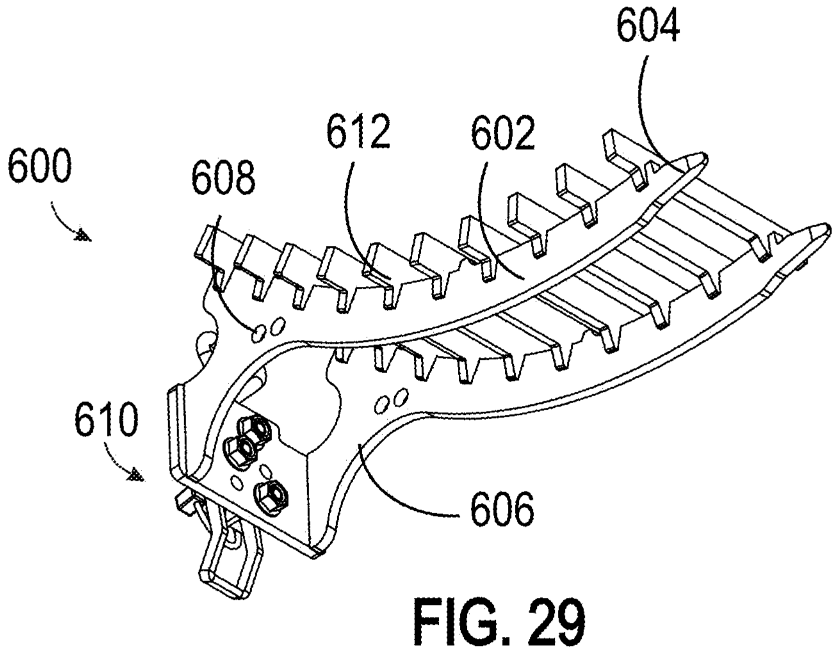
FIG. 29 shows a second perspective view of the first right MOG limiter of FIG. 28.
Figure 30:
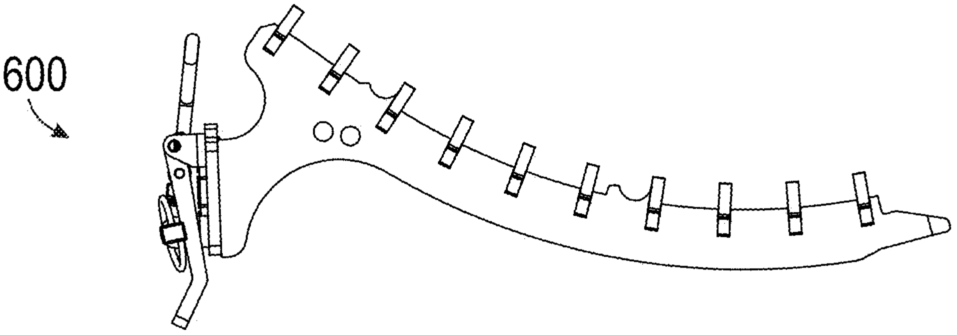
FIG. 30 shows a front elevation view of the first right MOG limiter of FIG. 28.
Figure 31:
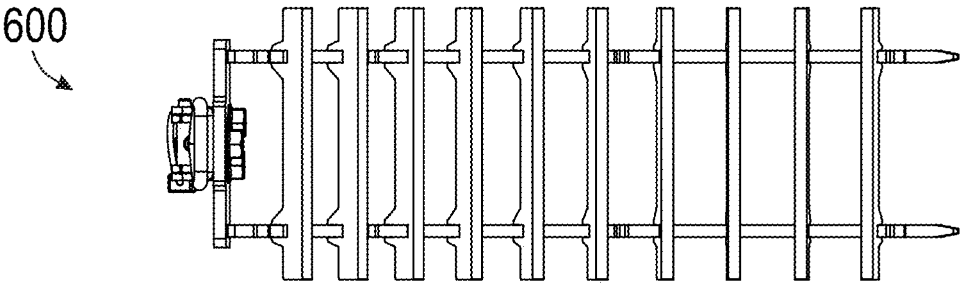
FIG. 31 shows a top plan view of the first right MOG limiter of FIG. 28.
Figure 32:
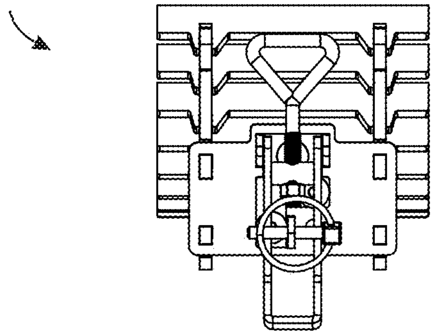
FIG. 32 shows a left-side elevation view of the first right MOG limiter of FIG. 28.
Figure 33:
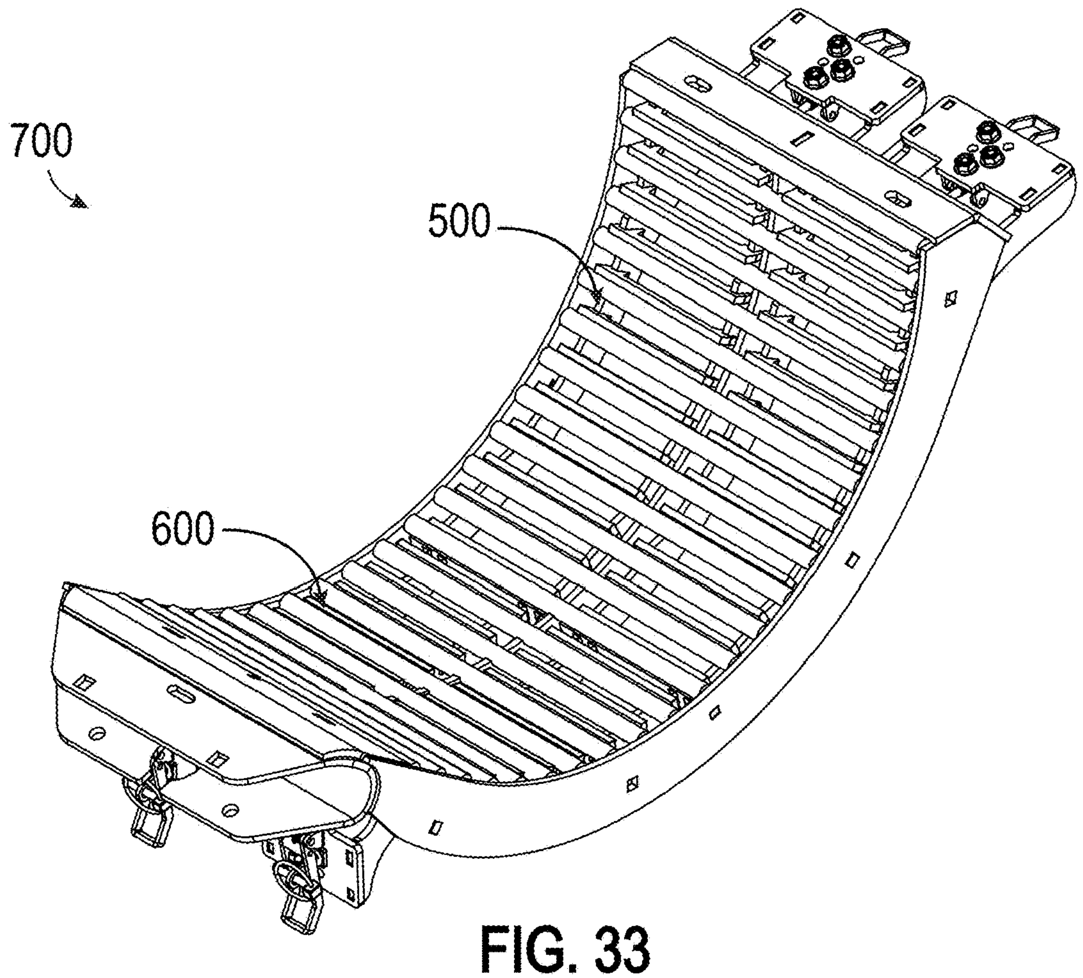
FIG. 33 shows a first perspective view of a first operational, MOG-limiting assembly employing the first combine concave of FIG. 3, the first left MOG limiter of FIG. 23, and the first right MOG limiter of FIG. 28.
Figure 34:
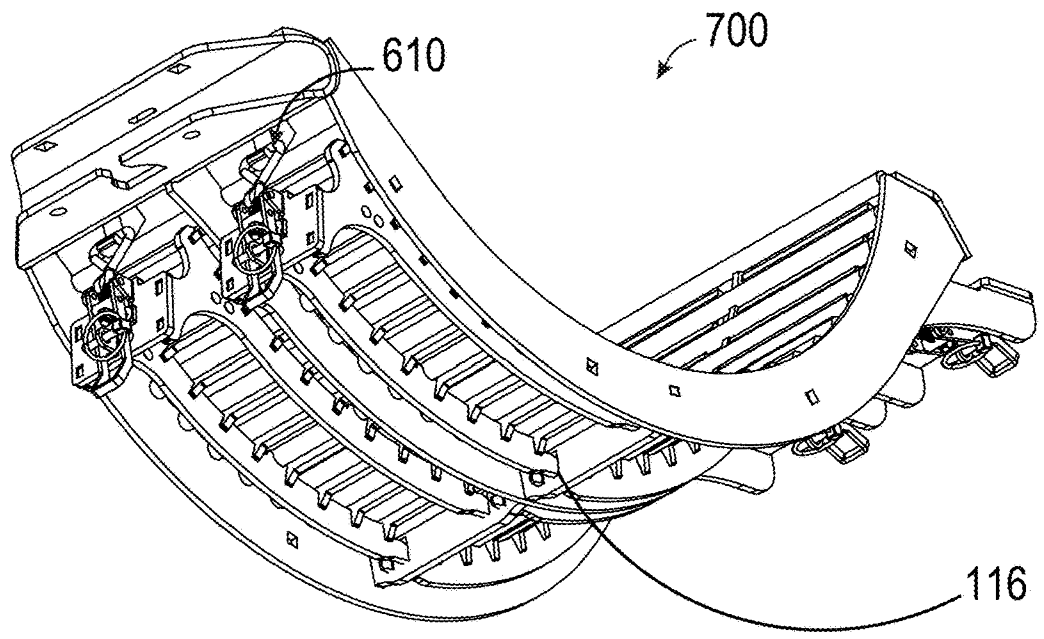
FIG. 34 shows a second perspective view of the first operational, MOG-limiting assembly of FIG. 33.
Figure 35:
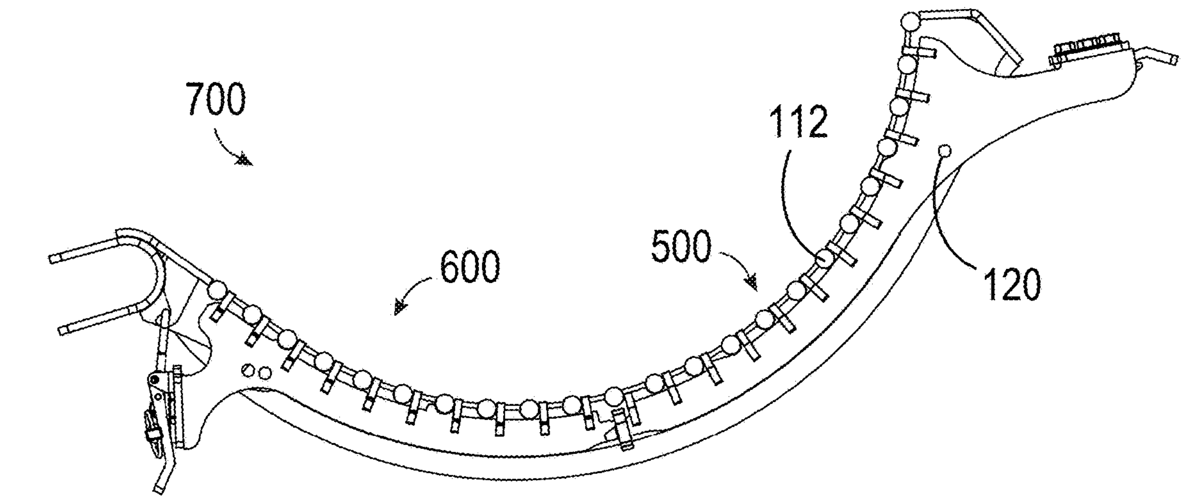
FIG. 35 shows a front elevation sectional view of the first operational, MOG-limiting assembly of FIG. 33.
Figure 36:
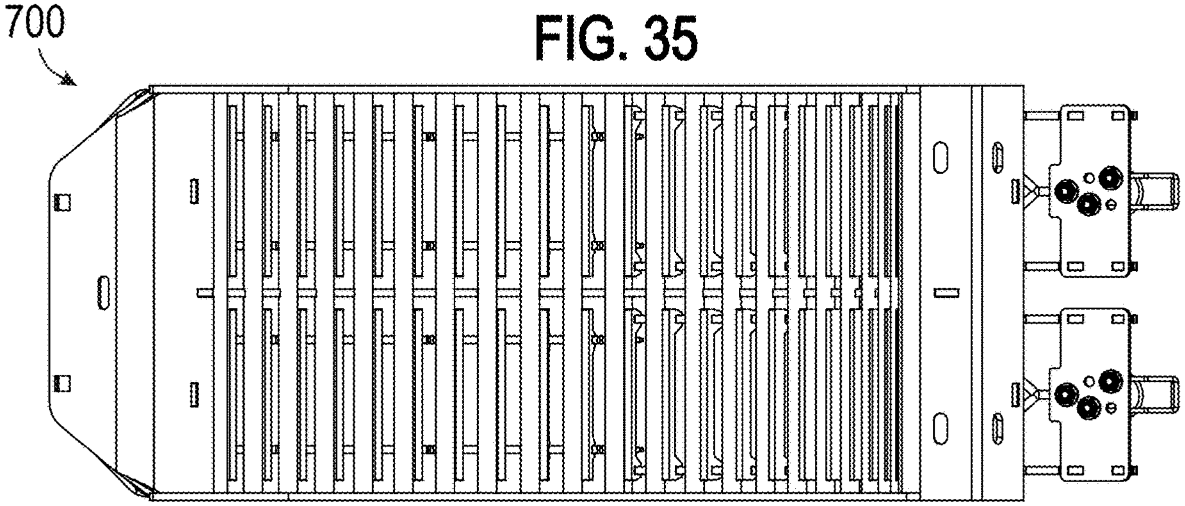
FIG. 36 shows a top plan view of the first operational, MOG-limiting assembly of FIG. 33.
Figure 37:
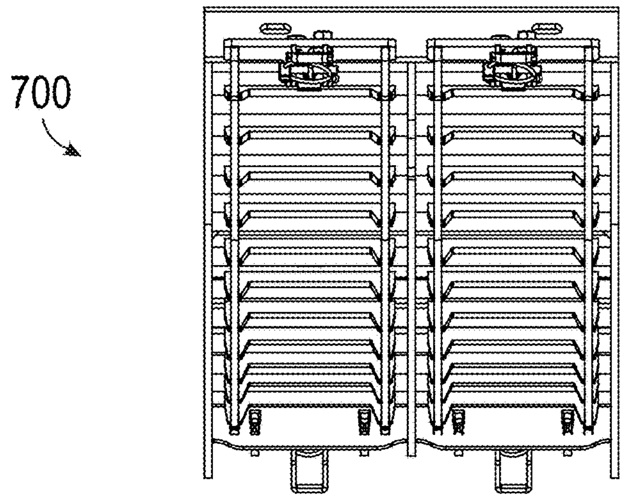
FIG. 37 shows a right-side elevation view of the first operational, MOG-limiting assembly of FIG. 33.
Figure 38:
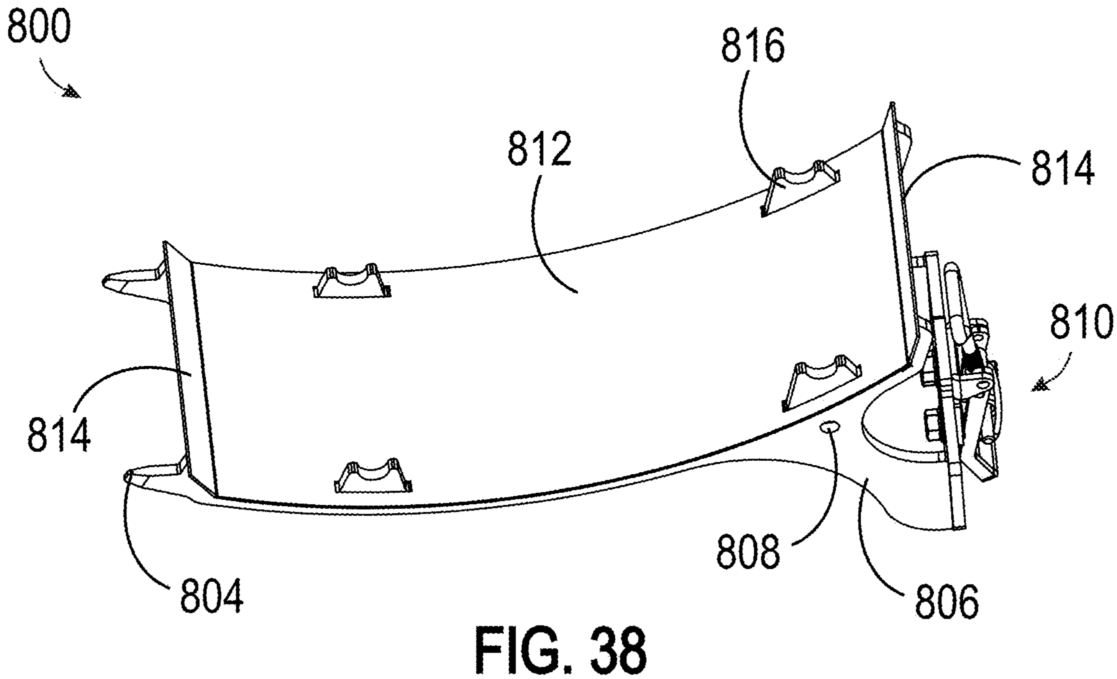
FIG. 38 shows a first perspective view of a first left cover plate for the first combine concave of FIG. 3.

As shown in the figures and can be most readily seen in FIG. 20, the back plate 212, 312 is not in direct contact with the rub bars 112. As such, this make for room in which MOG can accumulate in between gaps between the rub bars 112 and the back plate 212, 312. This makes for additional points of contact and pinch points for incoming MOG and grain passing through the threshing chamber 56.

As shown, the disruptors 200, 300 not only retain MOG and grain with the back plates 212, 312 by closing off gaps past the rub bars 112 thus preventing MOG and grain from falling past the concave 100, but the ridges 216, 316 extend upward through the rub bars 112 creating additional points of contact and pinch points for the MOG and grain to contact thus abrading the MOG and grain entering the threshing chamber 56 at a higher rate than MOG and grain flowing past the concave 100 (via the rotor) without any disruptors 200, 300 attached thereto. This does so by decreasing an amount of space or volume between the rotor and the concave 100 within the threshing chamber 56 by having the ridges 216, 316 extend upward and inward through the rub bars 112 towards the rotor (filling gaps and extending higher than the rub bars 112) in combination with retaining MOG and grain with the back plates 212, 312 rather than allowing MOG and/or grain to slip through gaps between the rub bars 112 and fall beneath the concave 100. As such, MOG and grain is abraded at a higher rate thus feeding more volume per unit time through the threshing chamber 56 which can lead to higher throughput or more acres per hour in addition to better fuel efficiency per unit crop sent through the combine harvester 50 due to higher efficiency or operating closer to capacity (optimizing) regarding how much volume is processed through the threshing chamber 56.

Being abraded at a higher rate and making flow of the MOG and grain more turbulent by adding the additional points of contact and pinch points is additionally useful and beneficial when the disruptors 200, 300 are placed on the concave 100 at the #1 spot in the threshing chamber (or a very first concave which crops encounter in the threshing chamber 56) due to the additional points of contact and pinch points which increases an amount of separation between MOG and grain thus more quickly separating the grain from the MOG to be released through gaps in concaves 100 at later positions (e.g., positions #2-#7 in the threshing chamber 56). The amount of disruptors 200, 300 placed on concaves 100 as inserts as opposed to not including any inserts (or in the alternative additionally including inserts such as MOG limiters and/or cover plates as described herein) will vary to achieve an optimum flow rate and rate of separation between MOG and grain (too high of a rate of separation can result in grain damage whereas too low a rate of separation can result in lost grain—still being attached to the MOG when discarded—thus each resulting in lower yield). The variation will depend on a size of the grain on the crops being sent through the threshing chamber 56. Larger grains with fewer grains on the crop can benefit from a lower rate of abrasion and separation whereas smaller grains with many on the crop can benefit from a higher rate of abrasion and separation.

The disruptor 200, 300 as shown in FIGS. 8-17 are readily installed by the farmer or technician without requiring the assistance of a second person and are easily and quickly removed once installed. This functions to enhance the flexibility provided to the farmer who may make adjustments as to how many and where disruptors 200, 300 are positioned within the threshing section of the rotor chamber.

FIGS. 23-27 show a MOG limiter 500 for the right side of the concave 100 and FIGS. 28-32 show a MOG limiter 600 for the left side of the concave 100. The MOG limiter 500, 600 includes rails 502, 602, hinge points 504, 604, extended mounting portions 506, 606, alignment apertures 508, 608, an over-center latch assembly 510, 610, and cross bars 512, 612.

The rails 502, 602 are curvilinear and are intended follow a same shape or be contoured to a shape that the concave 100 forms so as to be form fitted to an exterior surface of the concave 100 when attached thereto. The MOG limiters 500, 600 each include at least two rails 502, 602 which are parallel to one another. The rails 502, 602 include at their ends the hinge points 504, 604 and the extended mounting portions 506, 606, wherein the hinge points 504, 604 are at ends opposite the extended mounting portions 506, 606, and the hinge points 504, 604 comprise distal ends of the rails 502, 602, whereas the extended mounting portions 506, 606 need not extend from the rails 502, 602 at the distal ends opposite the hinge points 504, 604 but can extend from the rails 502, 602 substantially near the distal ends opposite the hinge points 504, 604. The hinge points 504, 604 comprise substantially pointed or rounded ends such that the rails 502, 602 begin tapering to form the hinge points 504, 604. Furthermore, the alignment apertures 508, 608 can be positioned anywhere along the rails 502, 602 and extend through the rails 502, 602 so as to align with the alignment apertures 120 on the concave 100.

The extended mounting portions 506, 606 extend outwardly away from the rails 502, 602 as a part of each of the two rails on each of the MOG limiters 500, 600, and transition into flat surfaces to which the over-center latch assembly 510, 610 can attach to. Each of the flat surfaces can form a common plane with one another such that it eases attachment of the over-center latch 510, 610 thereto. The extended mounting portions 506, 606 can be any shape that accomplish this extension transition such as rectangular, triangular, rhombus, stadium, oval, wavy combinations of any of these, lattice or truss structures with apertures extending therethrough, etc. The over-center latch assembly 510, 610 can attach downwardly (facing the flat surfaces at distal ends of the extended mounting portions 506, 606) or upwardly (facing away from the flat surfaces at distal ends of the extended mounting portions 506, 606), depending on a preference of the user or operator as to how a loop of the over-center latch attaches to the hooks 118 of the concave 100 in addition to which direction the over-center latch 510, 610 will be accessible from. The over-center latch assembly 510, 610 will be discussed in greater detail in conjunction with FIGS. 106-107.

The MOG limiter 500, 600 further comprises the cross bars 512, 612 which are parallel to one another and spaced equally from one another so as to fit one cross bar 512, 612 between a pair of rub bars 112 on the concave 100. The cross bars 512, 612 can comprise substantially a parallelepiped shape. As opposed to the disruptors 200, 300, the MOG limiters 500, 600 are designed to allow grain to pass through gaps in between the rub bars 112 of the concave 100 by still leaving space for grain to fall through, and the MOG limiters 500, 600 are optimally used for alternating between larger and smaller types of grain.

FIGS. 33-37 show a concave assembly 700, which includes MOG limiters 500, 600 filling each position on an exterior of the concave 100.

As shown in FIGS. 33-37, the hinge points 504, 604 are inserted through the cross frame apertures 116 on the cross frame 114. Once inserted through, loops on the over-center latch assemblies 510, 610 interface with the hooks 118 and are latched down onto the hooks 118. Tension between the hooks 118 and over-center latch assemblies 510, 610 in addition to tension against the cross frame 114 from the hinge points 504, 604 maintain or support the MOG limitors 500, 600 against the exterior of the concave 100 without falling off. Additional support can be added by inserting a lock through the alignment apertures 120 which align with the alignment apertures 508, 608 though this is not required.

As shown in the figures, each of the over-center latch assemblies 510, 610 extend a distance away from the rub bars 112 due to the extended mounting portions 506, 606 and then attach to the hooks 118. This is to prevent grain that falls through the concave 100 from hitting the over-center latch assemblies 510, 610 thus streamlining sifting of grain in addition to making for easy access to the over-center latch assemblies 510, 610 for an operator standing to a side of the concave 100.

According to a preferred embodiment, the thickness of the rails is approximately 1 inch. According to yet another embodiment in need of an increase in concave open area (COA), the thickness of the rails is approximately ¼ inch where the distance in the outer surfaces of the rails 502, 602 remains the same.

In one embodiment, the MOG limiter 500, 600 is designed for use on a ⅝ inch round bar concave 100 having a ¾ inch gap between the rub bars 112.

In one embodiment the MOG limiter 500, 600 is designed for use with a ⅝ inch round bar concave 100 having a ⅞ inch gap between the rub bars 112.

In one embodiment, the face side of the MOG limiter 500, 600 is attached to the underside of the concave 100 utilizing on one end a hinge point at the end of each rail 500, 600 which is insertably retained in a slotted opening of a crossbar member positioned and affixed to the bottom side of the concave 100. On the other end, over-center latch assembly 510, 610 is used through which a bolt positioned on the concave 100 protrudes with retention accomplished by use of a washer and nut assembly.

In one embodiment the attachment means is adjustable so as to slidably move the inserts within the gaps between the concave crossbars so as to further control the opening remaining within said gaps.

In the MOG limiter embodiments, rounded notches can be made on the face side of each of the rails 502, 602 which conform to the rounded geometry of the rub bars 112 on the concave 100, and function to position the notched surface firmly against the underside of the concave 100 rub bar 112 depending on where the rounded notches are positioned.

The MOG limiters 500, 600 are of a length which approximates one-half of the curvilinear length of the concave 100. The MOG limiter 105 may be positioned between either of the first side frame 106 or the second side frame 108 and the center frame 110. In the cross frame 114 are positioned openings such as insert slots 116 to receive the hinge points 502, 602 located at distal ends of each of the rails 500, 600. The hinge points 502, 602 are slidably inserted into the insert slots 116 and then rotated upwardly to be positioned adjacent to and in conformity with the curvature of the underside of the concave 100 with the hook 118 holding the MOG limiters 500, 600 in place.

The MOG limiter 500, 600 facilitates restricting the opening between rub bars 112 allowing for small grains to drop through the concave 100 on either side of the insert while preventing MOG from passing through.

The MOG limiter 500, 600 as shown in FIGS. 23-32 are readily installed by the farmer or technician without requiring the assistance of a second person and are easily and quickly removed once installed. This functions to enhance the flexibility provided to the farmer who may make adjustments as to how many and where MOG limiters 500, 600 are positioned within the threshing section of the rotor chamber.

FIGS. 38-42 show a cover plate 800 for the right side of the concave 100 and FIGS. 43-47 show a cover plate 900 for the left side of the concave 100. The cover plate 800, 900 includes rails 802, 902, hinge points 804, 904, extended mounting portions 806, 906, alignment apertures 808, 908, an over-center latch assembly 810, 910, a back plate 812, 912, back plate ramps 814, 914, rub bar contacts 816, 916, and cross supports 818, 918.

The rails 802, 902 are curvilinear and are intended follow a same shape or be contoured to a shape that the concave 100 forms so as to be form fitted to an exterior surface of the concave 100 when attached thereto. The cover plates 800, 900 each include at least two rails 802, 902 which are parallel to one another. The rails 802, 902 include at their ends the hinge points 804, 904 and the extended mounting portions 806, 906, wherein the hinge points 804, 904 are at ends opposite the extended mounting portions 806, 906, and the hinge points 804, 904 comprise distal ends of the rails 802, 902, whereas the extended mounting portions 806, 906 need not extend from the rails 802, 902 at the distal ends opposite the hinge points 804, 904 but can extend from the rails 802, 902 substantially near the distal ends opposite the hinge points 804, 904. The hinge points 804, 904 comprise substantially pointed or rounded ends such that the rails 802, 902 begin tapering to form the hinge points 804, 904. Furthermore, the alignment apertures 808, 908 can be positioned anywhere along the rails 802, 902 and extend through the rails 802, 902 so as to align with the alignment apertures 120 on the concave 100.

The extended mounting portions 806, 906 extend outwardly away from the rails 802, 902 as a part of each of the two rails on each of the cover plates 800, 900, and transition into flat surfaces to which the over-center latch assembly 810, 910 can attach to. Each of the flat surfaces can form a common plane with one another such that it eases attachment of the over-center latch 810, 910 thereto. The extended mounting portions 806, 906 can be any shape that accomplish this extension transition such as rectangular, triangular, rhombus, stadium, oval, wavy combinations of any of these, lattice or truss structures with apertures extending therethrough, etc. The over-center latch assembly 810, 910 can attach downwardly (facing the flat surfaces at distal ends of the extended mounting portions 806, 906) or upwardly (facing away from the flat surfaces at distal ends of the extended mounting portions 806, 906), depending on a preference of the user or operator as to how a loop of the over-center latch attaches to the hooks 118 of the concave 100 in addition to which direction the over-center latch 810, 910 will be accessible from. The over-center latch assembly 810, 910 will be discussed in greater detail in conjunction with FIGS. 106-107.

The cover plate 800, 900 further includes the back plate 812, 912 attached atop the rails 802, 902. The back plate 812, 912 comprises a solid sheet of material that follows contours of the rails 802, 902. As such, the back plate 812, 912 is curvilinear in shape and will fit snuggly against the rub bars 112 of the concave 100 when placed against an exterior of the concave 100. A width of the back plate 812, 912 extends over each of the rails 802, 902. Further, the back plate 812, 912 additionally comprises back plate ramps 814, 914 that extend inwardly (with respect to a direction of curvature of the back plate 812, 912) at distal ends of the back plate 812, 912. In this regard, the back plate 812, 912 can fit snugly against exterior surfaces of the rub bars 112 of the concave 100 and the back plate ramps 814, 914 increase an amount of surface area contact against the rub bars 112 of the concave 100 by angling towards the rub bars 112 so as to reduce an amount of MOG and/or grain that can get stuck in between the rub bar 112 and the back plate 812, 912.

The rub bar contacts 816, 916 are specifically shaped to cradle the rub bars 112 on the concave 100. In this regard, when the cover plates 800, 900 are positioned on the concave 100 the rub bars 112 will sit snugly within the rub bar contacts 816, 916 which are each shaped as a concave configured to hold a cylindrical shaped object thereon.

Figure 39:
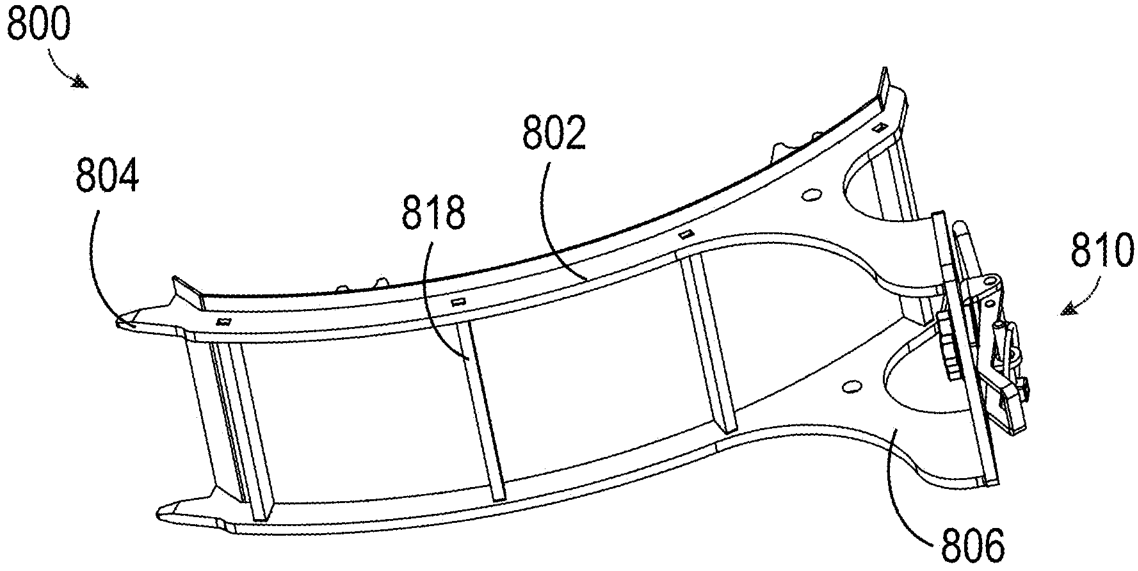
FIG. 39 shows a second perspective view of the first left cover plate of FIG. 38.
Figure 40:
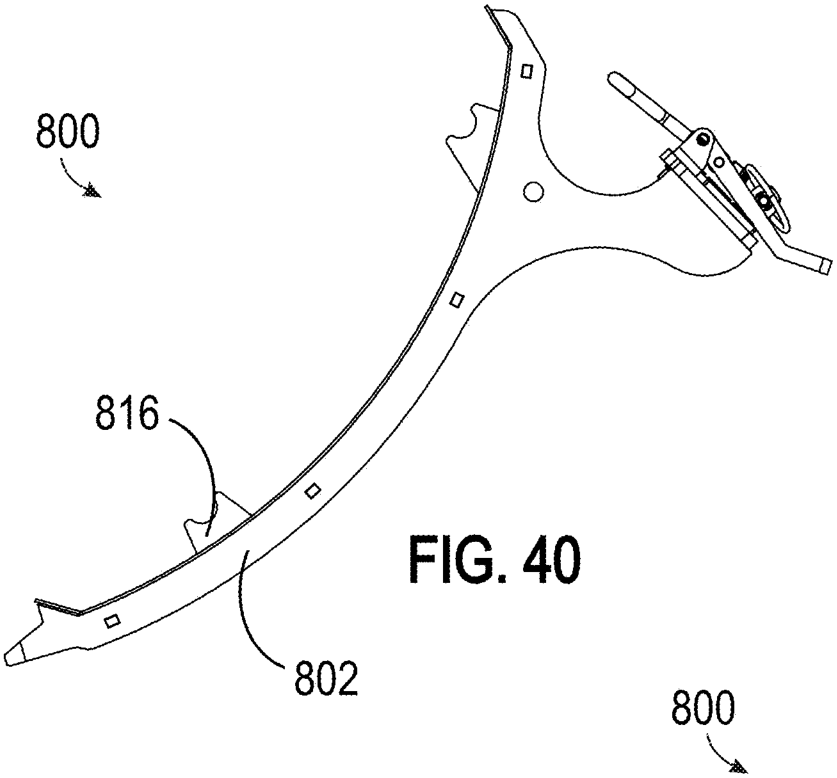
FIG. 40 shows a front elevation view of the first left cover plate of FIG. 38.
Figure 42:
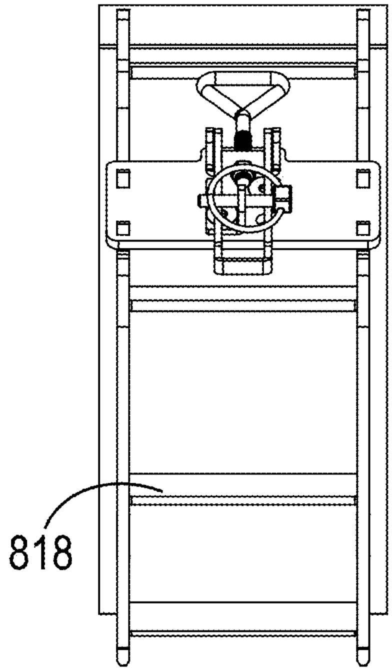
FIG. 42 shows a right-side elevation view of the first left cover plate of FIG. 38.
Figure 41:
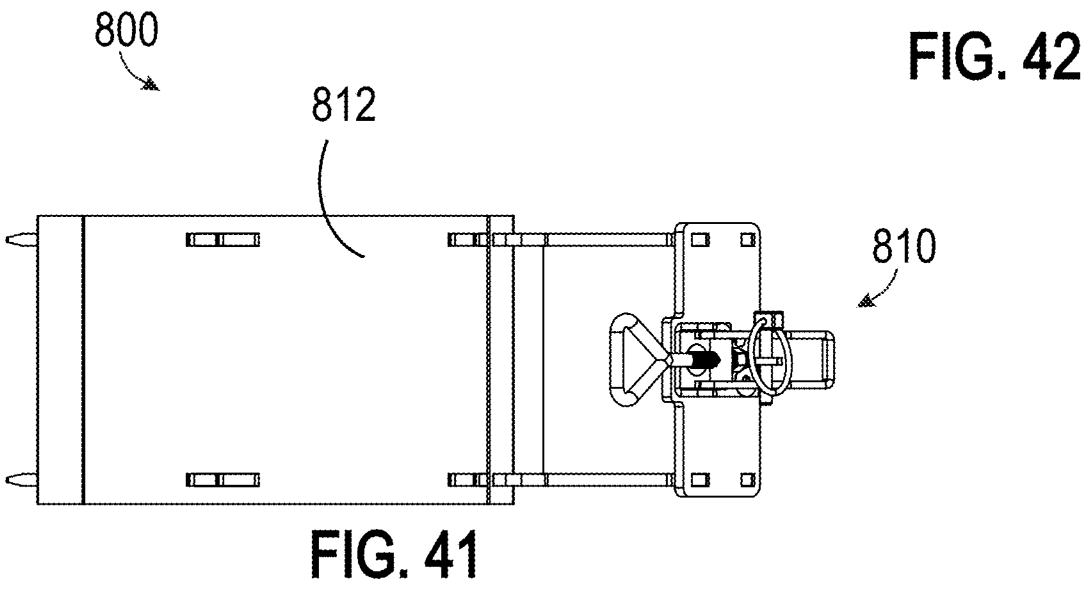
FIG. 41 shows a top plan view of the first left cover plate of FIG. 38.
Figure 43:
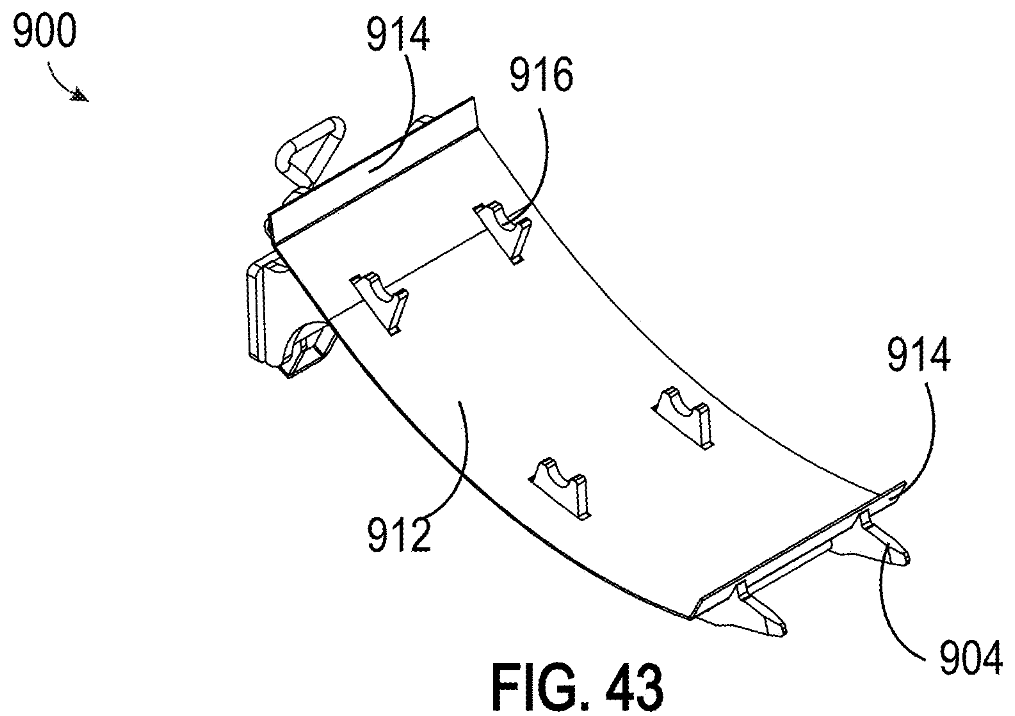
FIG. 43 shows a first perspective view for a first right cover plate for the first combine concave of FIG. 3.
Figure 44:
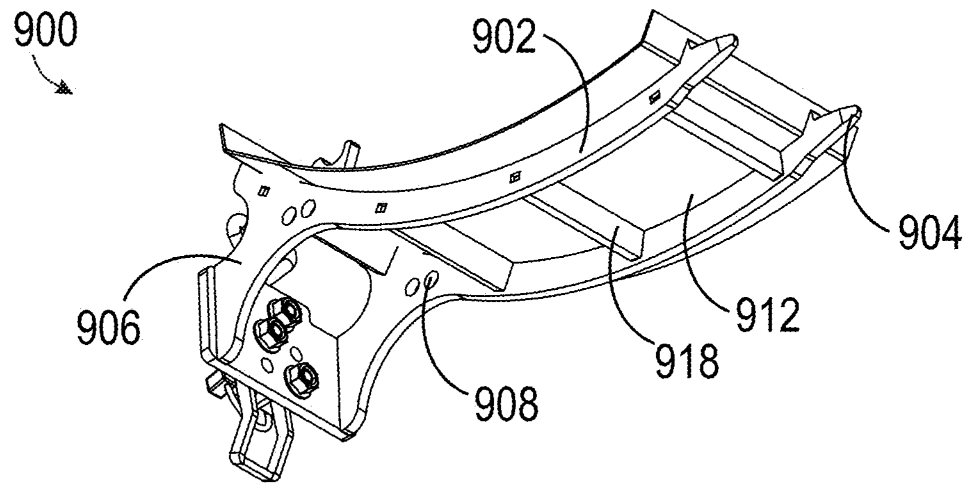
FIG. 44 shows a second perspective view of the first right cover plate of FIG. 43.
Figure 45:
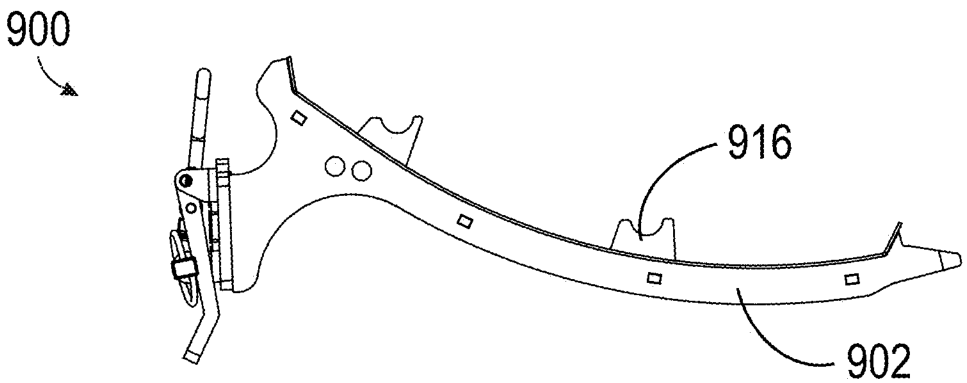
FIG. 45 shows a front elevation view of the first right cover plate of FIG. 43.
Figure 46:
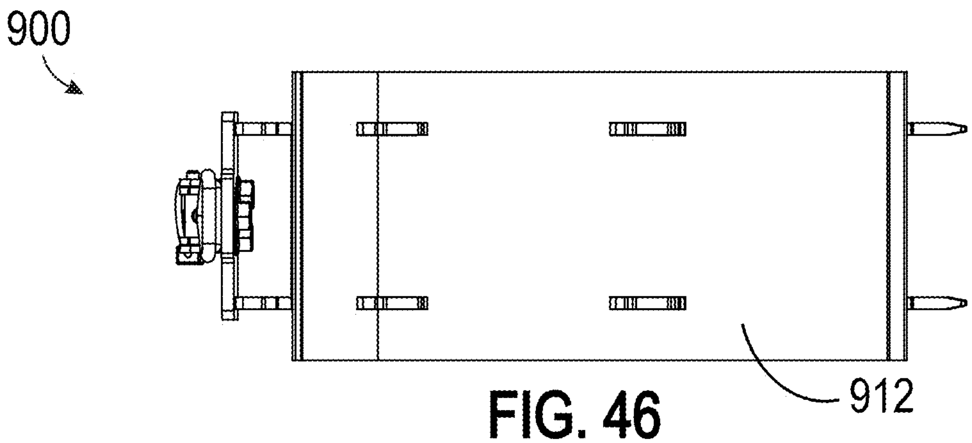
FIG. 46 shows a top plan view of the first right cover plate of FIG. 43.
Figure 47:
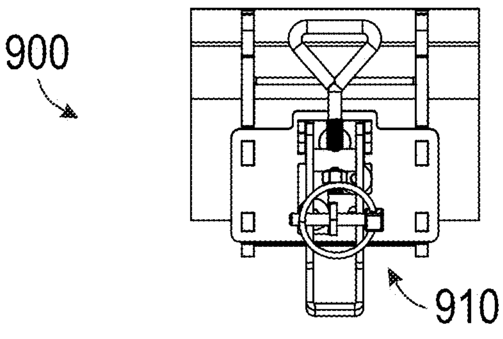
FIG. 47 shows a left-side elevation view of the first right cover plate of FIG. 43.
Figure 48:
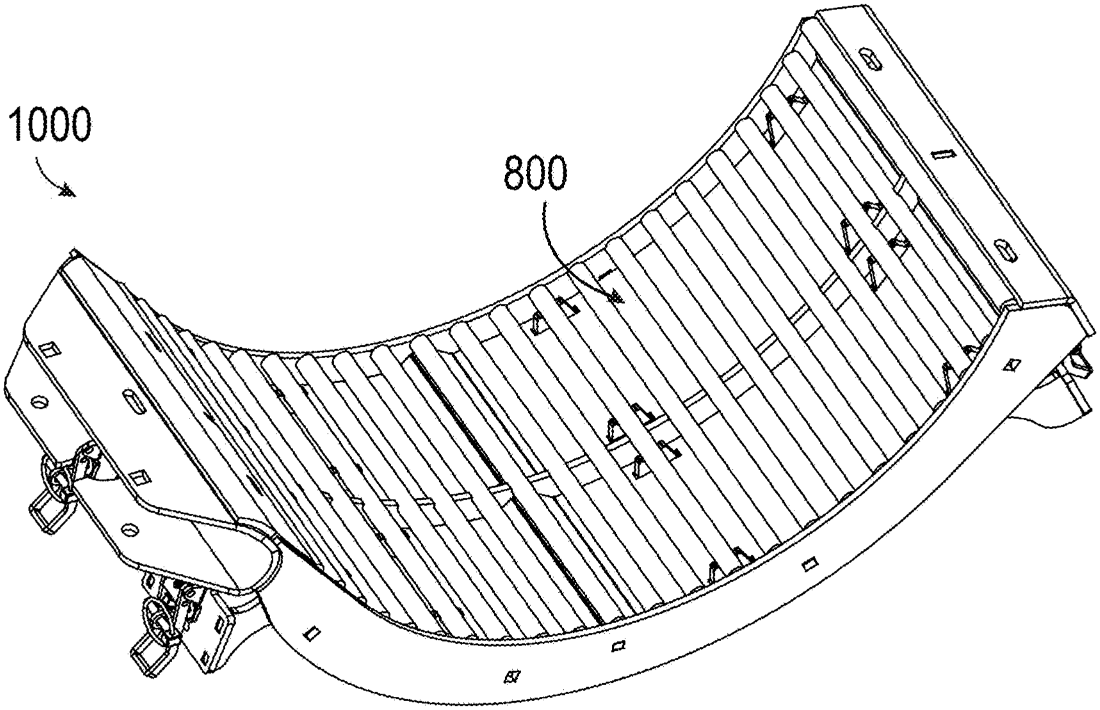
FIG. 48 shows a first perspective view of a first operational, cover plate assembly employing the first combine concave of FIG. 3, the first left cover plate of FIG. 38, and the first right cover plate of FIG. 43.
Figure 49:
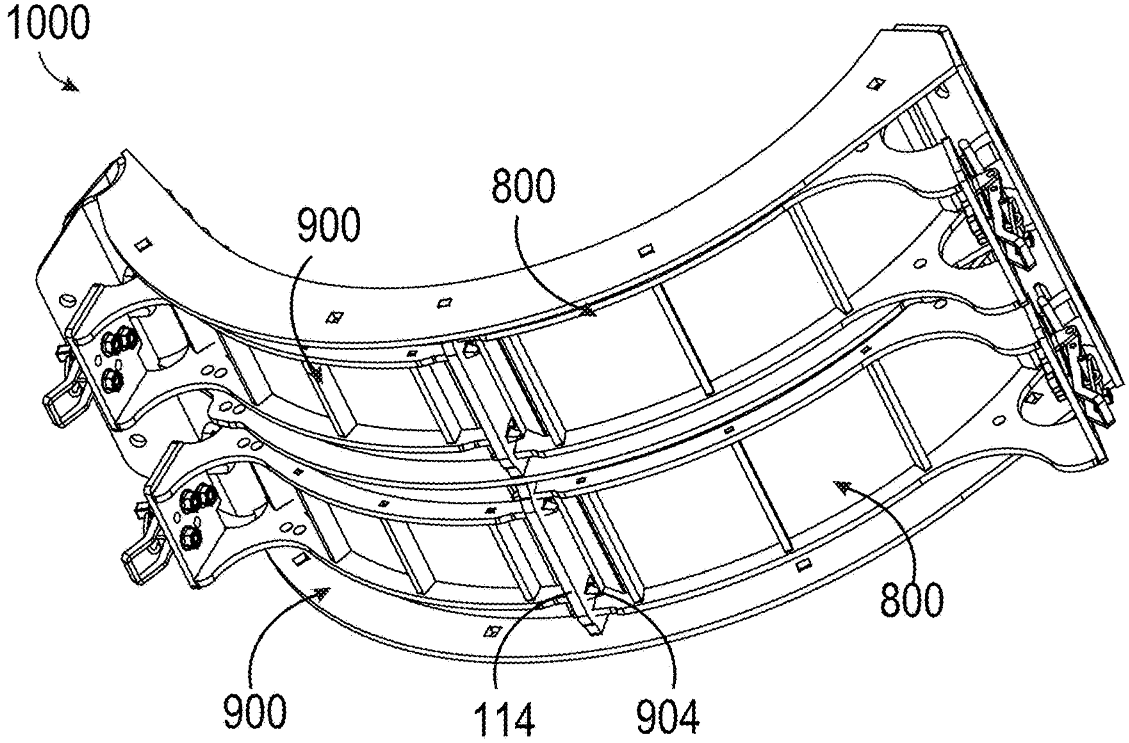
FIG. 49 shows a second perspective view of the first operational, cover plate assembly of FIG. 48.

Furthermore, cross supports 818, 918 can be seen in FIGS. 39 and 44 which comprise bars that extend between the rails 802, 902 for additional structural support to the cover plates 800, 900. The cross supports 818, 918 can be substantially parallelepiped in shape and can be spaced evenly along a bottom of the back plate 812, 912.

FIGS. 48-52 show a concave assembly 1000, which includes cover plates 800, 900 filling each position on an exterior of the concave 100.

As shown in FIGS. 48-52, the hinge points 804, 904 are inserted through the cross frame apertures 116 on the cross frame 114. Once inserted through, loops on the over-center latch assemblies 810, 910 interface with the hooks 118 and are latched down onto the hooks 118. Tension between the hooks 118 and over-center latch assemblies 810, 910 in addition to tension against the cross frame 114 from the hinge points 804, 904 maintain or support the cover plates 800, 900 against the exterior of the concave 100 without falling off. Additional support can be added by inserting a lock through the alignment apertures 120 which align with the alignment apertures 808, 908 though this is not required.

Figure 50:
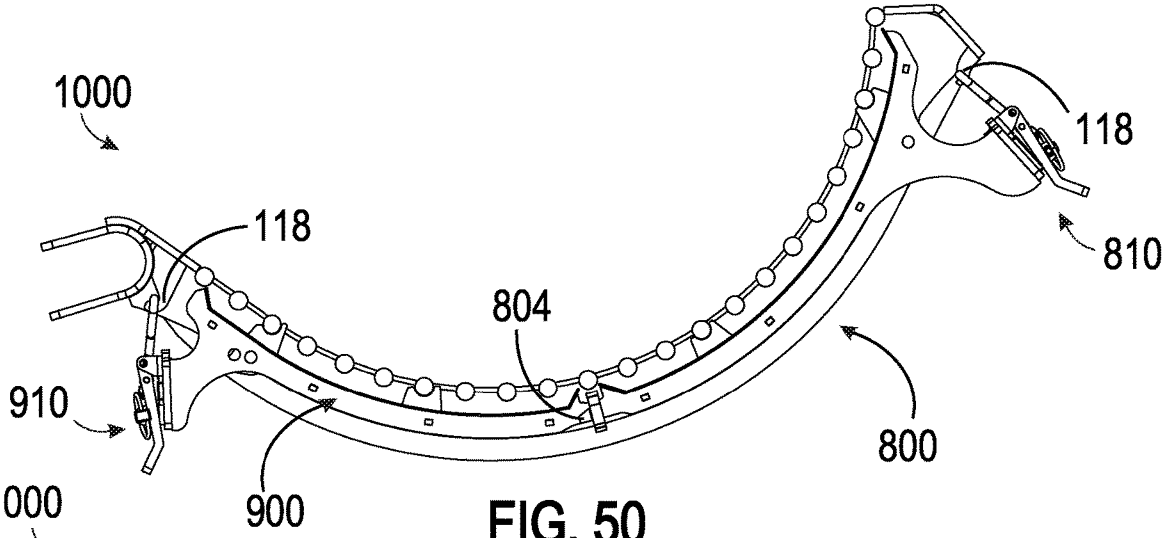
FIG. 50 shows a front elevation sectional view of the first operational, cover plate assembly of FIG. 48.
Figure 51:
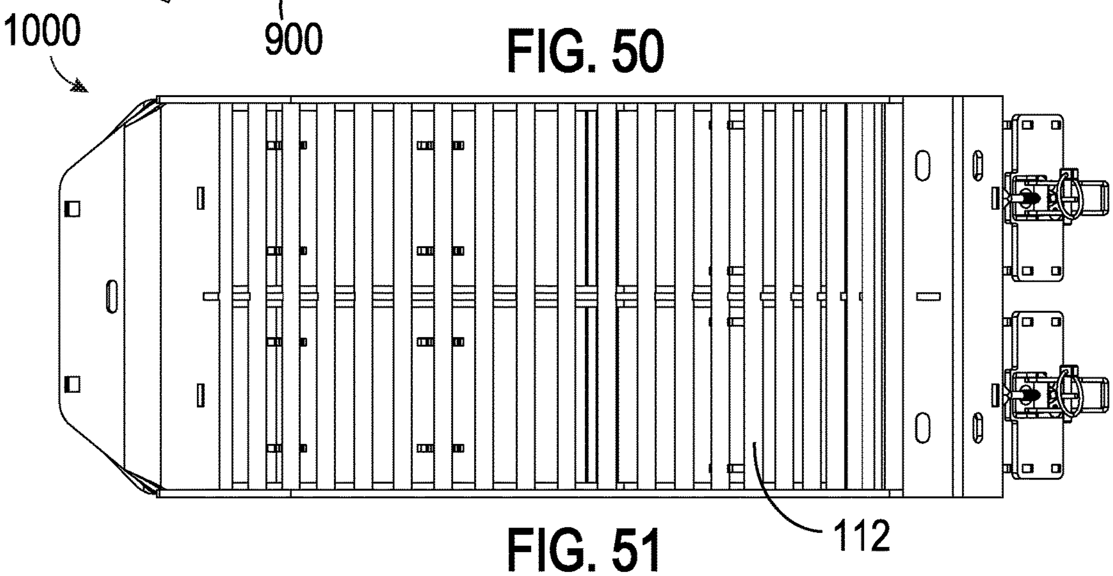
FIG. 51 shows a top plan view of the first operational, cover plate assembly of FIG. 48.
Figure 52:
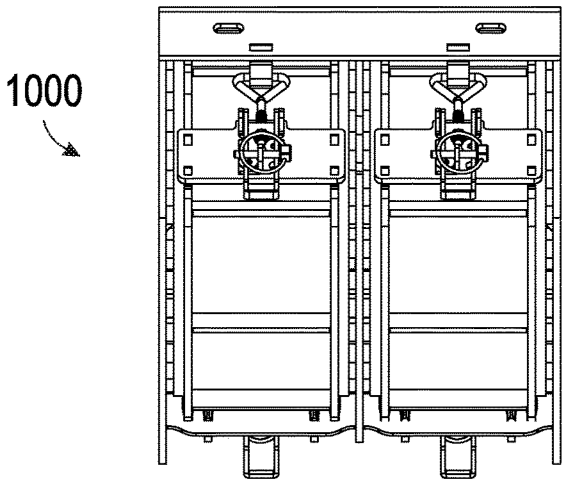
FIG. 52 shows a right-side elevation view of the second operational, cover plate assembly of FIG. 48.

As shown in the figures and can be most readily seen in FIG. 50, the back plate 812, 912 is not in direct contact with the rub bars 112. As such, this make for room in which MOG can accumulate in between gaps between the rub bars 112 and the back plate 812, 912. This makes for additional points of contact and pinch points for incoming MOG and grain passing through the threshing chamber 56.

The cover plate 800, 900 as shown in FIGS. 38-47 are readily installed by the farmer or technician without requiring the assistance of a second person and are easily and quickly removed once installed. This functions to enhance the flexibility provided to the farmer who may make adjustments as to how many and where cover plates 800, 900 are positioned within the threshing section of the rotor chamber.

The cover plate 800, 900 is primarily used to prevent MOG and grain from falling through the concave 100. The cover plates 800, 900 retain plant material to fill the large openings and create a mattress-type surface. The matte of plant material provides a gentle & natural rubbing action against each other as they travel over the horizontal grain separation bars while retaining the material in chamber for enough time to complete even the tough or green pods. The cover plates 800, 900 also allow the operator to run the bottom sieve further open, pushing more air through the top sieve, reducing pod material in the tank. The use of natural plant materials reduces the chances of the rotor splitting soybeans over the longer duration in the chamber.

Use of the cover plates 800, 900 allows for a more complete thresh, reduces tailings, and creates a cleaner grain sample.

FIGS. 53-57 show a concave 1100. The concave 1100 includes an upper concave connecter 1102 on a first side 1103, a lower concave connector 1104 on a second side 1105, a first side frame 1106, a second side frame 1108, a center frame 1110, rub bars 1112, a cross frame 1114, cross frame apertures 1116, hooks 1118, and alignment apertures 1120.

The upper concave connector 1102 is separated from the lower concave connector 1104 by the first side frame 1106, the second side frame 1108, and the center frame 1110. Each of the first side frame 1106, the second side frame 1108, and the center frame 1110 are attached to the upper concave connector 1102 on the first side 1103 and the lower concave connector 1104 on the second side 1105. The upper concave connector 1102 comprises two flat surfaces that extend from the first side frame 1106 to the second side frame 1108. The lower concave connector 1104 comprises a single flat surface extending between the first side frame 1106 and the second side frame 1108 in addition to two frame extensions each extending from either of the first side frame 1106 or the second side frame 1108 with diagonal support pieces extending therebetween.

Each of the first side frame 1106, the second side frame 1108, and the center frame 1110 comprise a curvilinear shape, namely, an arc with a continuous curve (non-jointed) intended to partially surround a rotating rotor without being strictly confined to a constant radius (it can include straight portions therein). The upper concave connector 1102, the first side frame 1106, the lower concave connector 1104, and the second side frame 1108 comprise a boundary for the concave 1100, and the center frame 1110 is additional support extending from the upper concave connector 1102 and the lower concave connector 1104 centered between the first side frame 1106 and the second side frame 1108.

The concave 1100 further comprises rub bars 1112 extending from the first side frame 1106 to the second side frame 1108. The rub bars 1112 can be cylindrical in shape. Each of the rub bars 1112 are parallel to one another and are parallel to the upper concave connector 1102 and the lower concave connector 1104. When viewed from a side or at a profile view which can best be seen in FIG. 55, the rub bars 1112 can emerge ever so slightly inwardly (or over) each of the first side frame 1106, the second side frame 1108, and the center frame 1110 to cause MOG and grain (when being spread over a surface of the concave) to interface with the rub bars 1112 in a jostled motion rather than smoothly gliding over any of the first side frame 1106, the second side frame 1108, or the center frame 1110.

At a position along a length of the first side frame 1106, the second side frame 1108, and the center frame 1110 in between the upper concave connector 1102 and the lower concave connector 1104, the cross frame 1114 extends from the first side frame 1106 to the second side frame 1108. The cross frame 1114 can comprise two cross frames, a first cross frame and a second cross frame, in which the first cross frame extends from the first side frame 1106 to the center frame 1110 and the second cross frame extends from the center frame 1110 to the second side frame 1108. The cross frame 1114 includes cross frame apertures 1116 therethrough. As seen in the figures, eight cross frame apertures 1116 are shown (or four cross frame apertures 1116 per each of the first cross frame and the second cross frame).

At each of end of the concave 1100 are the hooks 1118. The hooks 1118 each extend outwardly from the concave 1100 from the upper concave connector 1102 and from the lower concave connector 1104. There is one hook per every fourth of the concave 1100 to assist with holding one of a MOG limiter, a disruptor, or a cover plate against an exterior surface of the concave 1100, as discussed in conjunction with FIG. 2 which shows various examples of these inserts taking up quarter portions of any given concave. These hooks 1118 in combination with the cross frame apertures 1116 secure inserts to the concave 1100. The hooks 1118 are designed to be placed juxtaposed the cross frame apertures 1116 such that any given insert will have a single hook 1118 at one end of the insert and a pair of cross frame apertures 1116 at a second end of the insert. As such, the hooks 1118 are placed on each end of the concave 1100 (the upper concave connector 1102 and the lower concave connector 1104) and the cross frame apertures 1116 are placed at a center of the concave 1100 to face each end of the concave 1100. The alignment apertures 1120 can further aid in securing inserts to the concave 1100 and are positioned on the center frame 1110 of the concave.

Figure 53:
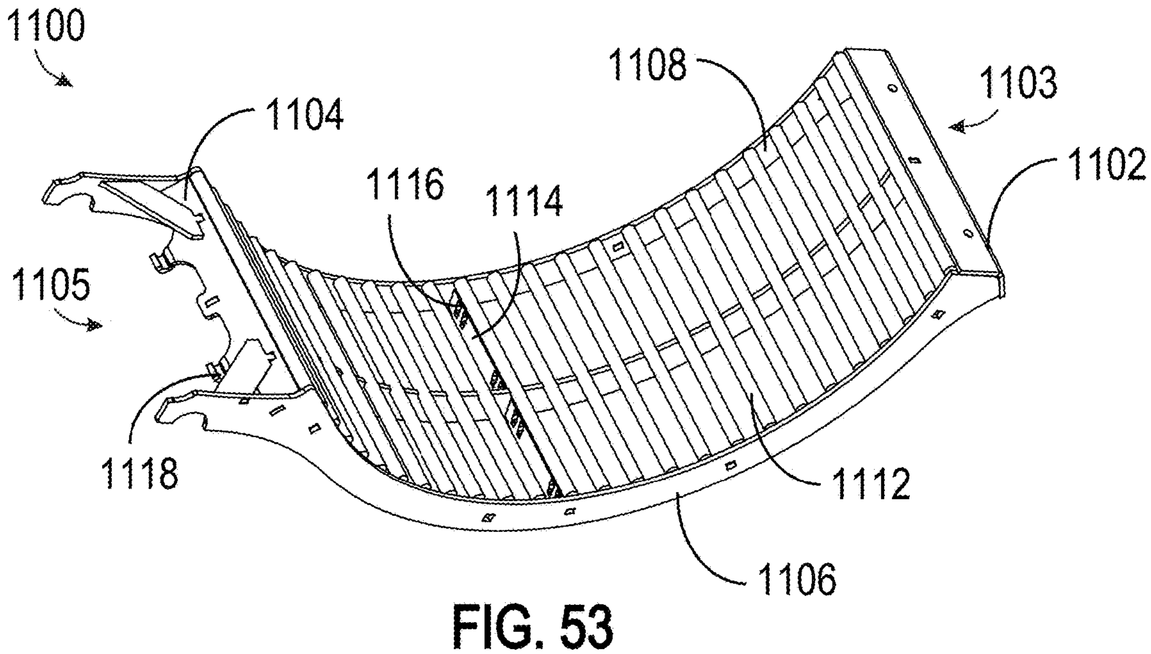
FIG. 53 shows a first perspective view of a second combine concave.
Figure 54:
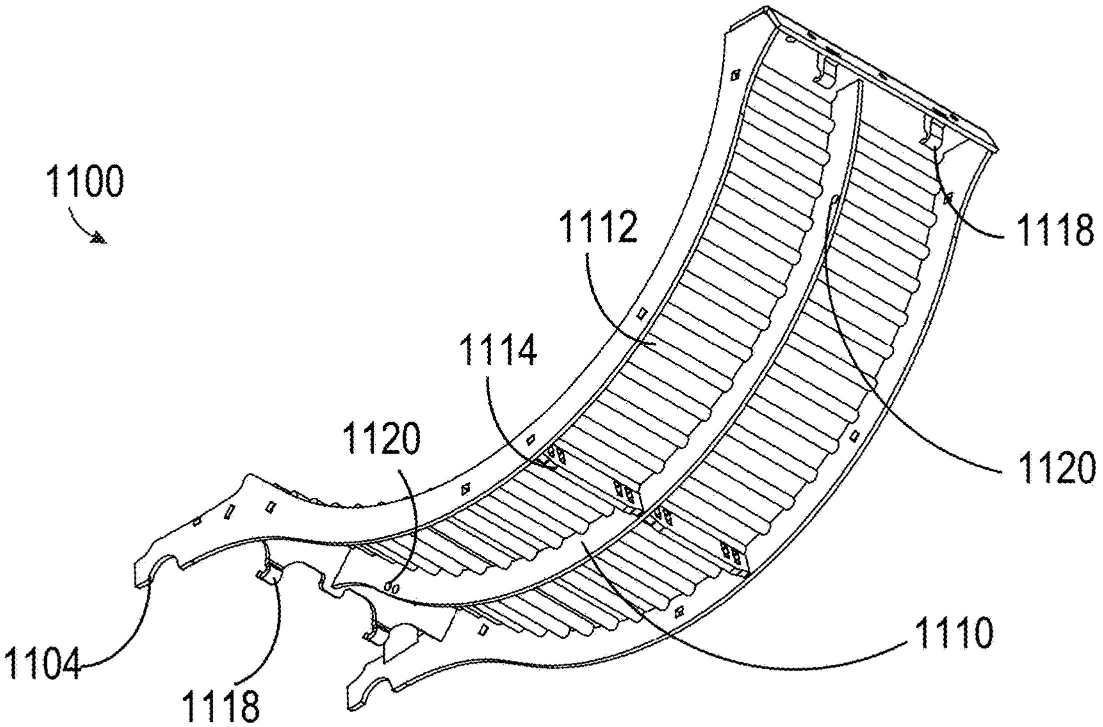
FIG. 54 shows a second perspective view of the second combine concave of FIG. 53.
Figure 55:
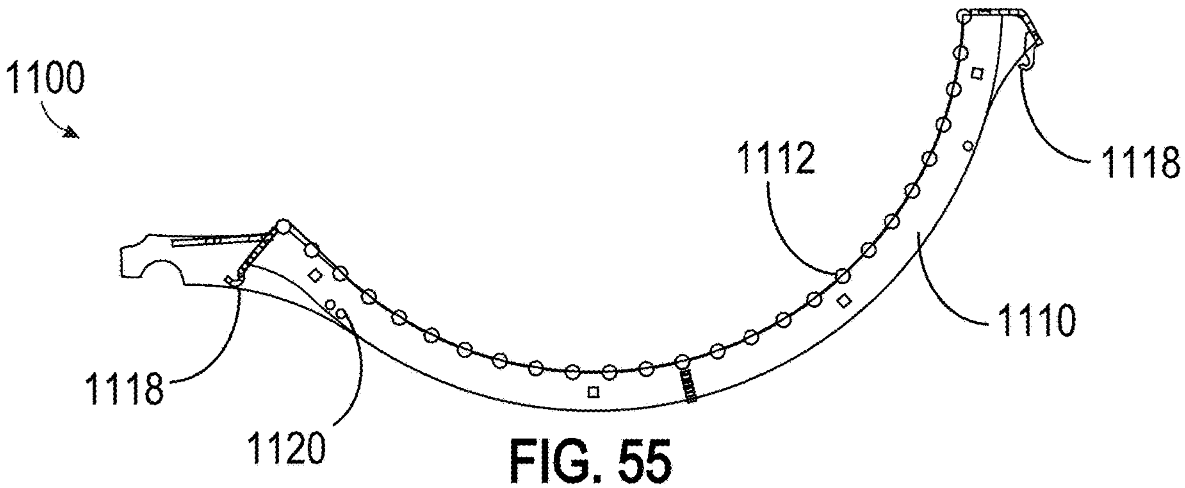
FIG. 55 shows a front elevation sectional view of the second combine concave of FIG. 53.
Figure 56:
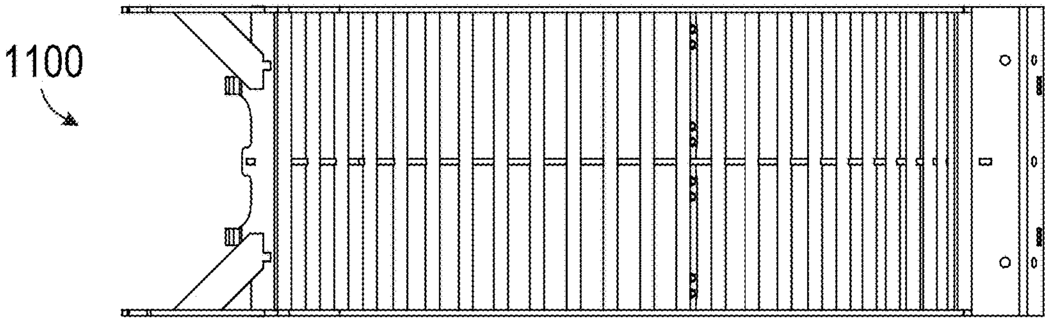
FIG. 56 shows a top plan view of the second combine concave of FIG. 53.
Figure 57:
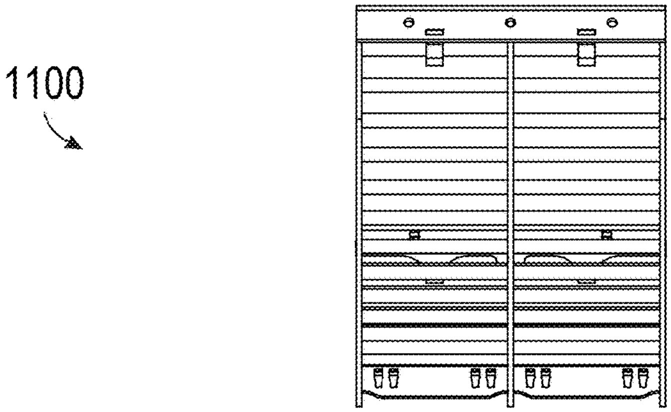
FIG. 57 shows a right-side elevation view of the second combine concave of FIG. 53.
Figure 58:
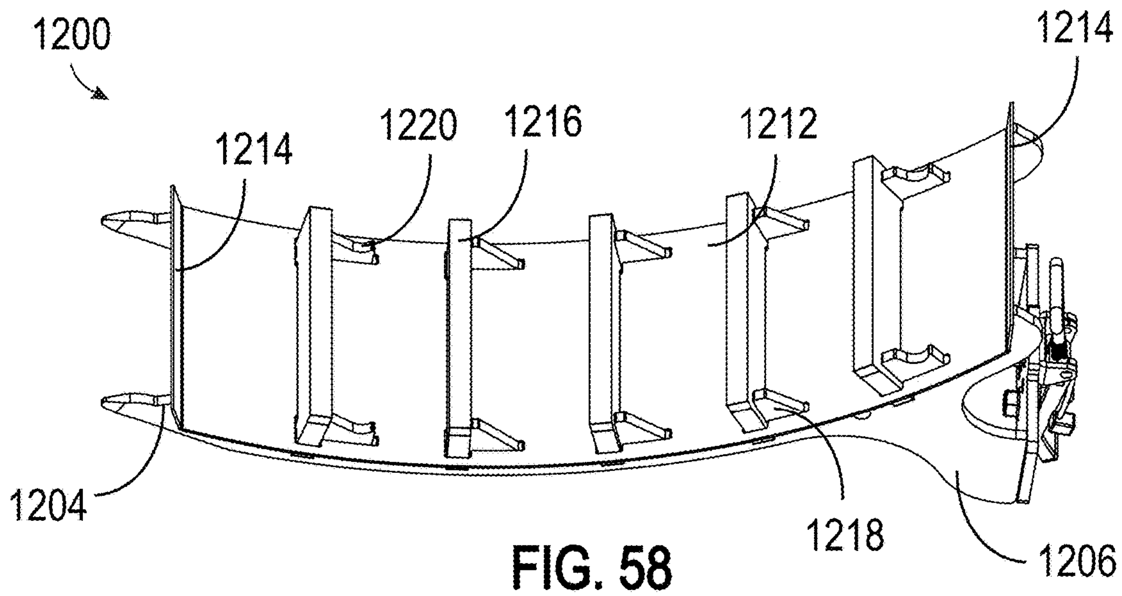
FIG. 58 shows a first perspective view of a second left disruptor for the second combine concave of FIG. 53.

In the concave 1100 having the center frame 1110 on the underside as shown in FIG. 53 and utilizing a disruptor or a MOG limiter (as depicted in FIGS. 68-72, and 83-87), there are four quadrants existing on the underside of the concave 1100. The farmer can install MOG limiters in one or all four quadrants of the concave 1100 (which is shown at position #3 in FIG. 52) to enhance the retention of MOG within the rotor chamber of the combine.

As shown in FIGS. 53-57 concaves 1100 are elongated, heavy, and curvilinear. In the combine 50, several concaves 1100 work in tandem to thresh and separate grain from MOG and are positioned in series. The concaves 1100 represent a substantial expense if differing concave designs are used by the farmer. Further, concaves 1100 are difficult and time-consuming to change out in a combine. At harvest, time is critical to take-in the crop at the optimal time as conditions for harvest change with the weather. Thus, the dilemma presented to the farmer is which concave design to use within the combine and whether to change-out the concaves or live with what is in place when the combine is originally set-up for harvest.

For example, concaves 1100 that are used in the harvest of smaller grains can include narrower gaps and/or openings to limit the amount of MOG that drops out of the chamber and into the cleaning system. Concaves 1100 that are intended for the harvest of larger grains should include gaps that still allow the larger grains to drop out of the chamber and into the cleaning system.

The concaves 1100 are generally constructed from stainless steel or plastic. The materials that are used to construct the concaves 1100 should be high-quality durable materials that stand up to wear and tear over repeated use without losing their threshing efficiency.

The concaves 1100 are also preferably kept in good condition so that they can effectively separate grain from chaff without becoming clogged or damaged by stray stones or other foreign objects in the field. Maintenance of the concaves 1100 can be a key part of achieving optimal performance for the concaves 1100. The concaves 1100 must not only be kept free from debris, but also the farmer should periodically evaluate whether the openings in the concaves 1100 are an appropriate size for the crop to be harvested.

However, because of the aforementioned hardship(s) associated with changing out the concaves 1100, it is highly desired to be able to use concaves 1100 that are suitable for both larger and smaller grains. One such solution is to always use concaves 1100 that are suitable for larger grains, and to attach removable inserts which narrow the gaps and/or openings when harvesting smaller grains or entirely close off the openings. The removable inserts could, for example, attach to the concaves 1100 at the hooks 1118 and cross frame apertures 1116 shown in FIGS. 53-57.

FIGS. 58-62 show a disruptor 1200 for the right side of the concave 1100 and FIGS. 63-67 show a disruptor 1300 for the left side of the concave 1100. The disruptor 1200, 1300 includes rails 1202, 1302, hinge points 1204, 1304, extended mounting portions 1206, 1306, alignment apertures 1208, 1308, an over-center latch assembly 1210, 1310, a back plate 1212, 1312, back plate ramps 1214, 1314, ridges 1216, 1316, ridge stabilizers 1218, 1318, rub bar contacts 1220, 1320, and cross supports 1222, 1322.

The rails 1202, 1302 are curvilinear and are intended follow a same shape or be contoured to a shape that the concave 1100 forms so as to be form fitted to an exterior surface of the concave 1100 when attached thereto. The disruptors 1200, 1300 each include at least two rails 1202, 1302 which are parallel to one another. The rails 1202, 1302 include at their ends the hinge points 1204, 1304 and the extended mounting portions 1206, 1306, wherein the hinge points 1204, 1304 are at ends opposite the extended mounting portions 1206, 1306, and the hinge points 1204, 1304 comprise distal ends of the rails 1202, 1302, whereas the extended mounting portions 1206, 1306 need not extend from the rails 1202, 1302 at the distal ends opposite the hinge points 1204, 1304 but can extend from the rails 1202, 1302 substantially near the distal ends opposite the hinge points 1204, 1304. The hinge points 1204, 1304 comprise substantially pointed or rounded ends such that the rails 1202, 1302 begin tapering to form the hinge points 1204, 1304. Furthermore, the alignment apertures 1208, 1308 can be positioned anywhere along the rails 1202, 1302 and extend through the rails 1202, 1302 so as to align with the alignment apertures 1120 on the concave 1100.

The extended mounting portions 1206, 1306 extend outwardly away from the rails 1202, 1302 as a part of each of the two rails on each of the disruptors 1200, 1300, and transition into flat surfaces to which the over-center latch assembly 1210, 1310 can attach to. Each of the flat surfaces can form a common plane with one another such that it eases attachment of the over-center latch 1210, 1310 thereto. The extended mounting portions 1206, 1306 can be any shape that accomplish this extension transition such as rectangular, triangular, rhombus, stadium, oval, wavy combinations of any of these, lattice or truss structures with apertures extending therethrough, etc. The over-center latch assembly 1210, 1310 can attach downwardly (facing the flat surfaces at distal ends of the extended mounting portions 1206, 1306) or upwardly (facing away from the flat surfaces at distal ends of the extended mounting portions 1206, 1306), depending on a preference of the user or operator as to how a loop of the over-center latch attaches to the hooks 1118 of the concave 1100 in addition to which direction the over-center latch 1210, 1310 will be accessible from. The over-center latch assembly 1210, 1310 will be discussed in greater detail in conjunction with FIGS. 106-107.

The disruptor 1200, 1300 further includes the back plate 1212, 1312 attached atop the rails 1202, 1302. The back plate 1212, 1312 comprises a solid sheet of material that follows contours of the rails 1202, 1302. As such, the back plate 1212, 1312 is curvilinear in shape and will fit snuggly against the rub bars 1112 of the concave 1100 when placed against an exterior of the concave 1100. A width of the back plate 1212, 1312 extends over each of the rails 1202, 1302. Further, the back plate 1212, 1312 additionally comprises back plate ramps 1214, 1314 that extend inwardly (with respect to a direction of curvature of the back plate 1212, 1312) at distal ends of the back plate 1212, 1312. In this regard, the back plate 1212, 1312 can fit snugly against exterior surfaces of the rub bars 1112 of the concave 1100 and the back plate ramps 1214, 1314 increase an amount of surface area contact against the rub bars 1112 of the concave 1100 by angling towards the rub bars 1112 so as to reduce an amount of MOG and/or grain that can get stuck in between the rub bar 1112 and the back plate 1212, 1312.

The disruptors 1200, 1300 further comprise the ridges 1216, 1316 positioned on a top of the back plate 1212, 1312. As shown in FIGS. 58-67, the ridges 1216, 1316 span substantially a width of the back plate 1212, 1312 and extend away from the back plate 1212, 1312 inwardly (with respect to a direction of curvature of the back plate 1212, 1312). The ridges 1216, 1316 are intended to extend in between the rub bars 1112 of the concave 1100. As such, the ridges 1216, 1316 can be spaced such that a single ridge 1216, 1316 can extend between each of a gap between rub bars 1112 on the concave 1100. The ridges 1216, 1316 can be secured to the back plate 1312, 1312 via weld. The ridges 1216, 1316 can include portions that extend through back plate 1212, 1312 and attach or clamp onto the rails 1202, 1302.

The ridges 1216, 1316 can be additionally held in place via the ridge stabilizers 1218, 1318. The ridge stabilizers 1218, 1318 comprise studs or teeth protruding from the back plate 1212, 1312 to grasp the ridges 1216, 1316. The ridge stabilizers 1218, 1318 can be any suitable shape to accomplish this, so long as the shape includes direct physical contact with the ridges 1216, 1316. As shown, the ridge stabilizers 1218, 1318 comprise partial frustum shapes including angled portions extending away from the back plate 1212, 1312 with substantially flat tops in which a portion of the partial frustum shape is not angled but is flush with an outer surface of the ridges 1216, 1316. These outer surfaces of the ridges 1216, 1316 extend substantially orthogonally away from the back plate 1212, 1312, whereas the ridge stabilizers 1218, 1318 comprise thicker base portions in contact with back plate 1212, 1312 and thinner distal portions away from the back plate 1212, 1312 thus increasing stabilizing capacity of holding the ridges 1216, 1316 with diagonal geometry much like trusses on a bridge while also slightly reducing weight of the disruptors 1200, 1300 by refraining from including ridge stabilizers 1218, 1318 that are a uniform thickness or ridge stabilizers 1218, 1318 that span a same height or width as the ridges 1216, 1316.

As shown in the figures, rub bar contacts 1220, 1320 can also abut the ridges 1216, 1316. As opposed to the ridge stabilizers 1218, 1318, the rub bar contacts 1220, 1320 are specifically shaped to cradle the rub bars 1112 on the concave 1100. In this regard, when the disruptors 1200, 1300 are positioned on the concave 1100 the rub bars 1112 will sit snugly within the rub bar contacts 1220, 1320 which are each shaped as a concave configured to hold a cylindrical shaped object thereon. The rub bar contacts 1220, 1320 are positioned adjacent the ridges 1216, 1316 such that the rub bars 1112 will abut the ridges 1216, 1316 that are adjacent the rub bar contacts 1220, 1320 and additionally each of the ridges 1216, 1316 when the ridges 1216, 1316 are spaced uniformly on the disruptor 1200, 1300.

As shown in the figures, the rub bar contacts 1220, 1320 are consistent in their placement of always being on a side of the ridges 1216, 1316 that is opposite the ridge stabilizers 1218, 1318. However, as can be readily seen as a difference between the disruptor 1200 shown in FIGS. 58-62 and the disruptor 1300 shown in FIGS. 63-67, the rub bar contacts 1220 of the disruptor 1200 in FIGS. 58-62 are each placed on a side of the ridges 1216 that face the hinge points 1204 rather than the over-center latch assembly 1210. In contrast, the rub bar contacts 1320 of the disruptor 1300 in FIGS. 63-67 are each placed on a side of the ridges 1316 that face the over-center latch assembly 1310 rather than the hinge points 1304. In this regard, when the disruptors 1200, 1300 are placed opposite one another on an exterior of the concave 1100, the ridges 1216, 1316 will always be on a same side of the rub bars 1112 for purposes of MOG-and-grain's direction of flow within the concave 1100 around the rotor in the threshing chamber 56. This configuration is most readily seen in FIG. 70 in which the rub bars 1112 are always on a left side of the ridges 1216, 1316 despite having the disruptor 1200 and the disruptor 1300 facing opposite one another.

Figure 59:
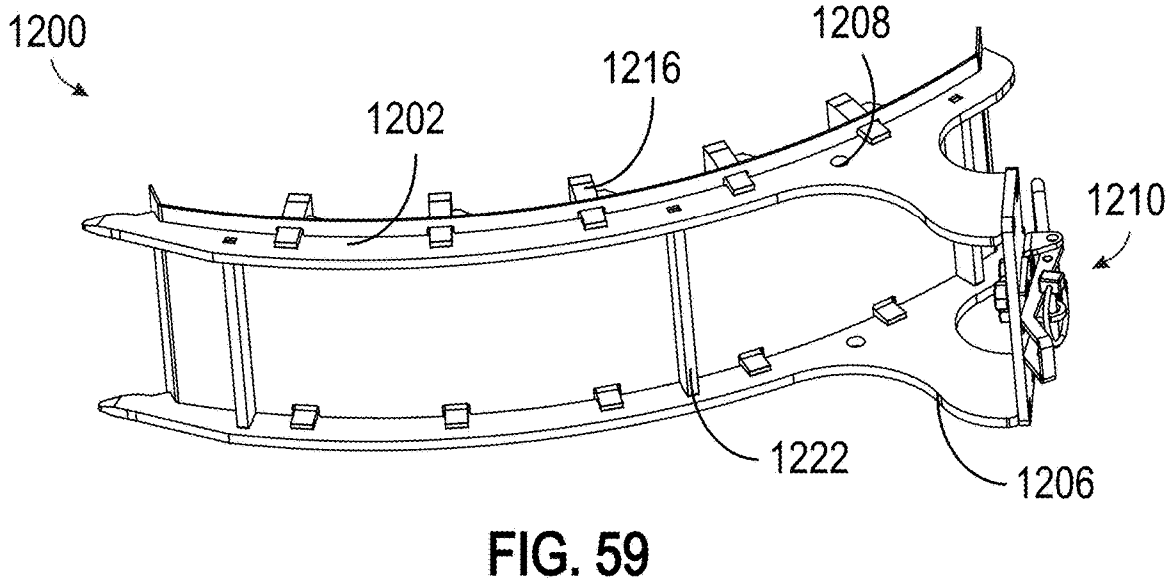
FIG. 59 shows a second perspective view of the second left disruptor of FIG. 56.
Figure 60:
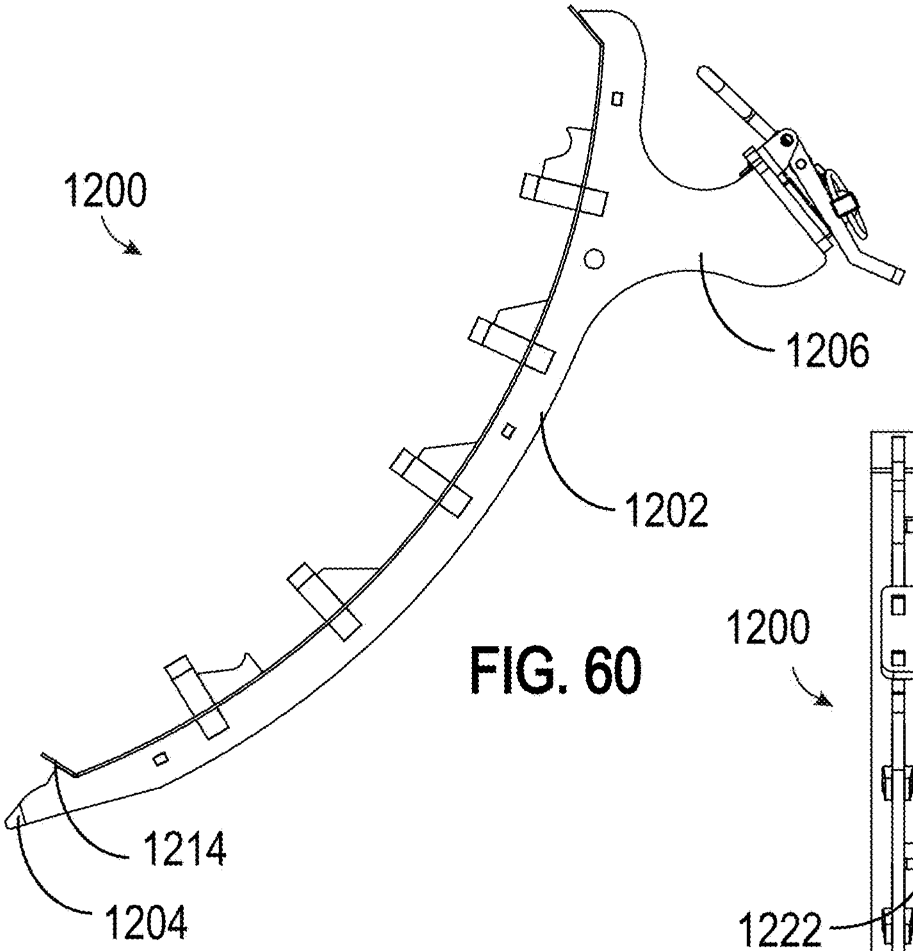
FIG. 60 shows a front elevation view of the second left disruptor of FIG. 56.
Figure 62:
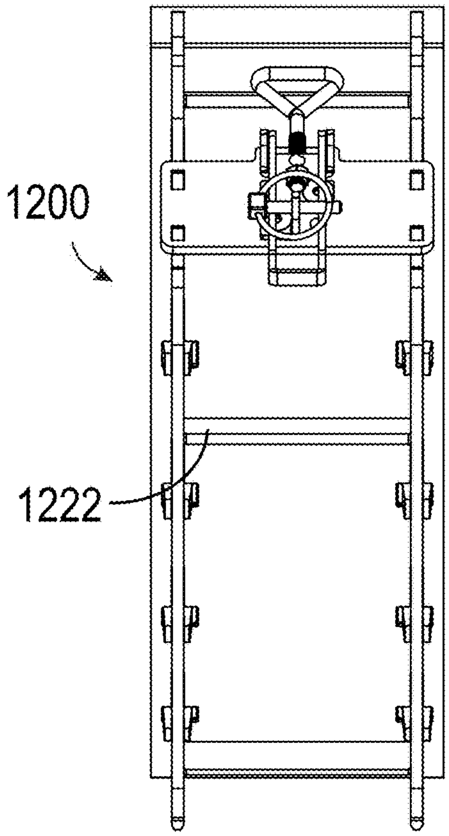
FIG. 62 shows a right-side elevation view of the second left disruptor of FIG. 56.
Figure 61:
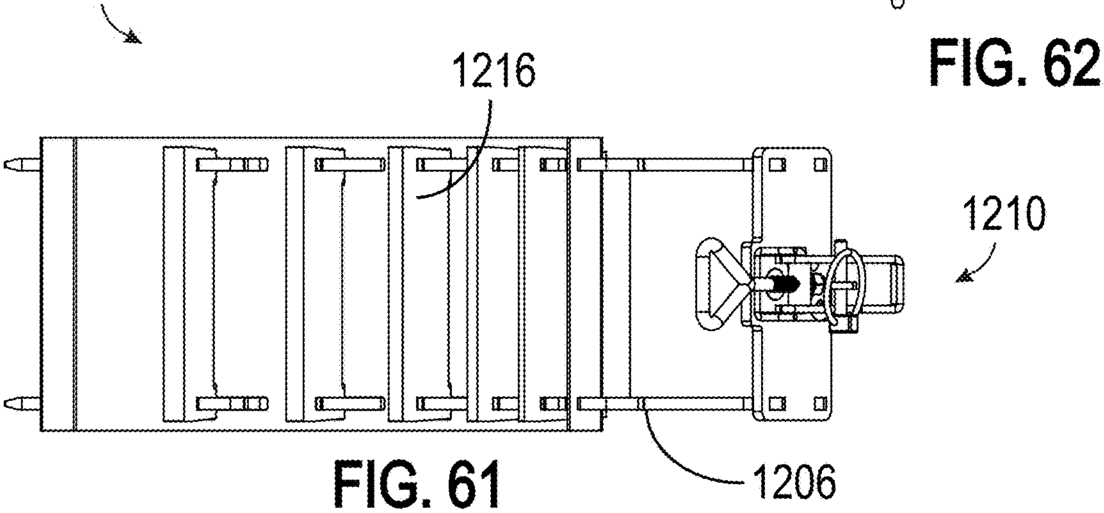
FIG. 61 shows a top plan view of the second left disruptor of FIG. 56.
Figure 63:
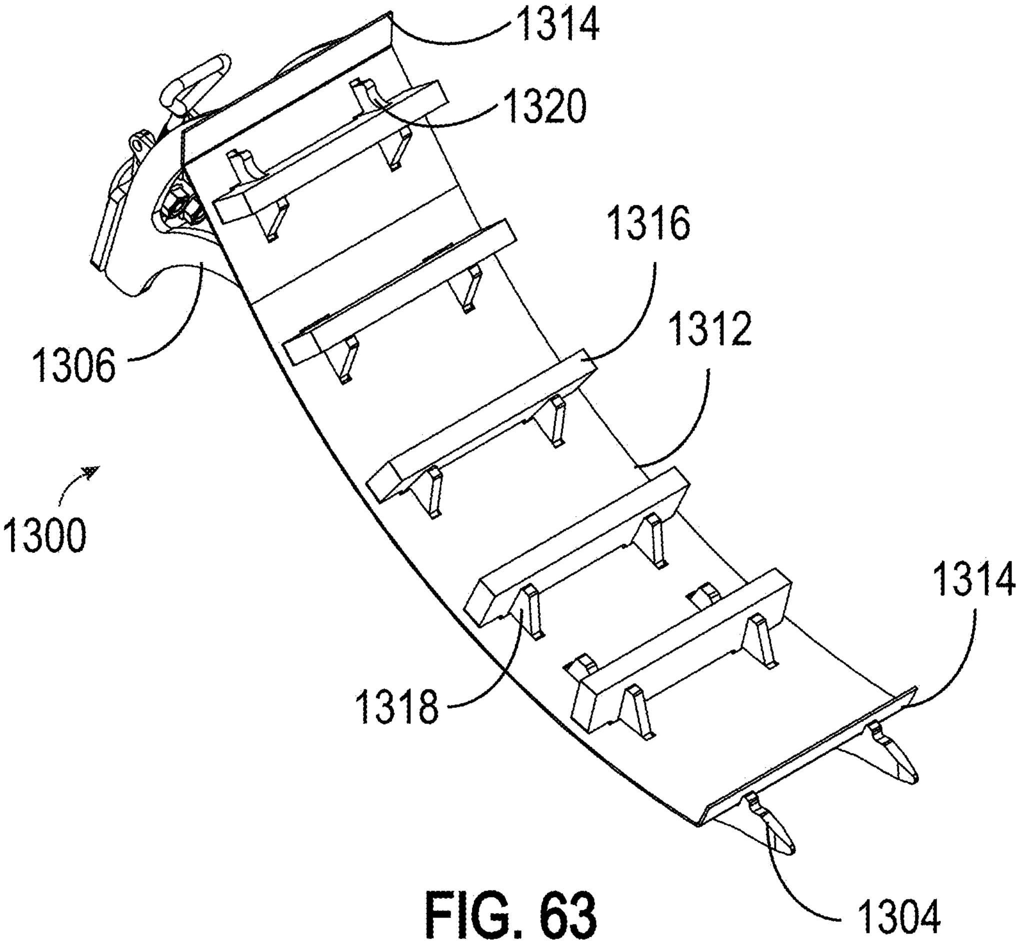
FIG. 63 shows a first perspective view for a second right disruptor for the second combine concave of FIG. 53.
Figure 64:
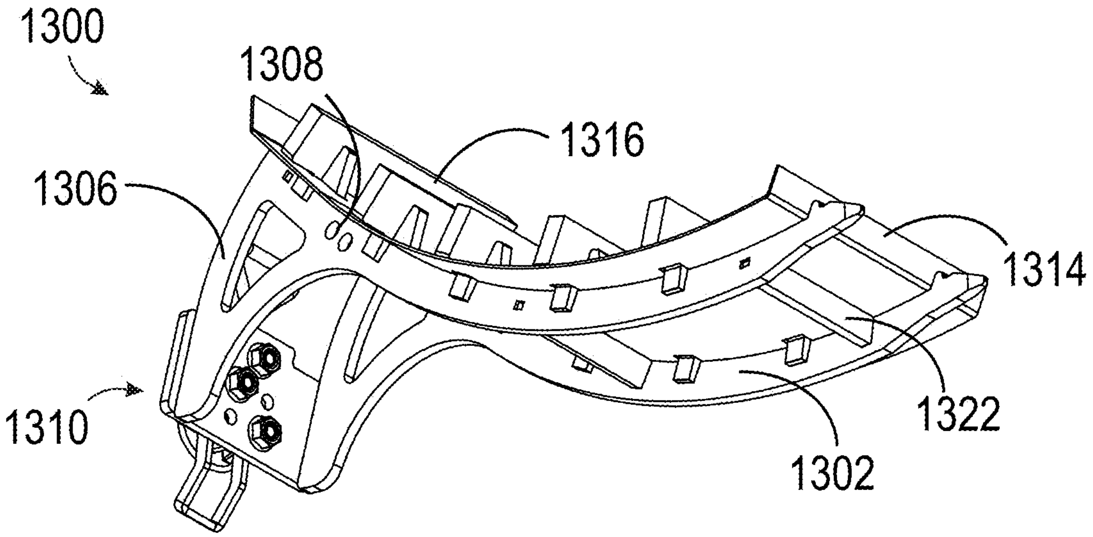
FIG. 64 shows a second perspective view of the second right disruptor of FIG. 63.
Figure 65:
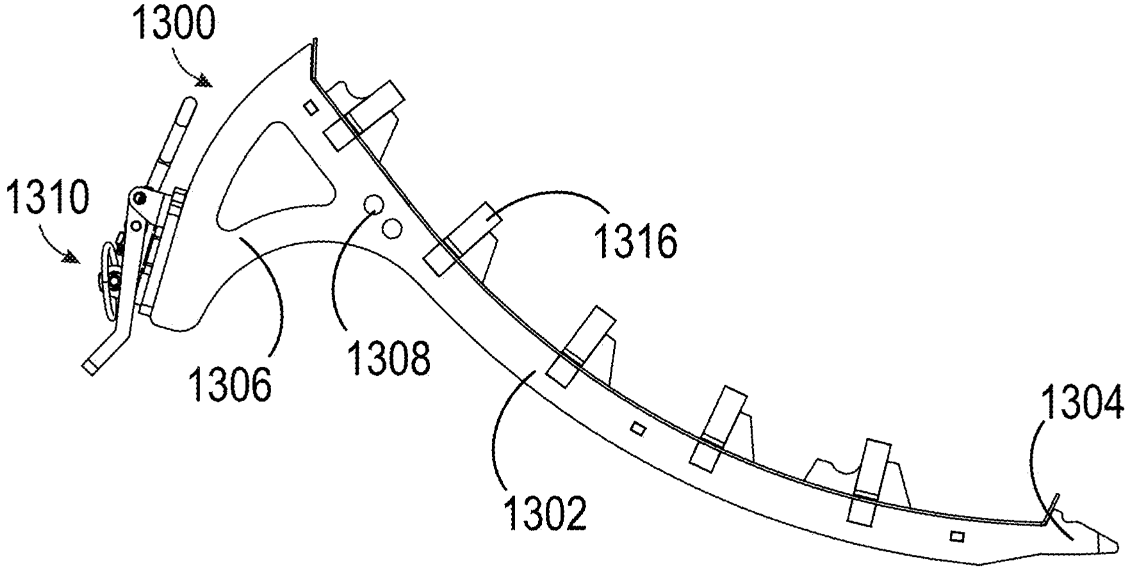
FIG. 65 shows a front elevation view of the second right disruptor of FIG. 63.
Figure 66:
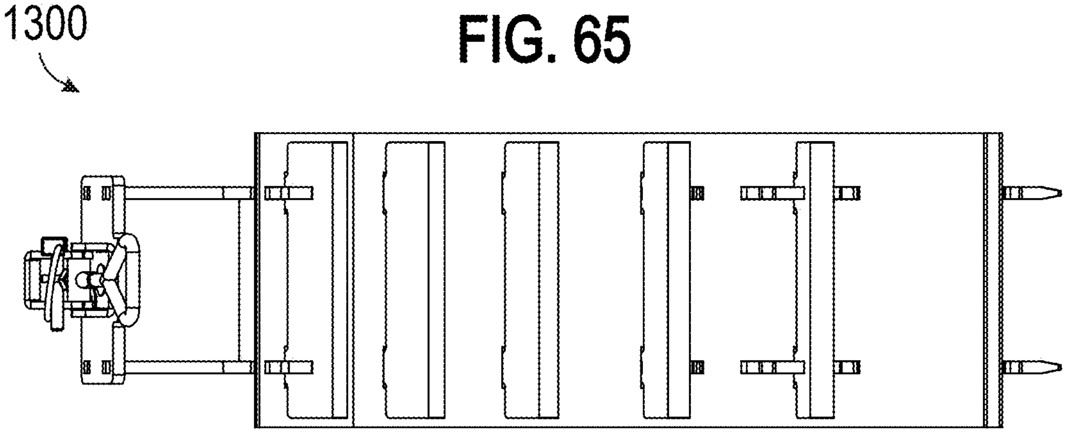
FIG. 66 shows a top plan view of the second right disruptor of FIG. 63.
Figure 67:
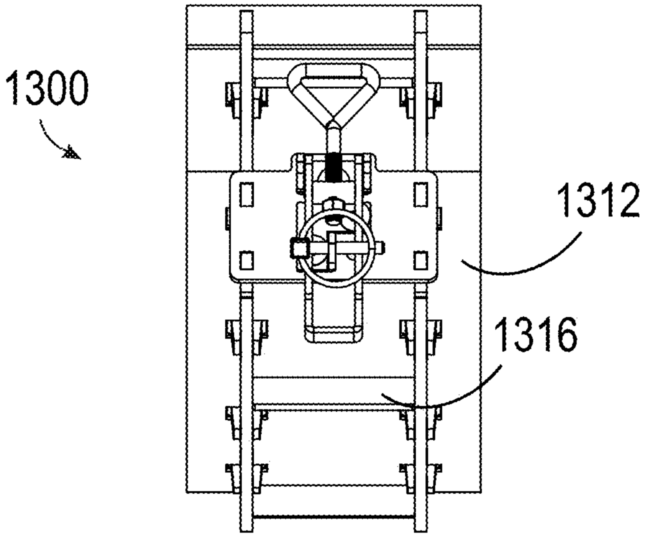
FIG. 67 shows a left-side elevation view of the second right disruptor of FIG. 63.
Figure 68:
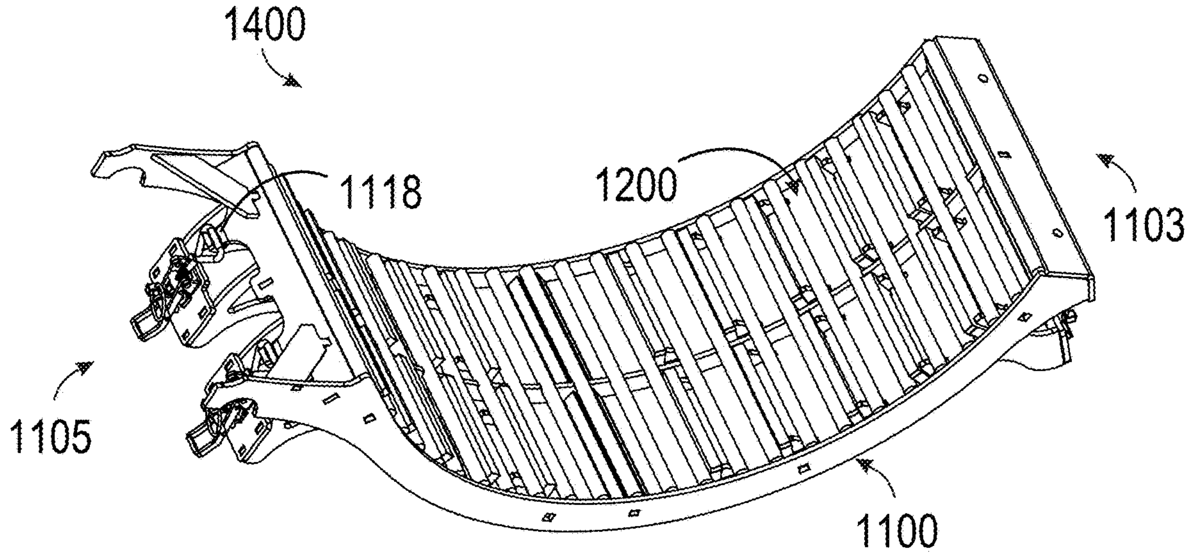
FIG. 68 shows a first perspective view of a second operational, MOG-disrupting assembly employing the second combine concave of FIG. 53, the second left disruptor of FIG. 56, and the second right disruptor of FIG. 63.
Figure 69:
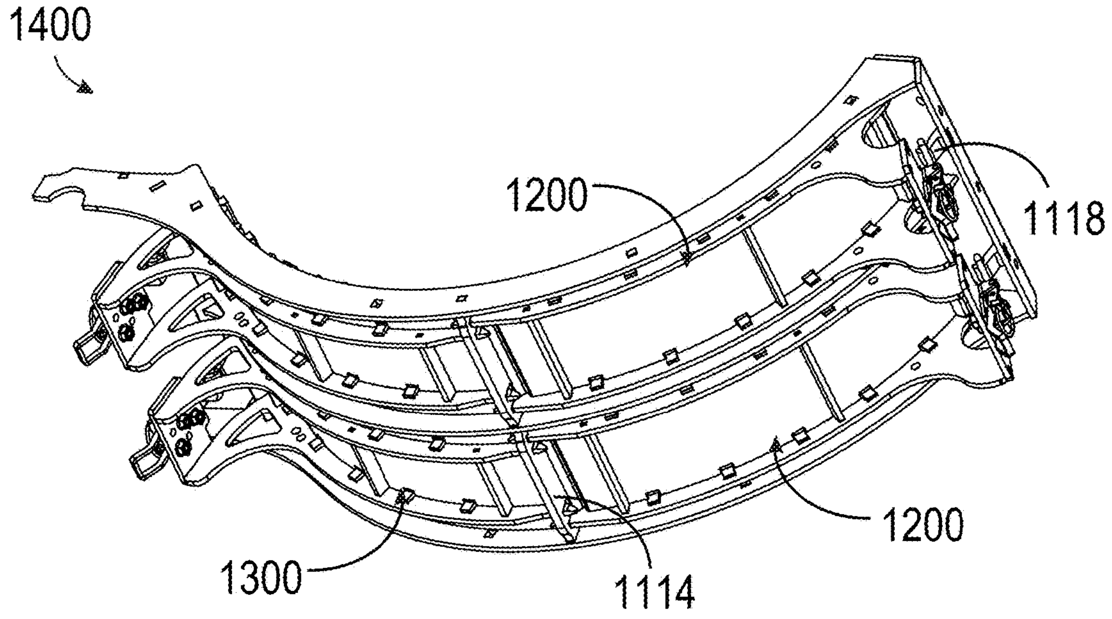
FIG. 69 shows a second perspective view of the second operational, MOG-disrupting assembly of FIG. 68.

Furthermore, cross supports 1222, 1322 can be seen in FIGS. 59 and 64 which comprise bars that extend between the rails 1202, 1302 for additional structural support to the disruptors 1200, 1300. The cross supports 1222, 1322 can be substantially parallelepiped in shape and can be spaced evenly along a bottom of the back plate 1212, 1312.

FIGS. 68-72 show a concave assembly 1400, which includes disruptors 1200, 1300 filling each position on an exterior of the concave 1100.

As shown in FIGS. 68-72, the hinge points 1204, 1304 are inserted through the cross frame apertures 1116 on the cross frame 1114. Once inserted through, loops on the over-center latch assemblies 1210, 1310 interface with the hooks 1118 and are latched down onto the hooks 1118. Tension between the hooks 1118 and over-center latch assemblies 1210, 1310 in addition to tension against the cross frame 1114 from the hinge points 1204, 1304 maintain or support the disruptors 1200, 1300 against the exterior of the concave 1100 without falling off. Additional support can be added by inserting a lock through the alignment apertures 1120 which align with the alignment apertures 1208, 1308 though this is not required.

As shown in the figures, a width of the back plates 1212, 1312 substantially spans a width of a distance between the first side frame 1106 and the center frame 1110 or alternatively the second side frame 1108 and the center frame 1110. This aids in preventing MOG and/or grain from falling through the concave 1100.

Figure 70:
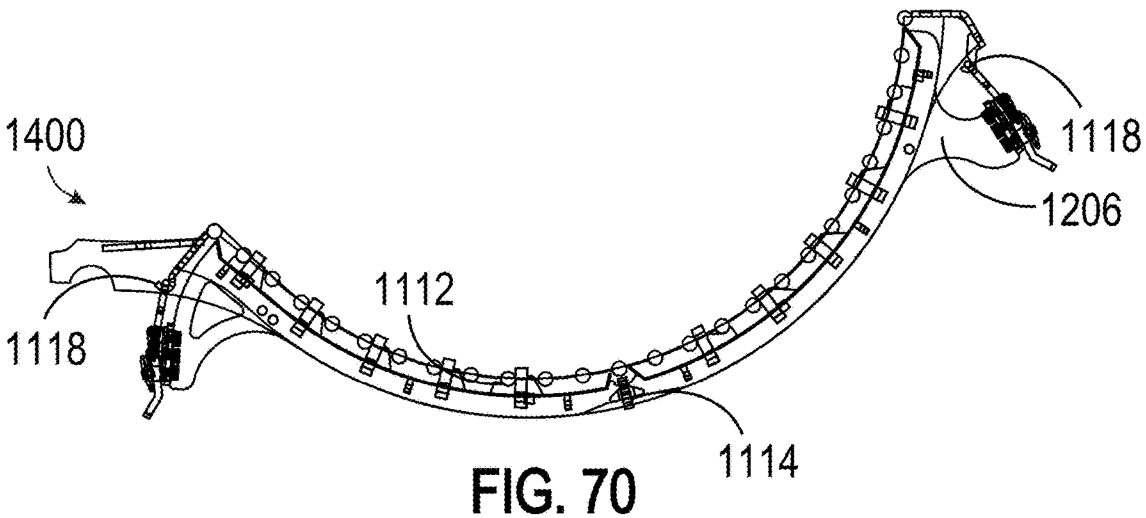
FIG. 70 shows a front elevation view of the second operational, MOG-disrupting assembly of FIG. 68.
Figure 71:
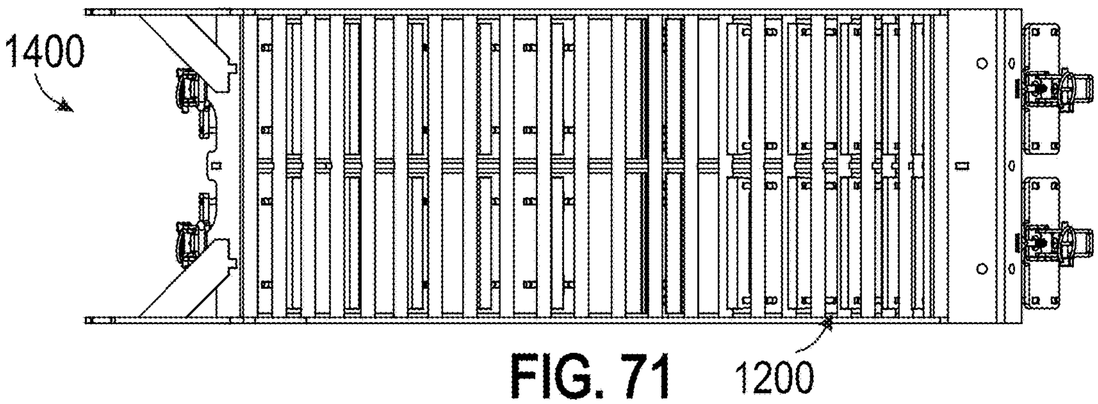
FIG. 71 shows a top plan view of the second operational, MOG-disrupting assembly of FIG. 68.
Figure 72:
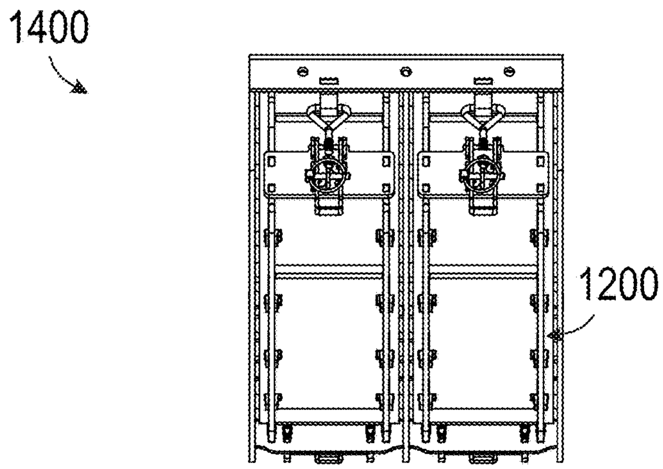
FIG. 72 shows a right-side elevation view of the second operational, MOG-disrupting assembly of FIG. 68.
Figure 73:
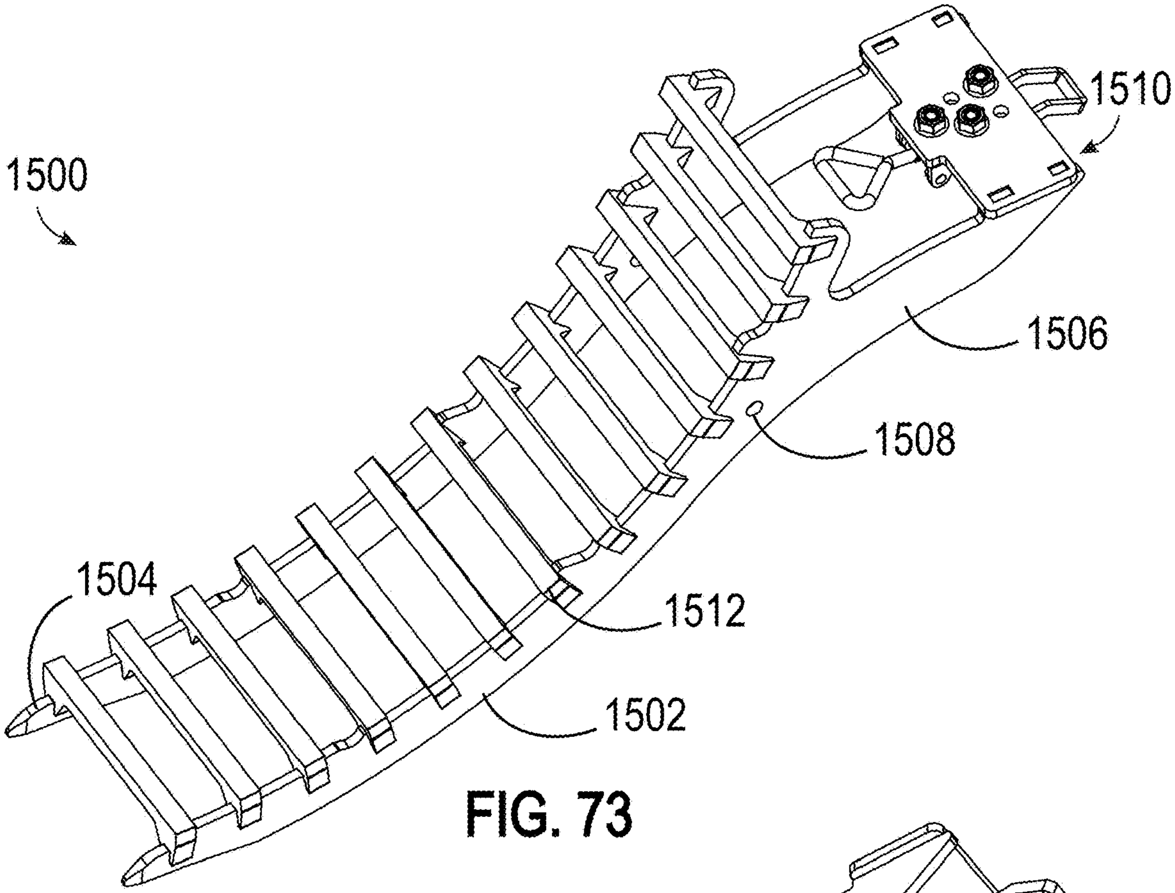
FIG. 73 shows a first perspective view of a second left MOG limiter for the second combine concave of FIG. 53.
Figure 74:
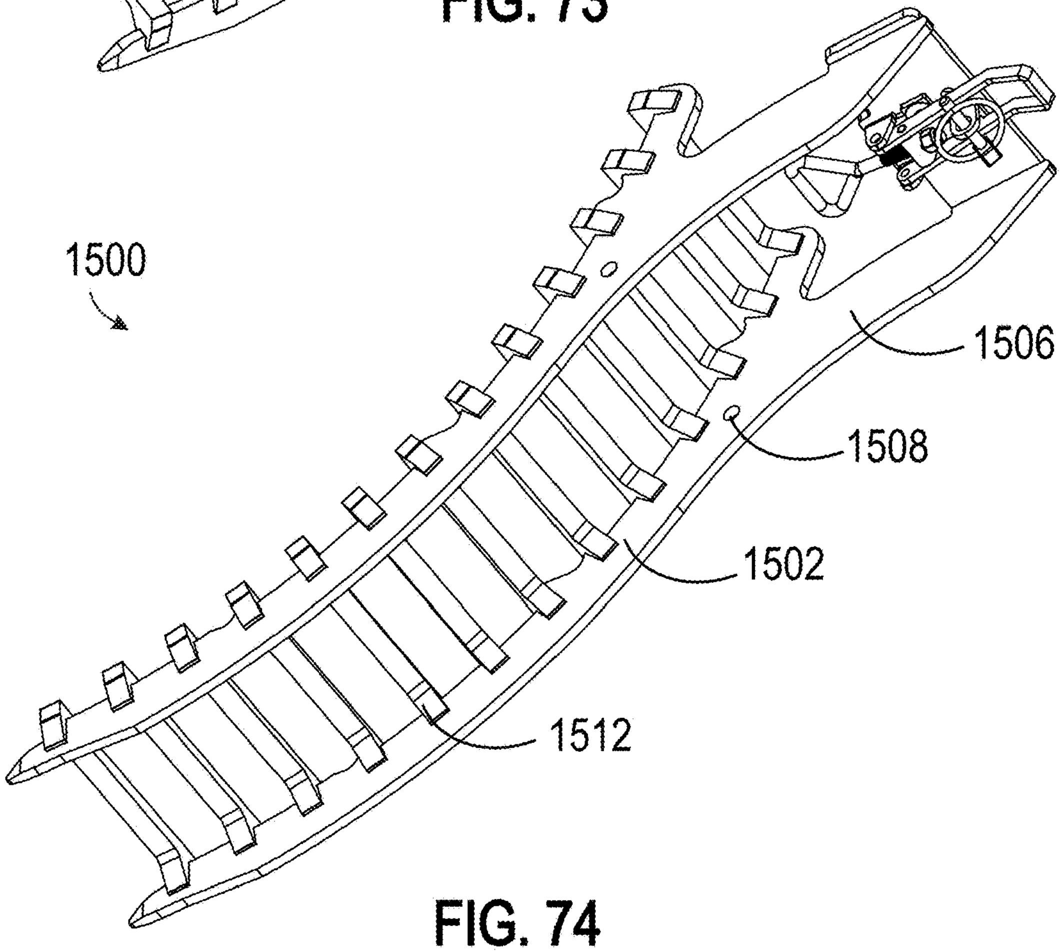
FIG. 74 shows a second perspective view of the second left MOG limiter of FIG. 73.
Figure 75:
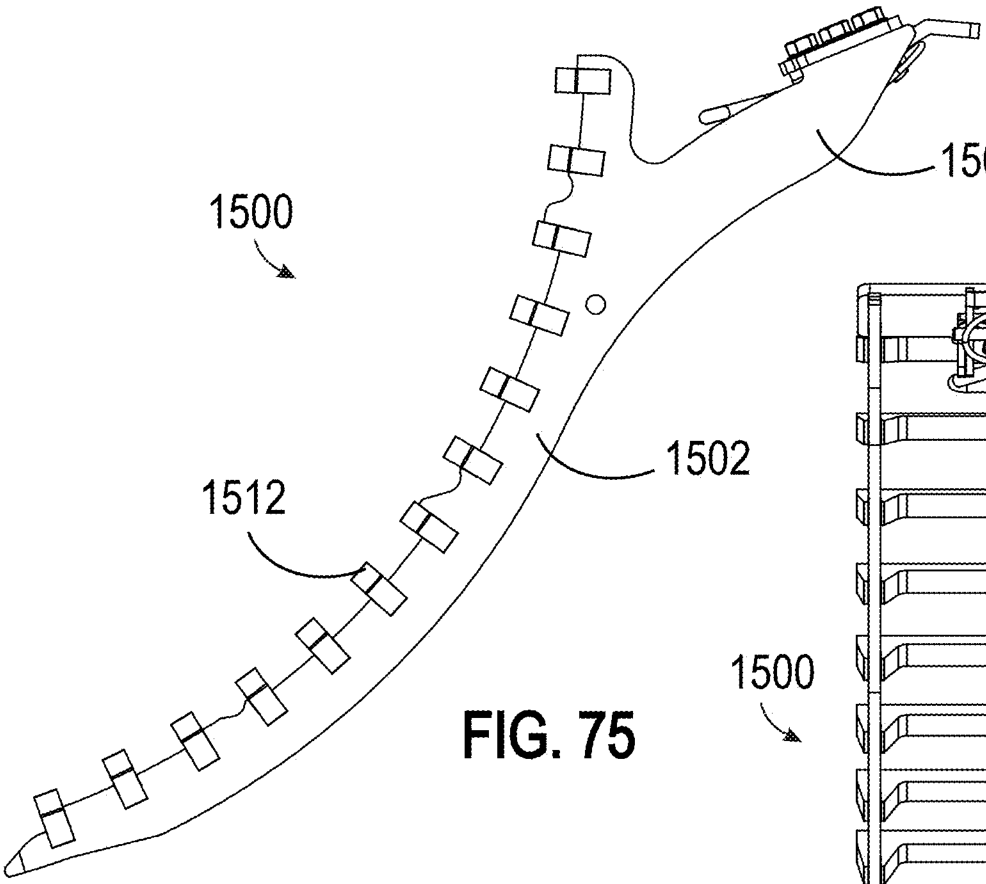
FIG. 75 shows a front elevation view of the second left MOG limiter of FIG. 73.
Figure 77:
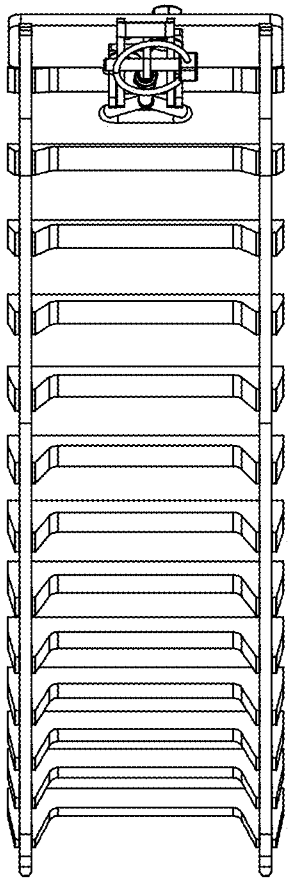
FIG. 77 shows a right-side elevation view of the second left MOG limiter of FIG. 73.
Figure 76:
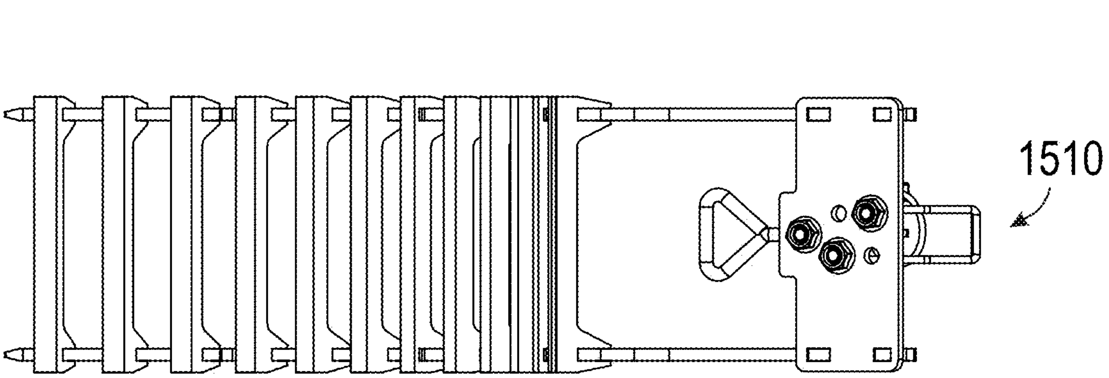
FIG. 76 shows a top plan view of the second left MOG limiter of FIG. 73.
Figure 78:
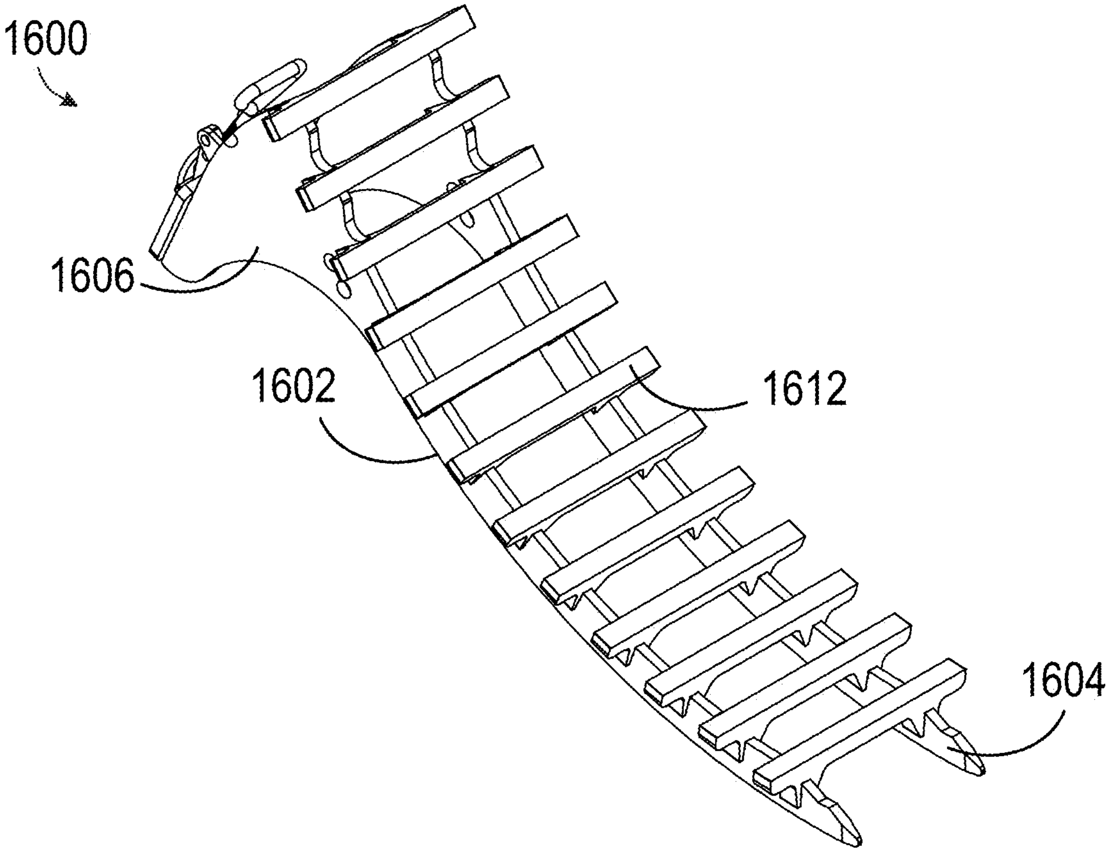
FIG. 78 shows a first perspective view for a second right MOG limiter for the second combine concave of FIG. 53.
Figure 79:
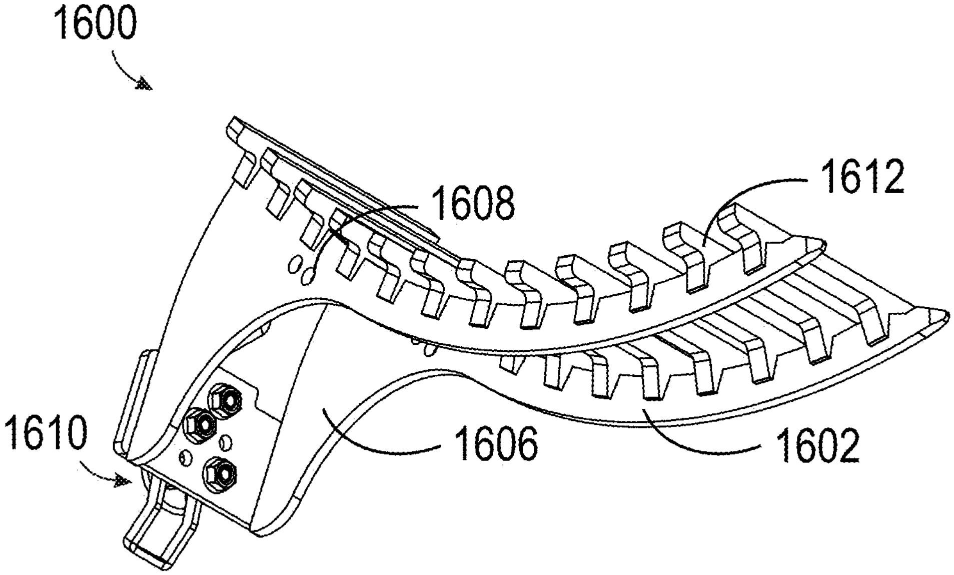
FIG. 79 shows a second perspective view of the second right MOG limiter of FIG. 78.
Figure 80:
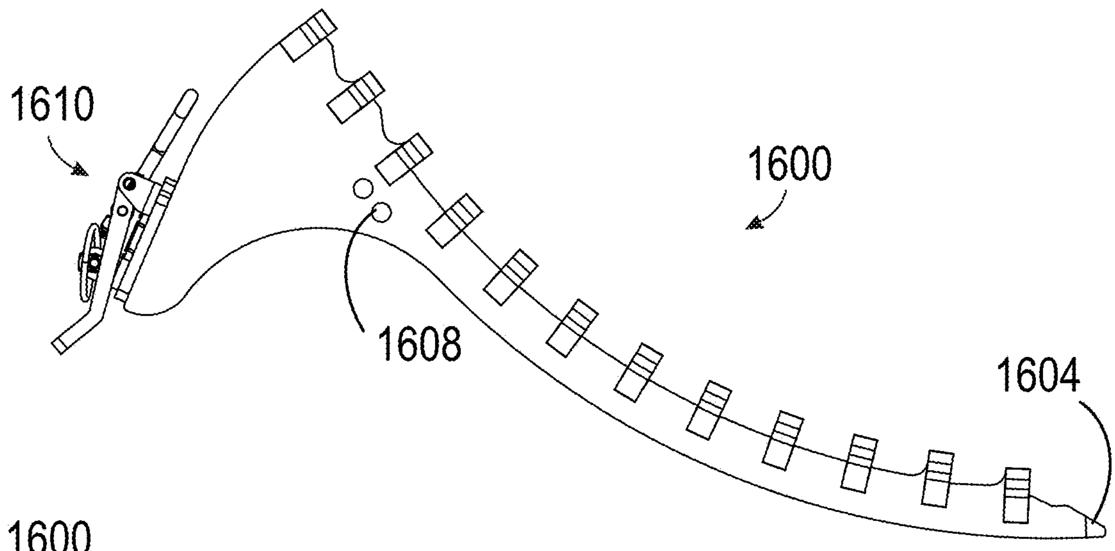
FIG. 80 shows a front elevation view of the second right MOG limiter of FIG. 78.
Figure 81:
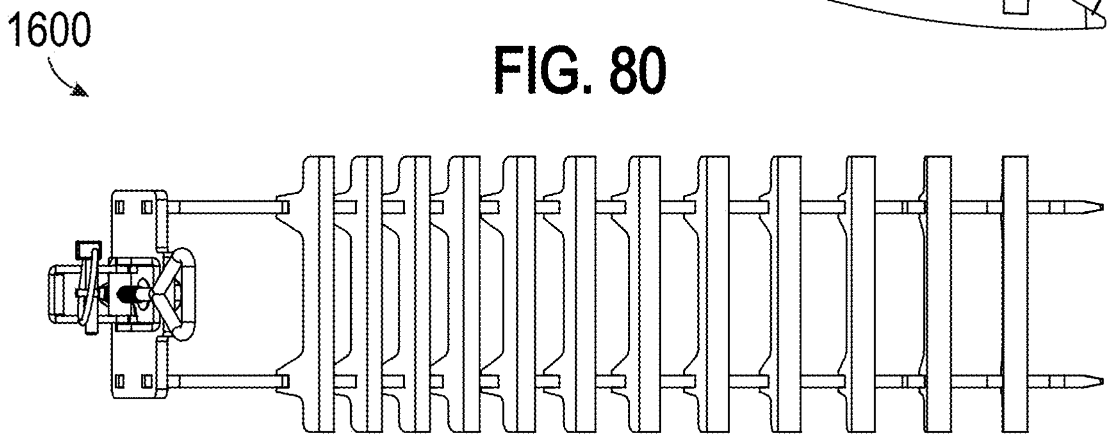
FIG. 81 shows a top plan view of the second right MOG limiter of FIG. 78.
Figure 82:
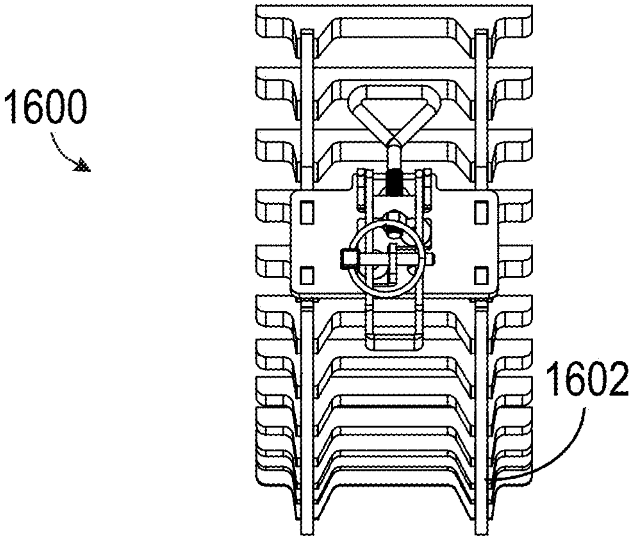
FIG. 82 shows a left-side elevation view of the second right MOG limiter of FIG. 78.
Figure 83:
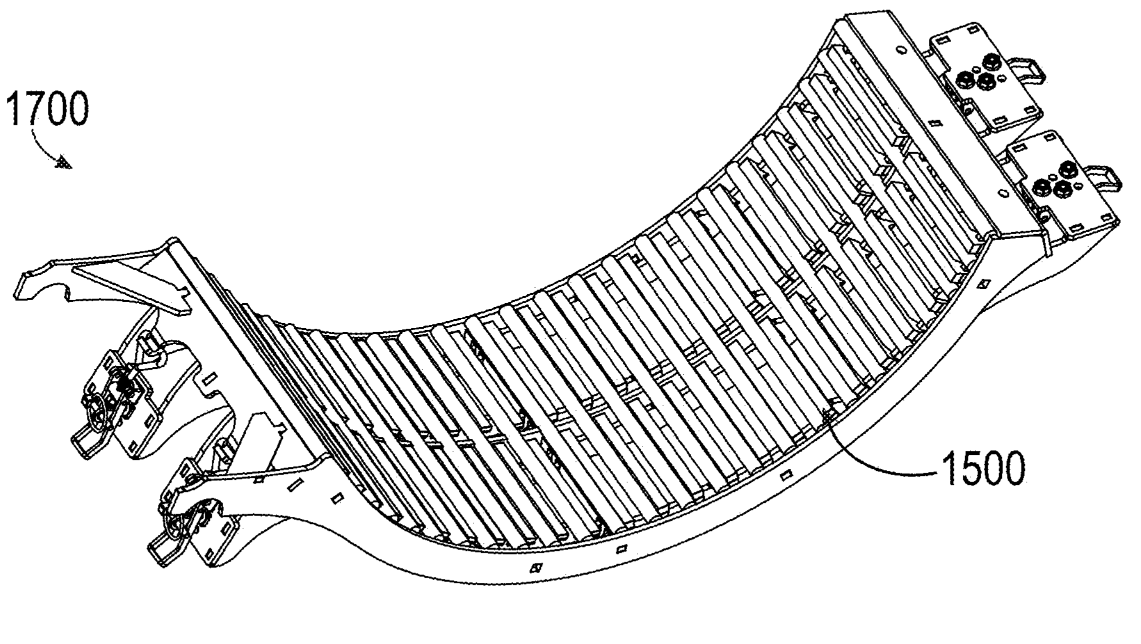
FIG. 83 shows a first perspective view of a second operational, MOG-limiting assembly employing the second combine concave of FIG. 53, the second left MOG limiter of FIG. 73, and the second right MOG limiter of FIG. 78.
Figure 84:
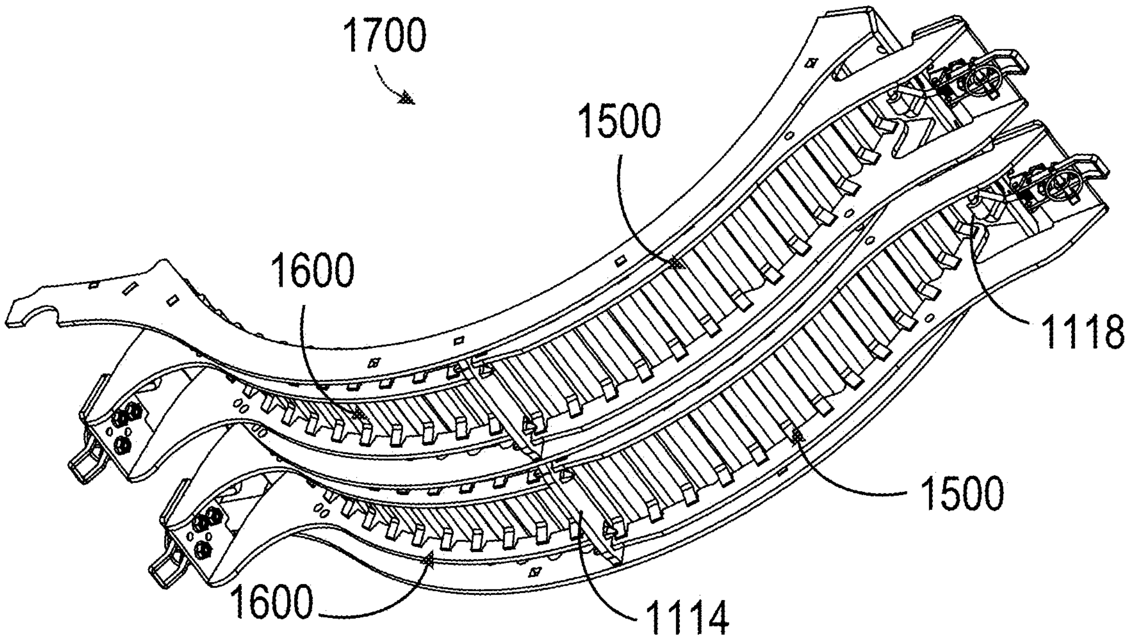
FIG. 84 shows a second perspective view of the second operational, MOG-limiting assembly of FIG. 83.
Figure 85:
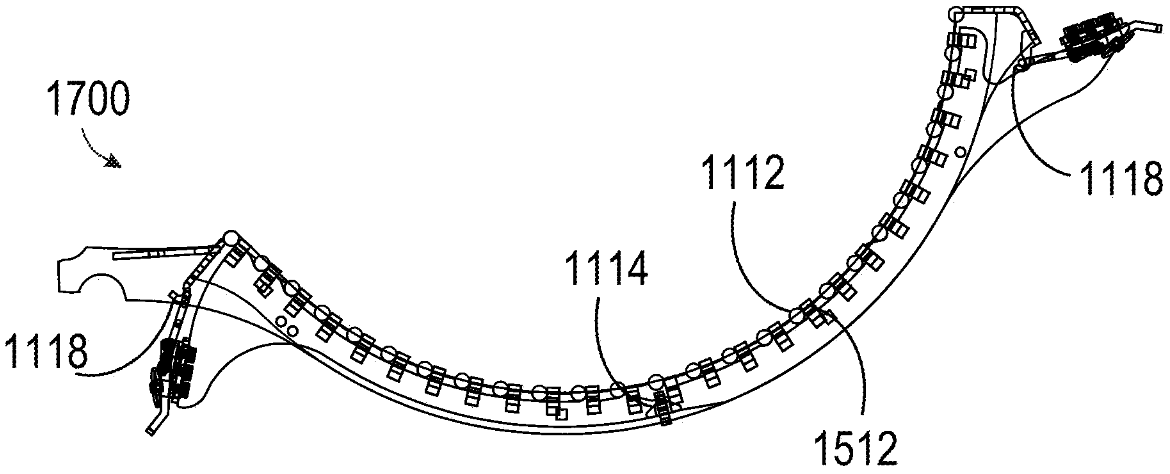
FIG. 85 shows a front elevation view of the second operational, MOG-limiting assembly of FIG. 83.
Figure 86:
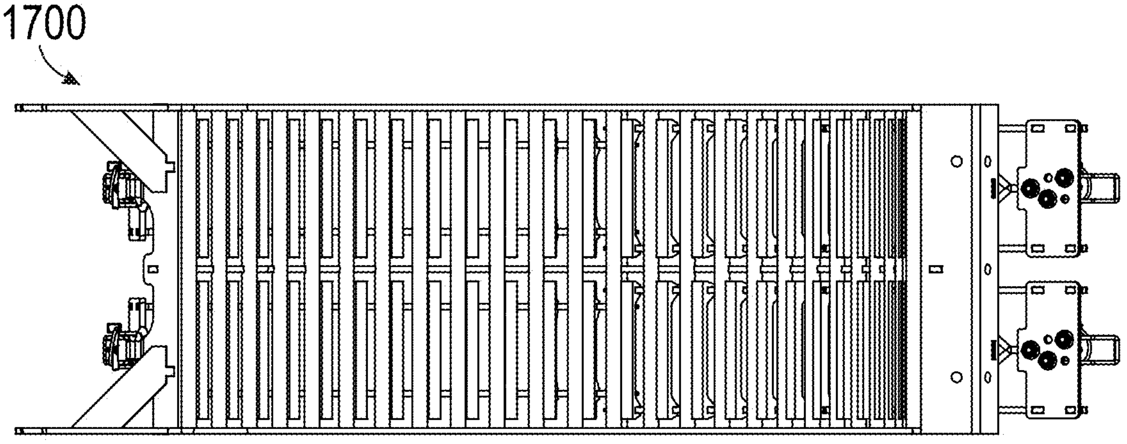
FIG. 86 shows a top plan view of the second operational, MOG-limiting assembly of FIG. 83.
Figure 87:
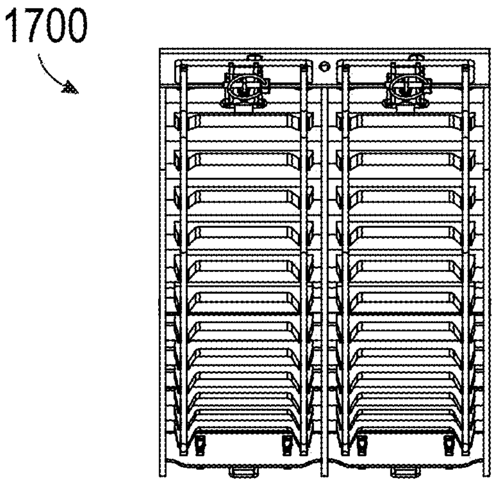
FIG. 87 shows a right-side elevation view of the second operational, MOG-limiting assembly of FIG. 83.
Figure 88:
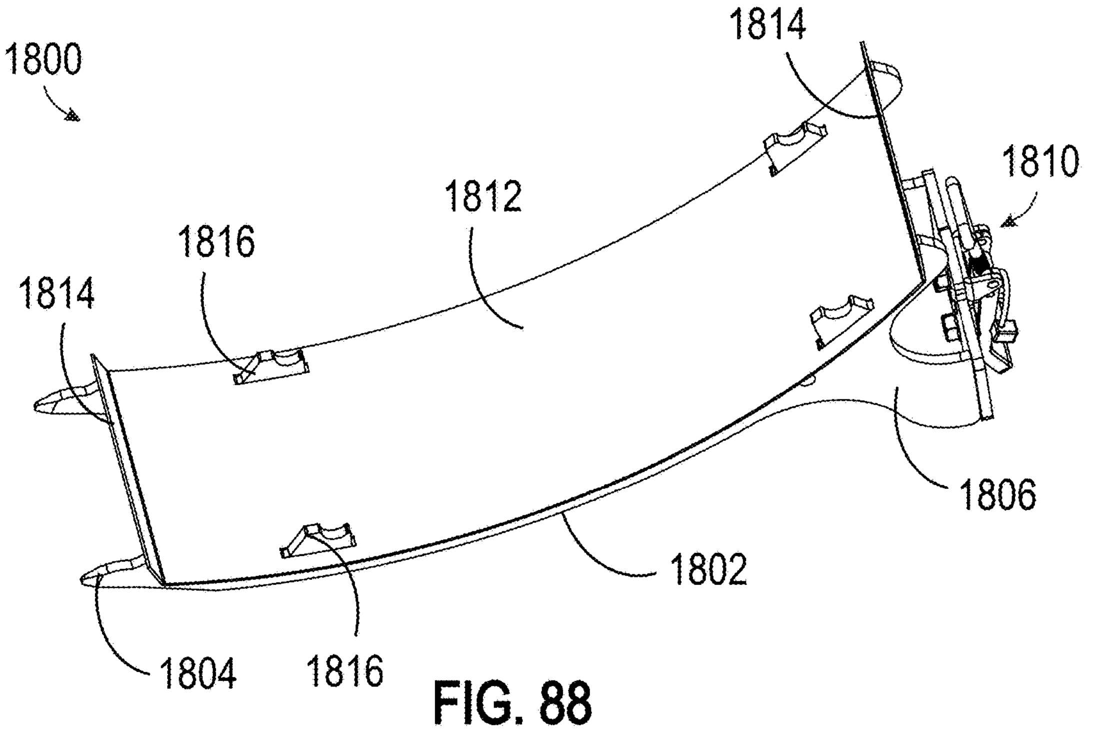
FIG. 88 shows a first perspective view of a second left cover plate for the second combine concave of FIG. 53.

As shown in the figures and can be most readily seen in FIG. 70, the back plate 1212, 1312 is not in direct contact with the rub bars 1112. As such, this make for room in which MOG can accumulate in between gaps between the rub bars 1112 and the back plate 1212, 1312. This makes for additional points of contact and pinch points for incoming MOG and grain passing through the threshing chamber 56.

As shown, the disruptors 1200, 1300 not only retain MOG and grain with the back plates 1212, 1312 by closing off gaps past the rub bars 1112 thus preventing MOG and grain from falling past the concave 1100, but the ridges 1216, 1316 extend upward through the rub bars 1112 creating additional points of contact and pinch points for the MOG and grain to contact thus abrading the MOG and grain entering the threshing chamber 56 at a higher rate than MOG and grain flowing past the concave 1100 (via the rotor) without any disruptors 1200, 1300 attached thereto. This does so by decreasing an amount of space or volume between the rotor and the concave 1100 within the threshing chamber 56 by having the ridges 1216, 1316 extend upward and inward through the rub bars 1112 towards the rotor (filling gaps and extending higher than the rub bars 1112) in combination with retaining MOG and grain with the back plates 1212, 1312 rather than allowing MOG and/or grain to slip through gaps between the rub bars 1112 and fall beneath the concave 1100. As such, MOG and grain is abraded at a higher rate thus feeding more volume per unit time through the threshing chamber 56 which can lead to higher throughput or more acres per hour in addition to better fuel efficiency per unit crop sent through the combine harvester 50 due to higher efficiency or operating closer to capacity (optimizing) regarding how much volume is processed through the threshing chamber 56.

Being abraded at a higher rate and making flow of the MOG and grain more turbulent by adding the additional points of contact and pinch points is additionally useful and beneficial when the disruptors 1200, 1300 are placed on the concave 1100 at the #1 spot in the threshing chamber (or a very first concave which crops encounter in the threshing chamber 56) due to the additional points of contact and pinch points which increases an amount of separation between MOG and grain thus more quickly separating the grain from the MOG to be released through gaps in concaves 1100 at later positions (e.g., positions #2-#7 in the threshing chamber 56). The amount of disruptors 1200, 1300 placed on concaves 1100 as inserts as opposed to not including any inserts (or in the alternative additionally including inserts such as MOG limiters and/or cover plates as described herein) will vary to achieve an optimum flow rate and rate of separation between MOG and grain (too high of a rate of separation can result in grain damage whereas too low a rate of separation can result in lost grain-still being attached to the MOG when discarded-thus each resulting in lower yield). The variation will depend on a size of the grain on the crops being sent through the threshing chamber 56. Larger grains with fewer grains on the crop can benefit from a lower rate of abrasion and separation whereas smaller grains with many on the crop can benefit from a higher rate of abrasion and separation.

The disruptor 1200, 1300 as shown in FIGS. 58-67 are readily installed by the farmer or technician without requiring the assistance of a second person and are easily and quickly removed once installed. This functions to enhance the flexibility provided to the farmer who may make adjustments as to how many and where disruptors 1200, 1300 are positioned within the threshing section of the rotor chamber.

FIGS. 73-77 show a MOG limiter 1500 for the right side of the concave 1100 and FIGS. 78-82 show a MOG limiter 1600 for the left side of the concave 1100. The MOG limiter 1500, 1600 includes rails 1502, 1602, hinge points 1504, 1604, extended mounting portions 1506, 1606, alignment apertures 1508, 1608, an over-center latch assembly 1510, 1610, and cross bars 1512, 1612.

The rails 1502, 1602 are curvilinear and are intended follow a same shape or be contoured to a shape that the concave 1100 forms so as to be form fitted to an exterior surface of the concave 1100 when attached thereto. The MOG limiters 1500, 1600 each include at least two rails 1502, 1602 which are parallel to one another. The rails 1502, 1602 include at their ends the hinge points 1504, 1604 and the extended mounting portions 1506, 1606, wherein the hinge points 1504, 1604 are at ends opposite the extended mounting portions 1506, 1606, and the hinge points 1504, 1604 comprise distal ends of the rails 1502, 1602, whereas the extended mounting portions 1506, 1606 need not extend from the rails 1502, 1602 at the distal ends opposite the hinge points 1504, 1604 but can extend from the rails 1502, 1602 substantially near the distal ends opposite the hinge points 1504, 1604. The hinge points 1504, 1604 comprise substantially pointed or rounded ends such that the rails 1502, 1602 begin tapering to form the hinge points 1504, 1604. Furthermore, the alignment apertures 1508, 1608 can be positioned anywhere along the rails 1502, 1602 and extend through the rails 1502, 1602 so as to align with the alignment apertures 1120 on the concave 1100.

The extended mounting portions 1506, 1606 extend outwardly away from the rails 1502, 1602 as a part of each of the two rails on each of the MOG limiters 1500, 1600, and transition into flat surfaces to which the over-center latch assembly 1510, 1610 can attach to. Each of the flat surfaces can form a common plane with one another such that it eases attachment of the over-center latch 1510, 1610 thereto. The extended mounting portions 1506, 1606 can be any shape that accomplish this extension transition such as rectangular, triangular, rhombus, stadium, oval, wavy combinations of any of these, lattice or truss structures with apertures extending therethrough, etc. The over-center latch assembly 1510, 1610 can attach downwardly (facing the flat surfaces at distal ends of the extended mounting portions 1506, 1606) or upwardly (facing away from the flat surfaces at distal ends of the extended mounting portions 1506, 1606), depending on a preference of the user or operator as to how a loop of the over-center latch attaches to the hooks 1118 of the concave 1100 in addition to which direction the over-center latch 1510, 1610 will be accessible from. The over-center latch assembly 1510, 1610 will be discussed in greater detail in conjunction with FIGS. 106-107.

The MOG limiter 1500, 1600 further comprises the cross bars 1512, 1612 which are parallel to one another and spaced equally from one another so as to fit one cross bar 1512, 1612 between a pair of rub bars 1112 on the concave 1100. The cross bars 1512, 1612 can comprise substantially a parallelepiped shape. As opposed to the disruptors 1200, 1300, the MOG limiters 1500, 1600 are designed to allow grain to pass through gaps in between the rub bars 1112 of the concave 1100 by still leaving space for grain to fall through, and the MOG limiters 1500, 1600 are optimally used for alternating between larger and smaller types of grain.

FIGS. 83-87 show a concave assembly 1700, which includes MOG limiters 1500, 1600 filling each position on an exterior of the concave 1100.

As shown in FIGS. 83-87, the hinge points 1504, 1604 are inserted through the cross frame apertures 1116 on the cross frame 1114. Once inserted through, loops on the over-center latch assemblies 1510, 1610 interface with the hooks 1118 and are latched down onto the hooks 1118. Tension between the hooks 1118 and over-center latch assemblies 1510, 1610 in addition to tension against the cross frame 1114 from the hinge points 1504, 1604 maintain or support the MOG limiters 1500, 1600 against the exterior of the concave 1100 without falling off. Additional support can be added by inserting a lock through the alignment apertures 1120 which align with the alignment apertures 1508, 1608 though this is not required.

As shown in the figures, each of the over-center latch assemblies 1510, 1610 extend a distance away from the rub bars 1112 due to the extended mounting portions 1506, 1606 and then attach to the hooks 1118. This is to prevent grain that falls through the concave 1100 from hitting the over-center latch assemblies 1510, 1610 thus streamlining sifting of grain in addition to making for easy access to the over-center latch assemblies 1510, 1610 for an operator standing to a side of the concave 1100.

According to a preferred embodiment, the thickness of the rails is approximately 1 inch. According to yet another embodiment in need of an increase in concave open area (COA), the thickness of the rails is approximately ¼ inch where the distance in the outer surfaces of the rails 1502, 1602 remains the same.

In one embodiment, the MOG limiter 1500, 1600 is designed for use on a ⅝ inch round bar concave 1100 having a ¾ inch gap between the rub bars 1112.

In one embodiment the MOG limiter 1500, 1600 is designed for use with a ⅝ inch round bar concave 1100 having a ⅞ inch gap between the rub bars 1112.

In one embodiment, the face side of the MOG limiter 1500, 1600 is attached to the underside of the concave 1100 utilizing on one end a hinge point at the end of each rail 1500, 1600 which is insertably retained in a slotted opening of a crossbar member positioned and affixed to the bottom side of the concave 1100. On the other end, over-center latch assembly 1510, 1610 is used through which a bolt positioned on the concave 1100 protrudes with retention accomplished by use of a washer and nut assembly.

In one embodiment the attachment means is adjustable so as to slidably move the inserts within the gaps between the concave crossbars so as to further control the opening remaining within said gaps.

In the MOG limiter embodiments, rounded notches can be made on the face side of each of the rails 1502, 1602 which conform to the rounded geometry of the rub bars 1112 on the concave 1100, and function to position the notched surface firmly against the underside of the concave 1100 rub bar 1112 depending on where the rounded notches are positioned.

The MOG limiters 1500, 1600 are of a length which approximates one-half of the curvilinear length of the concave 1100. The MOG limiter 1105 may be positioned between either of the first side frame 1106 or the second side frame 1108 and the center frame 1110. In the cross frame 1114 are positioned openings such as insert slots 1116 to receive the hinge points 1502, 1602 located at distal ends of each of the rails 1500, 1600. The hinge points 1502, 1602 are slidably inserted into the insert slots 1116 and then rotated upwardly to be positioned adjacent to and in conformity with the curvature of the underside of the concave 1100 with the hook 1118 holding the MOG limiters 1500, 1600 in place.

The MOG limiter 1500, 1600 facilitates restricting the opening between rub bars 1112 allowing for small grains to drop through the concave 1100 on either side of the insert while preventing MOG from passing through.

The MOG limiter 1500, 1600 as shown in FIGS. 73-82 are readily installed by the farmer or technician without requiring the assistance of a second person and are easily and quickly removed once installed. This functions to enhance the flexibility provided to the farmer who may make adjustments as to how many and where MOG limiters 1500, 1600 are positioned within the threshing section of the rotor chamber.

FIGS. 88-92 show a cover plate 1800 for the right side of the concave 1100 and FIGS. 93-97 show a cover plate 1900 for the left side of the concave 1100. The cover plate 1800, 1900 includes rails 1802, 1902, hinge points 1804, 1904, extended mounting portions 1806, 1906, alignment apertures 1808, 1908, an over-center latch assembly 1810, 1910, a back plate 1812, 1912, back plate ramps 1814, 1914, rub bar contacts 1816, 1916, and cross supports 1818, 1918.

The rails 1802, 1902 are curvilinear and are intended follow a same shape or be contoured to a shape that the concave 1100 forms so as to be form fitted to an exterior surface of the concave 1100 when attached thereto. The cover plates 1800, 1900 each include at least two rails 1802, 1902 which are parallel to one another. The rails 1802, 1902 include at their ends the hinge points 1804, 1904 and the extended mounting portions 1806, 1906, wherein the hinge points 1804, 1904 are at ends opposite the extended mounting portions 1806, 1906, and the hinge points 1804, 1904 comprise distal ends of the rails 1802, 1902, whereas the extended mounting portions 1806, 1906 need not extend from the rails 1802, 1902 at the distal ends opposite the hinge points 1804, 1904 but can extend from the rails 1802, 1902 substantially near the distal ends opposite the hinge points 1804, 1904. The hinge points 1804, 1904 comprise substantially pointed or rounded ends such that the rails 1802, 1902 begin tapering to form the hinge points 1804, 1904. Furthermore, the alignment apertures 1808, 1908 can be positioned anywhere along the rails 1802, 1902 and extend through the rails 1802, 1902 so as to align with the alignment apertures 1120 on the concave 1100.

The extended mounting portions 1806, 1906 extend outwardly away from the rails 1802, 1902 as a part of each of the two rails on each of the cover plates 1800, 1900, and transition into flat surfaces to which the over-center latch assembly 1810, 1910 can attach to. Each of the flat surfaces can form a common plane with one another such that it eases attachment of the over-center latch 1810, 1910 thereto. The extended mounting portions 1806, 1906 can be any shape that accomplish this extension transition such as rectangular, triangular, rhombus, stadium, oval, wavy combinations of any of these, lattice or truss structures with apertures extending therethrough, etc. The over-center latch assembly 1810, 1910 can attach downwardly (facing the flat surfaces at distal ends of the extended mounting portions 1806, 1906) or upwardly (facing away from the flat surfaces at distal ends of the extended mounting portions 1806, 1906), depending on a preference of the user or operator as to how a loop of the over-center latch attaches to the hooks 1118 of the concave 1100 in addition to which direction the over-center latch 1810, 1910 will be accessible from. The over-center latch assembly 1810, 1910 will be discussed in greater detail in conjunction with FIGS. 106-107.

The cover plate 1800, 1900 further includes the back plate 1812, 1912 attached atop the rails 1802, 1902. The back plate 1812, 1912 comprises a solid sheet of material that follows contours of the rails 1802, 1902. As such, the back plate 1812, 1912 is curvilinear in shape and will fit snuggly against the rub bars 1112 of the concave 1100 when placed against an exterior of the concave 1100. A width of the back plate 1812, 1912 extends over each of the rails 1802, 1902. Further, the back plate 1812, 1912 additionally comprises back plate ramps 1814, 1914 that extend inwardly (with respect to a direction of curvature of the back plate 1812, 1912) at distal ends of the back plate 1812, 1912. In this regard, the back plate 1812, 1912 can fit snugly against exterior surfaces of the rub bars 1112 of the concave 1100 and the back plate ramps 1814, 1914 increase an amount of surface area contact against the rub bars 1112 of the concave 1100 by angling towards the rub bars 1112 so as to reduce an amount of MOG and/or grain that can get stuck in between the rub bar 1112 and the back plate 1812, 1912.

The rub bar contacts 1816, 1916 are specifically shaped to cradle the rub bars 1112 on the concave 1100. In this regard, when the cover plates 1800, 1900 are positioned on the concave 1100 the rub bars 1112 will sit snugly within the rub bar contacts 1816, 1916 which are each shaped as a concave configured to hold a cylindrical shaped object thereon.

Figure 89:
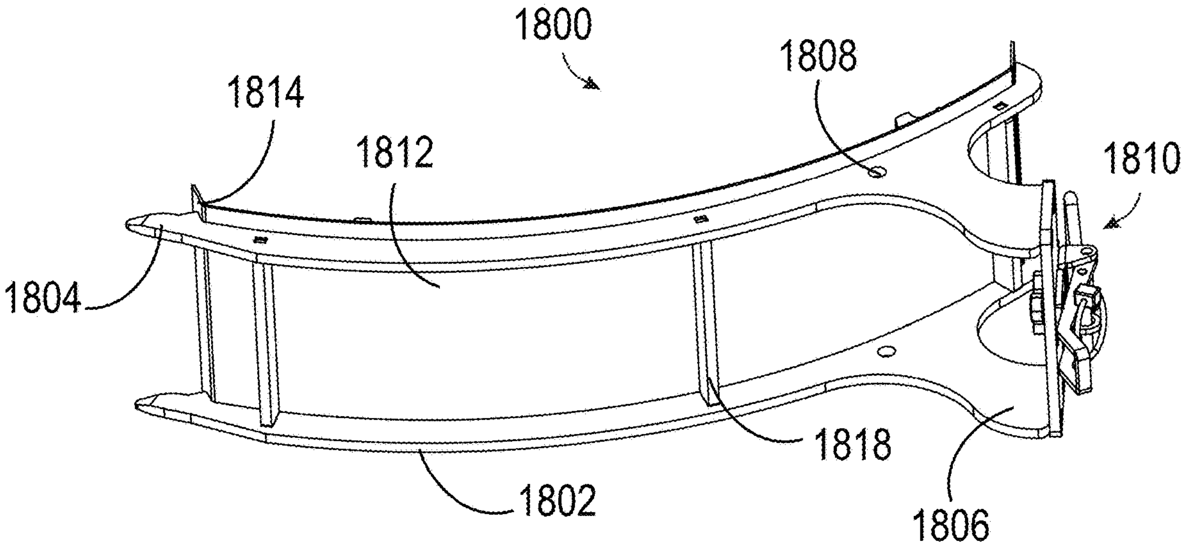
FIG. 89 shows a second perspective view of the second left cover plate of FIG. 88.
Figure 90:
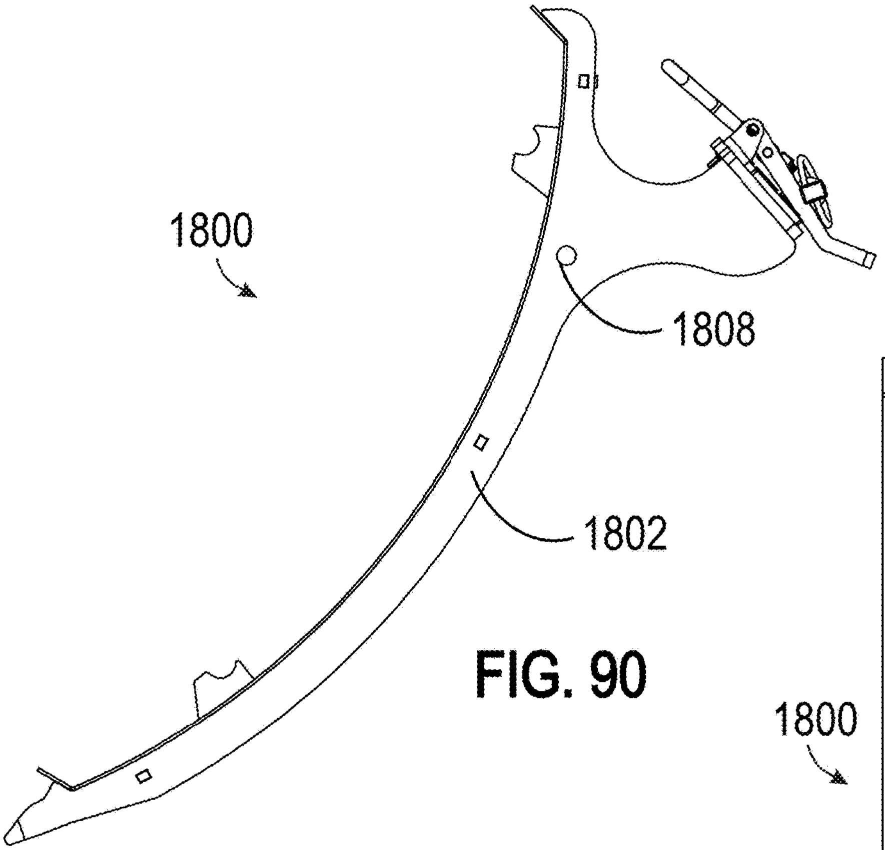
FIG. 90 shows a front elevation view of the second left cover plate of FIG. 88.
Figure 92:
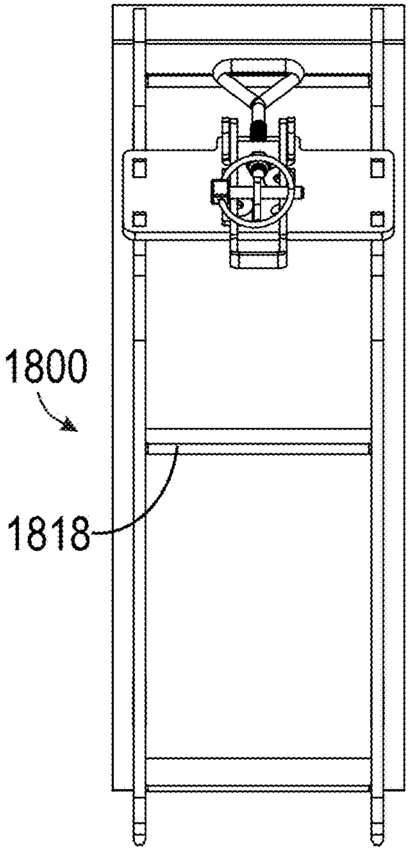
FIG. 92 shows a right-side elevation view of the second left cover plate of FIG. 88.
Figure 91:
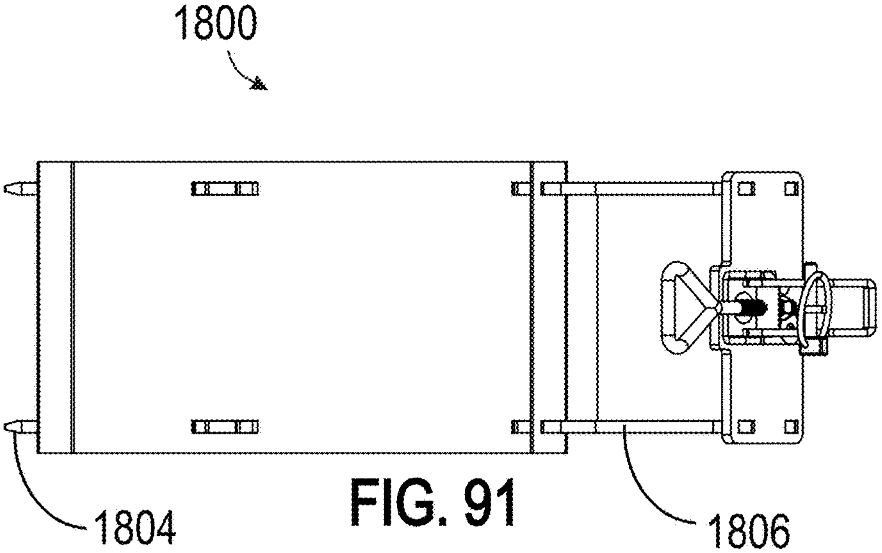
FIG. 91 shows a top plan view of the second left cover plate of FIG. 88.
Figure 93:
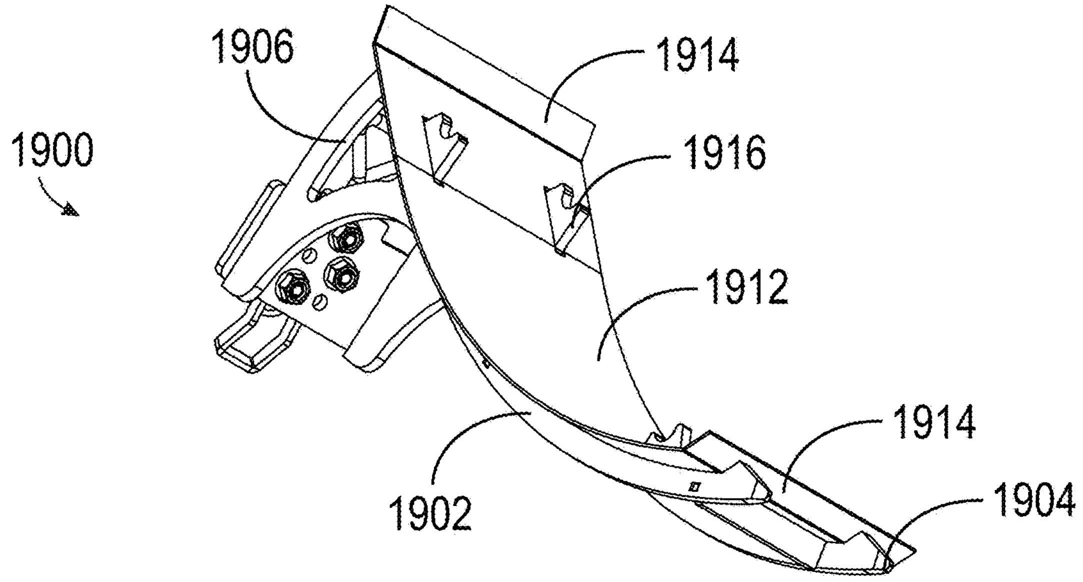
FIG. 93 shows a first perspective view for a second right cover plate for the second combine concave of FIG. 53.
Figure 94:
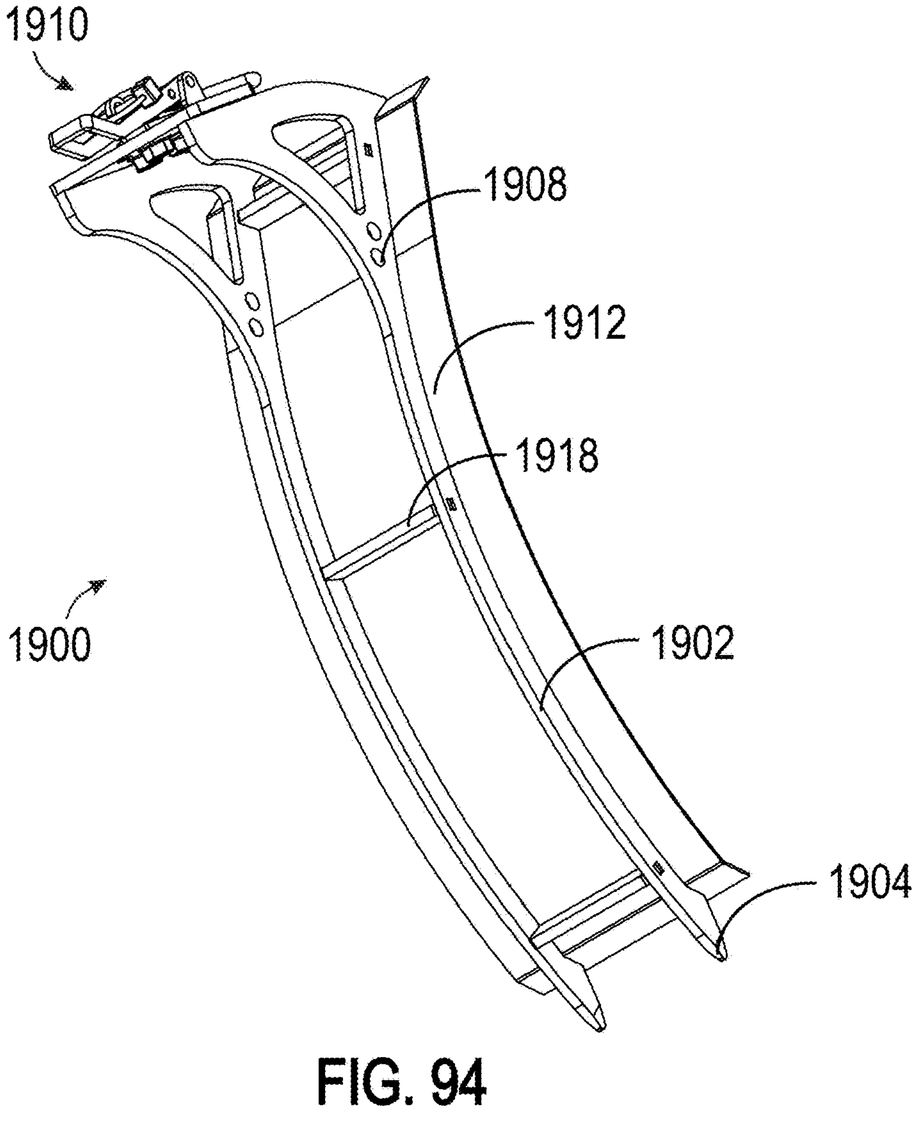
FIG. 94 shows a second perspective view of the second right cover plate of FIG. 93.
Figure 95:
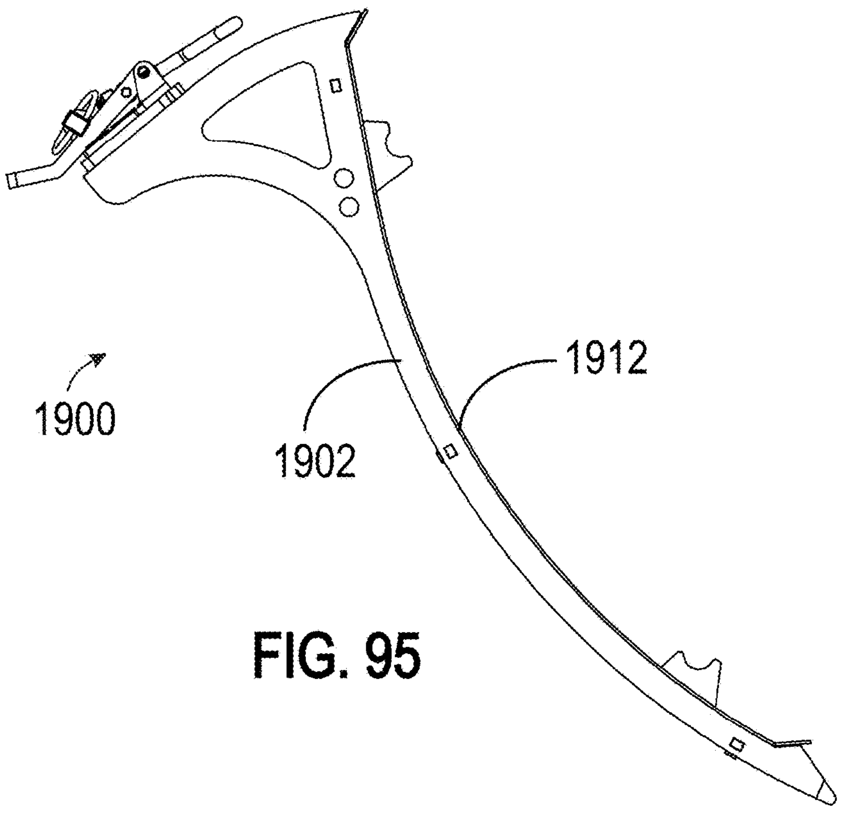
FIG. 95 shows a front elevation view of the second right cover plate of FIG. 93.
Figure 97:
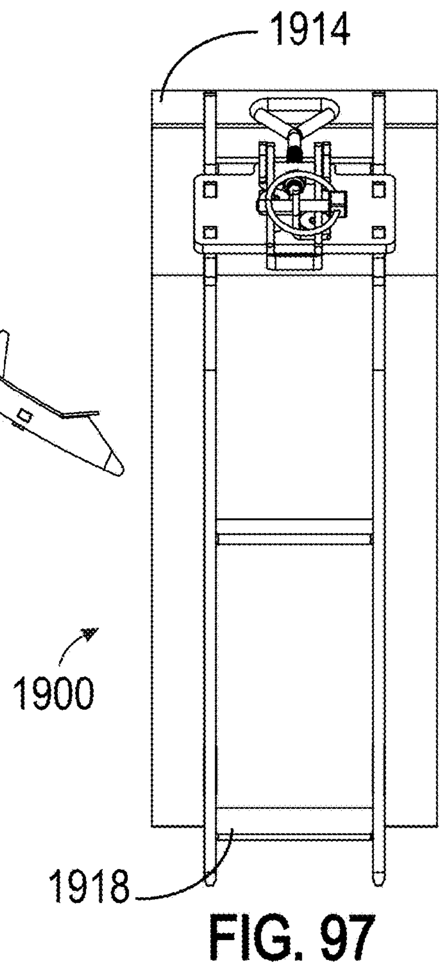
FIG. 97 shows a left-side elevation view of the second right disruptor of FIG. 93.
Figure 96:
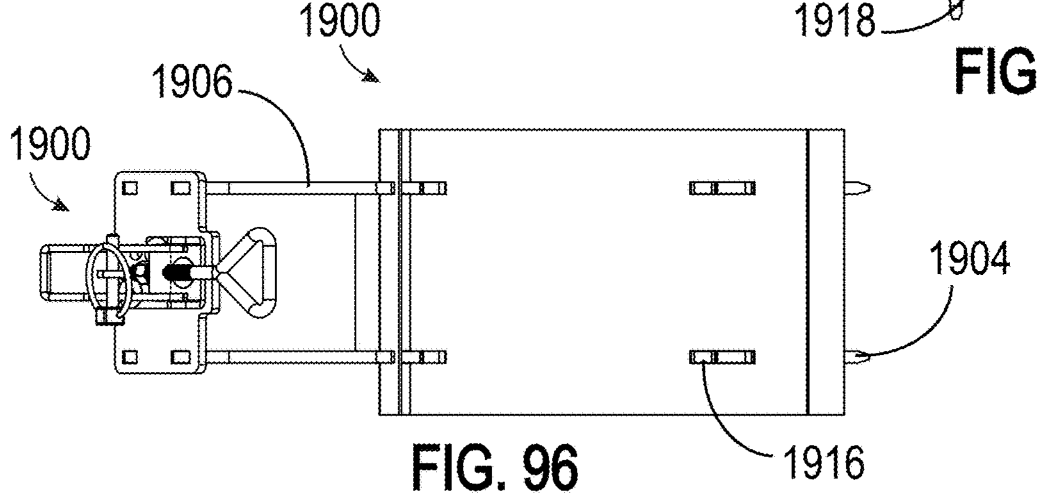
FIG. 96 shows a top plan view of the second right cover plate of FIG. 93.
Figure 98:
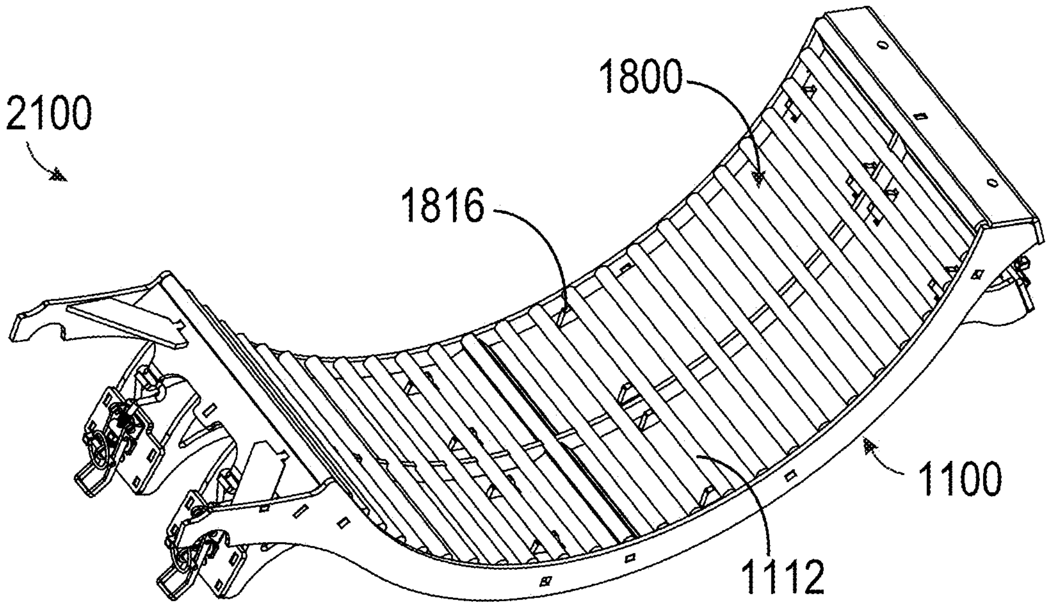
FIG. 98 shows a first perspective view of a second operational, cover plate assembly employing the second combine concave of FIG. 53, the second left cover plate of FIG. 93, and the second right cover plate of FIG. 98.
Figure 99:
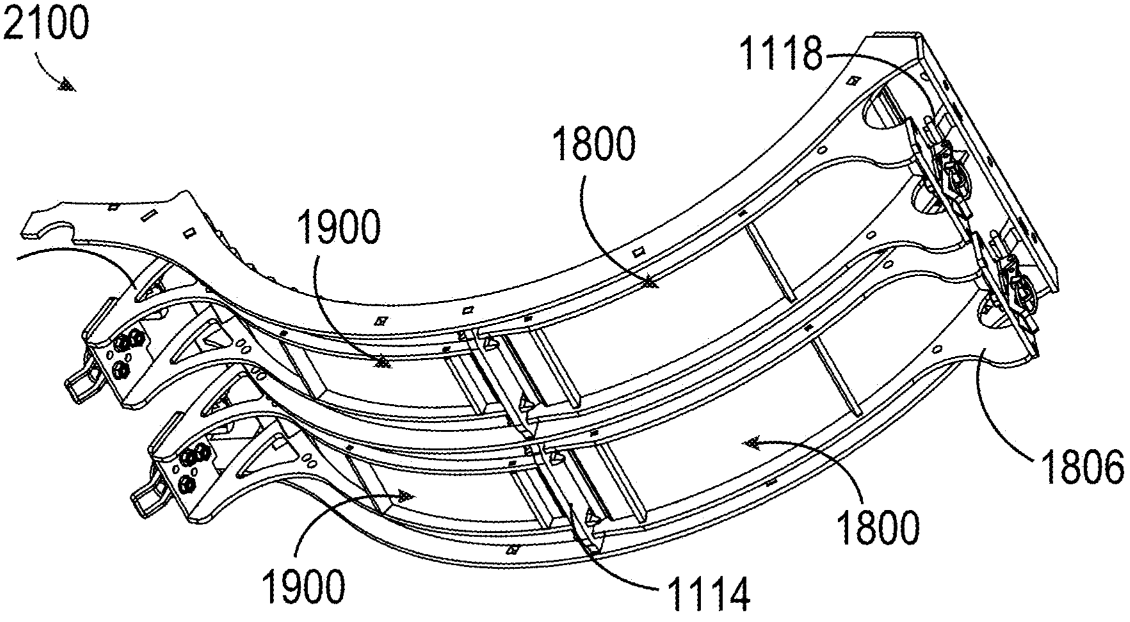
FIG. 99 shows a second perspective view of the second operational, cover plate assembly of FIG. 98.

Furthermore, cross supports 1818, 1918 can be seen in FIGS. 89 and 94 which comprise bars that extend between the rails 1802, 1902 for additional structural support to the cover plates 1800, 1900. The cross supports 1818, 1918 can be substantially parallelepiped in shape and can be spaced evenly along a bottom of the back plate 1812, 1912.

FIGS. 98-102 show a concave assembly 2100, which includes cover plates 1800, 1900 filling each position on an exterior of the concave 1100.

As shown in FIGS. 98-102, the hinge points 1804, 1904 are inserted through the cross frame apertures 1116 on the cross frame 1114. Once inserted through, loops on the over-center latch assemblies 1810, 1910 interface with the hooks 1118 and are latched down onto the hooks 1118. Tension between the hooks 1118 and over-center latch assemblies 1810, 1910 in addition to tension against the cross frame 114 from the hinge points 1804, 1904 maintain or support the cover plates 1800, 1900 against the exterior of the concave 1100 without falling off. Additional support can be added by inserting a lock through the alignment apertures 1120 which align with the alignment apertures 1808, 1908 though this is not required.

Figure 100:
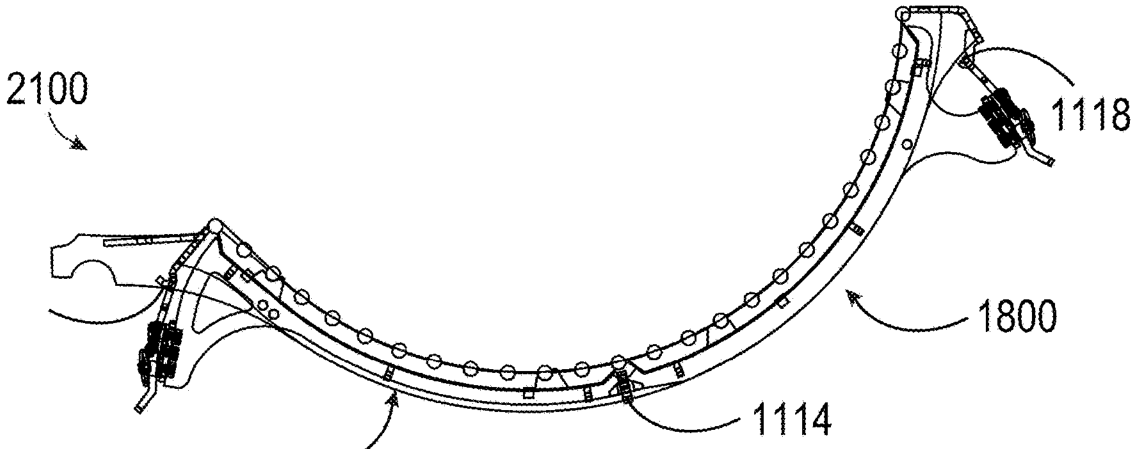
FIG. 100 shows a front elevation view of the second operational, cover plate assembly of FIG. 98.
Figure 101:
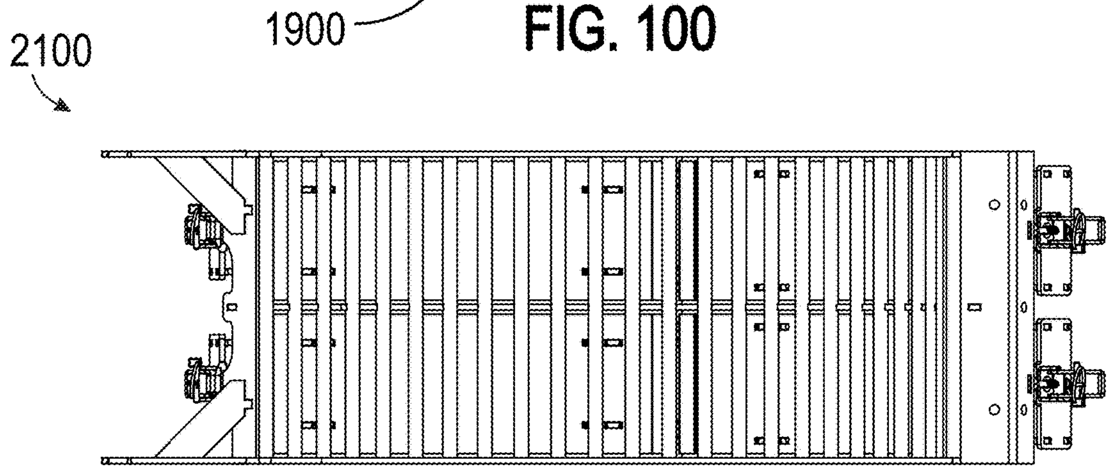
FIG. 101 shows a top plan view of the second operational, cover plate assembly of FIG. 98.
Figure 102:
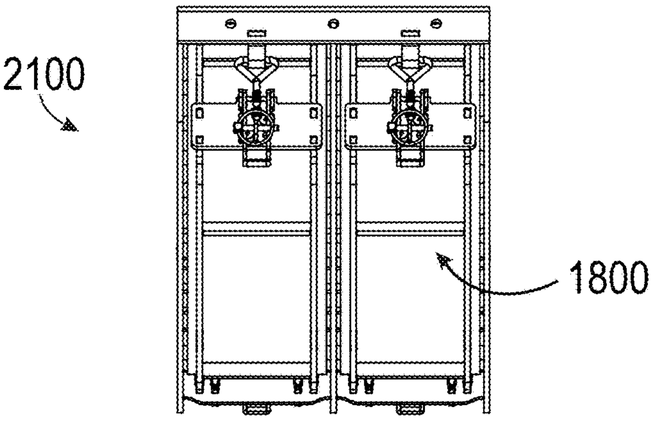
FIG. 102 shows a right-side elevation view of the second operational, cover plate assembly of FIG. 98.

As shown in the figures and can be most readily seen in FIG. 100, the back plate 1812, 1912 is not in direct contact with the rub bars 1112. As such, this make for room in which MOG can accumulate in between gaps between the rub bars 1112 and the back plate 1812, 1912. This makes for additional points of contact and pinch points for incoming MOG and grain passing through the threshing chamber 56.

The cover plate 1800, 1900 as shown in FIGS. 88-97 are readily installed by the farmer or technician without requiring the assistance of a second person and are easily and quickly removed once installed. This functions to enhance the flexibility provided to the farmer who may make adjustments as to how many and where cover plates 1800, 1900 are positioned within the threshing section of the rotor chamber.

The cover plate 1800, 1900 is primarily used to prevent MOG and grain from falling through the concave 1100. The cover plates 1800, 1900 retain plant material to fill the large openings and create a mattress-type surface. The matte of plant material provides a gentle & natural rubbing action against each other as they travel over the horizontal grain separation bars while retaining the material in chamber for enough time to complete even the tough or green pods. The cover plates 1800, 1900 also allow the operator to run the bottom sieve further open, pushing more air through the top sieve, reducing pod material in the tank. The use of natural plant materials reduces the chances of the rotor splitting soybeans over the longer duration in the chamber.

Use of the cover plates 1800, 1900 allows for a more complete thresh, reduces tailings, and creates a cleaner grain sample.

Figure 103:
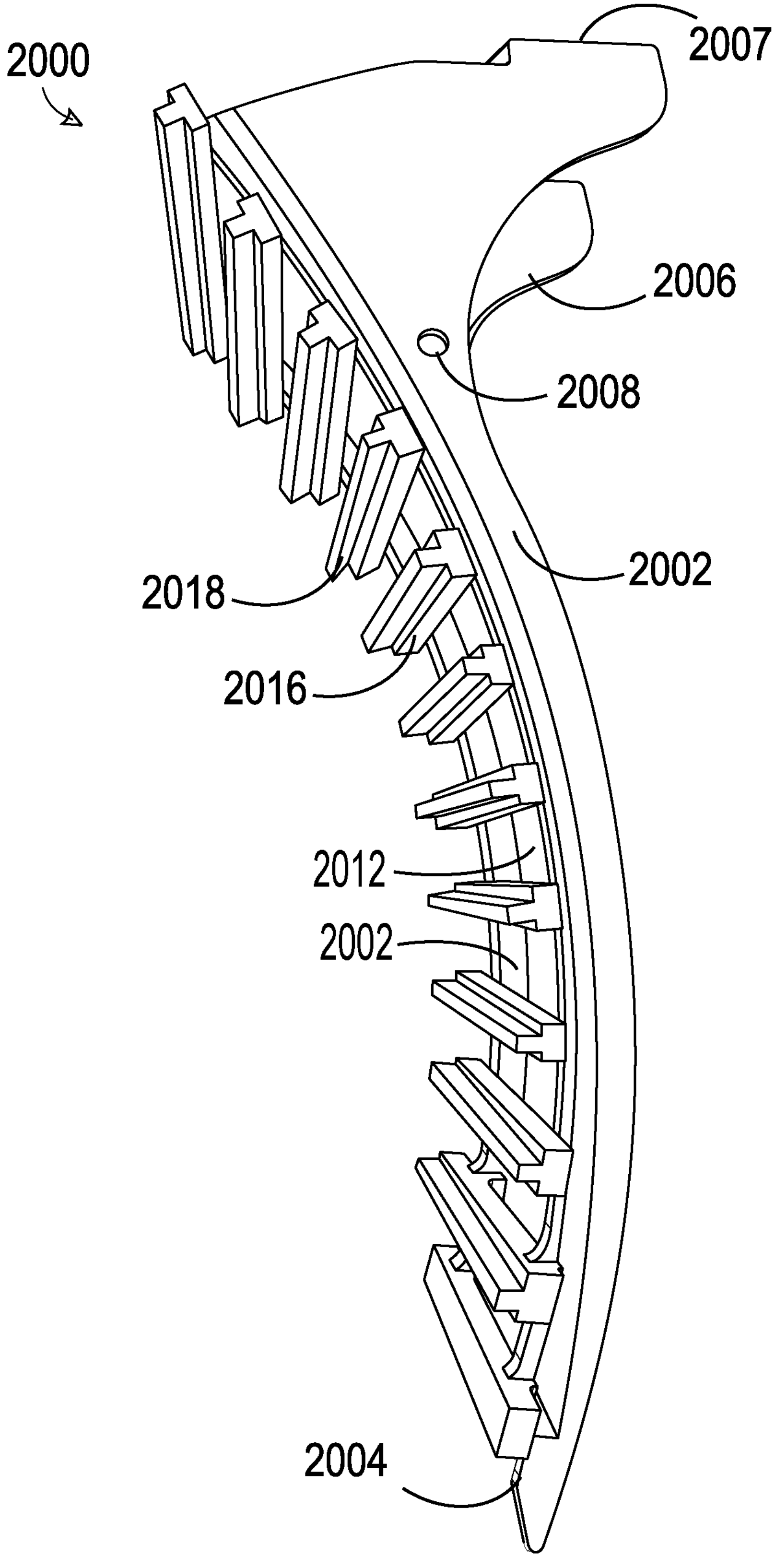
FIG. 103 shows a front perspective view of a disruptor with MOG limiting inserts that have a staircase-shaped leading edge which abrades grain, further disrupting flow with a rippled effect.
Figure 104:
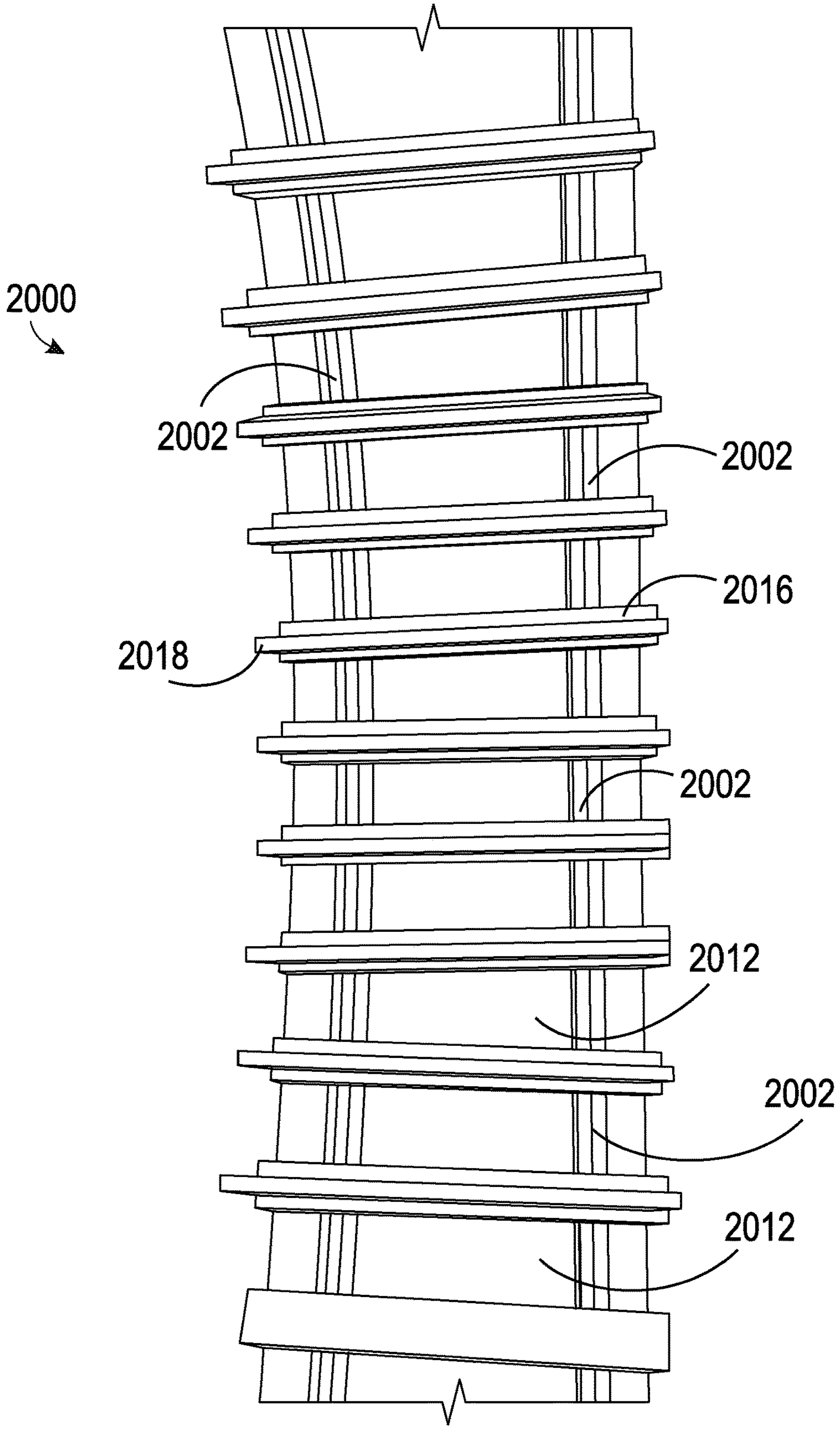
FIG. 104 shows a top perspective view of the disruptor of FIG. 103.
Figure 105:
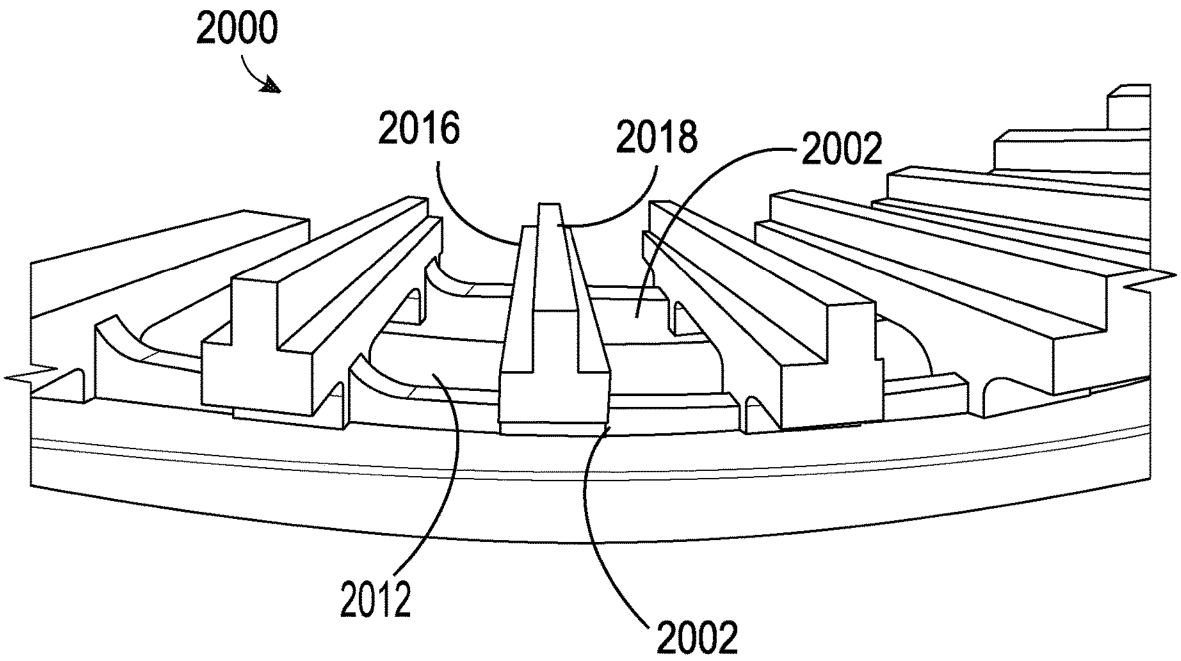
FIG. 105 shows a detailed, elevation view of the disruptor of FIG. 103, which emphasizes view of a staircase-shaped leading edge which abrades grain and the welds that support said a staircase-shaped leading edge.

FIGS. 103-105 show a disruptor 2000. The disruptor 2000 includes rails 2002, hinge points 2004, extended mounting portions 2006 transitioning into flat surfaces 2007, alignment apertures 2008, an over-center latch assembly (not shown), a back plate 2012, ridges 2016, and ridge extensions 2018.

The rails 2002 are curvilinear and are intended follow a same shape or be contoured to a shape that the concave 100, 1100 forms so as to be form fitted to an exterior surface of the concave 100, 1100 when attached thereto. The disruptor 2000 includes at least two rails 2002 which are parallel to one another. The rails 2002 include at their ends the hinge points 2004 and the extended mounting portions 2006, wherein the hinge points 2004 are at ends opposite the extended mounting portions 2006 the hinge points 2004 comprise distal ends of the rails 2002, whereas the extended mounting portions 2006 need not extend from the rails 2002 at the distal ends opposite the hinge points 2004 but can extend from the rails 2002 substantially near the distal ends opposite the hinge points 2004. The hinge points 2004 comprise substantially pointed or rounded ends such that the rails 2002 begin tapering to form the hinge points 2004. Furthermore, the alignment apertures 2008 can be positioned anywhere along the rails 2002 and extend through the rails 2002 so as to align with the alignment apertures 120, 1120 on the concave 100, 1100.

The extended mounting portions 2006 extend outwardly away from the rails 2002 as a part of each of the two rails on the disruptor 2000, and transition into flat surfaces 2007 to which the over-center latch assembly can attach to. Each of the flat surfaces 2007 can form a common plane with one another such that it eases attachment of the over-center latch thereto. The extended mounting portions 2006 can be any shape that accomplish this extension transition such as rectangular, triangular, rhombus, stadium, oval, wavy combinations of any of these, lattice or truss structures with apertures extending therethrough, etc. The over-center latch assembly can attach downwardly (facing the flat surfaces at distal ends of the extended mounting portions 2006) or upwardly (facing away from the flat surfaces at distal ends of the extended mounting portions 2006), depending on a preference of the user or operator as to how a loop of the over-center latch attaches to the hooks 118, 1118 of the concave 100, 1100 in addition to which direction the over-center latch will be accessible from.

The disruptor 2000 further includes the back plate 2012 attached beneath the rails 2002. The back plate 2012 comprises a solid sheet of material that follows contours of the rails 2002. As such, the back plate 2012 is curvilinear in shape. A width of the back plate 2012 is equal to a distance between each of the rails 2002.

The disruptor 2000 further comprises the ridges 2016 positioned on a top of the rails 2002. The ridges of all disruptors in this disclosure can have a rectangular cross section. As opposed to the disruptors 200, 300, 1200, 1300 which have the back plate 212, 312, 1212, 1312 on top of the rails 202, 302, 1202, 1302, the back plate 2012 is positioned on a bottom of the rails 2002 in the disruptor 2000 shown in FIGS. 103-105. As shown in FIG. 104, the ridges 2016 span substantially a width of exterior surfaces of the rails 2002. The ridges 2016 extend away directly from the rails 2002 inwardly (with respect to a direction of curvature of the rails 2002). The ridges 2016 are intended to extend in between the rub bars 112, 1112 of the concave 100, 1100. As such, the ridges 2016 can be spaced such that a single ridge 2016 can extend between each of a gap between rub bars 112, 1112 on the concave 100, 1100. The ridges 2016 can be secured to the rails 2002 via weld.

The ridges 2016 can be additionally held in place via the ridge stabilizers. The ridge stabilizers comprise studs or teeth protruding from the rails 2002 to grasp the ridges 2016. The ridge stabilizers can be any suitable shape to accomplish this, so long as the shape includes direct physical contact with the ridges 2016 and direct physical contact with the rails 2002. The ridge stabilizers 2018 can comprise partial frustum shapes including angled portions extending away from the back plate 2012 with substantially flat tops in which a portion of the partial frustum shape is not angled but is flush with an outer surface of the ridges 2016. These outer surfaces of the ridges 2016 extend substantially orthogonally away from the back plate 2012, whereas the ridge stabilizers 2018 comprise thicker base portions in contact with back plate 2012 and thinner distal portions away from the back plate 2012 thus increasing stabilizing capacity of holding the ridges 2016 with diagonal geometry much like trusses on a bridge while also slightly reducing weight of the disruptor 2000 by refraining from including ridge stabilizers 2018 that are a uniform thickness or ridge stabilizers 2018 that span a same height or width as the ridges 2016.

Notches can be placed anywhere along the rails 2002 to position where the ridges 2016 extend through the concave 100, 1100. Notches can be made on the face side of each rail 2002 which conform to the rounded geometry of the rub bars 112, 1112 on the concave 100, 1100, and function to position the notched surface firmly against the underside of the concave 100, 1100 rub bar 112, 1112 depending on where the rounded notches are positioned. For example, if the notches for interfacing with the rub bars 112, 1112 are positioned an equal distance between the ridges 2016, then smaller gaps exist between each of the ridges 2016 and the rub bars 112, 1112 (when positioned on an exterior surface of the concave 100, 1100) in addition to having twice as many gaps between ridges 2016 and rub bars 112, 1112 in comparison to having the notches being placed directly adjacent one side of the ridges 2016 in which case a the rub bars 112, 1112 would rest directly adjacent the ridges 2016 and would abut the ridges 2016 which would result in fewer but larger gaps in between the ridges 2016 and rub bars 112, 1112.

The disruptor 2000 not only retains MOG and grain with the back plate 2012 by closing off gaps past the rub bars 112, 1112 thus preventing MOG and grain from falling past the concave 100, 1100, but the ridges 2016 extend upward through the rub bars 112, 1112 creating additional points of contact and pinch points for the MOG and grain to contact thus abrading the MOG and grain entering the threshing chamber 56 at a higher rate than MOG and grain flowing past the concave 100, 1100 (via the rotor) without any disruptors 2000 attached thereto. This does so by decreasing an amount of space or volume between the rotor and the concave 100, 1100 within the threshing chamber 56 by having the ridges 2016 extend upward and inward through the rub bars 112, 1112 towards the rotor (filling gaps and extending higher than the rub bars 112, 1112) in combination with retaining MOG and grain with the back plates 2012 rather than allowing MOG and/or grain to slip through gaps between the rub bars 112, 1112 and fall beneath the concave 100, 1100. As such, MOG and grain is abraded at a higher rate thus feeding more volume per unit time through the threshing chamber 56 which can lead to higher throughput or more acres per hour in addition to better fuel efficiency per unit crop sent through the combine harvester 50 due to higher efficiency or operating closer to capacity (optimizing) regarding how much volume is processed through the threshing chamber 56.

Being abraded at a higher rate and making flow of the MOG and grain more turbulent by adding the additional points of contact and pinch points is additionally useful and beneficial when the disruptors 2000 are placed on the concave 100, 1100 at the #1 spot in the threshing chamber (or a very first concave which crops encounter in the threshing chamber 56) due to the additional points of contact and pinch points which increases an amount of separation between MOG and grain thus more quickly separating the grain from the MOG to be released through gaps in concaves 100, 1100 at later positions (e.g., positions #2-#7 in the threshing chamber 56). The amount of disruptors 2000 placed on concaves 100, 1100 as inserts as opposed to not including any inserts (or in the alternative additionally including inserts such as MOG limiters and/or cover plates as described herein) will vary to achieve an optimum flow rate and rate of separation between MOG and grain (too high of a rate of separation can result in grain damage whereas too low a rate of separation can result in lost grain-still being attached to the MOG when discarded-thus each resulting in lower yield). The variation will depend on a size of the grain on the crops being sent through the threshing chamber 56. Larger grains with fewer grains on the crop can benefit from a lower rate of abrasion and separation whereas smaller grains with many on the crop can benefit from a higher rate of abrasion and separation.

In addition to having additional points of contact with the ridges 2016, the disruptor 2000 includes even more points of contact and pinch points by additionally including the ridge extensions 2018. Not only do the ridge extensions 2018 further reduce an amount of space between the rotor and the concave thus increasing rate of abrasion even further, but the additional points of contact also create even more turbulence in flow of the MOG and grain through the threshing chamber 56. Thus, the disruptor 2000 provides an additional variation on optimizing rate of abrasion for optimal flow rate of MOG and grain through the threshing chamber in addition to the disruptors 200, 300, 1200, 1300.

Furthermore, given that the rails 2002 extend from a top of the back plate 2012 rather than being under the back plate 2012, this allows for additional space for MOG to be held in the concave 100, 1100 while threshing if so desired. This allows for retention of plant material to fill the large openings and create a mattress-type surface in between the numerous points of contact created by the rub bars 112, 1112 and the ridges 2016 and the ridge extensions 2018. The matte of plant material provides a gentle & natural rubbing action against each other as they travel over the horizontal grain separation bars while retaining the material in chamber for enough time to complete even the tough or green pods. Thus, the disruptor 2000 (in addition to the disruptors 200, 300, 1200, 1300) also allow the operator to run the bottom sieve further open, pushing more air through the top sieve, reducing pod material in the tank. The use of natural plant materials reduces the chances of the rotor splitting grains over the longer duration in the chamber. Thus, use of the disruptors allows for a more complete thresh, reduces tailings, and creates a cleaner grain sample.

The disruptor 2000 as shown in FIGS. 103-105 is readily installed by the farmer or technician without requiring the assistance of a second person and are easily and quickly removed once installed. This functions to enhance the flexibility provided to the farmer who may make adjustments as to how many and where disruptors 2000 are positioned within the threshing section of the rotor chamber.

Figure 106:
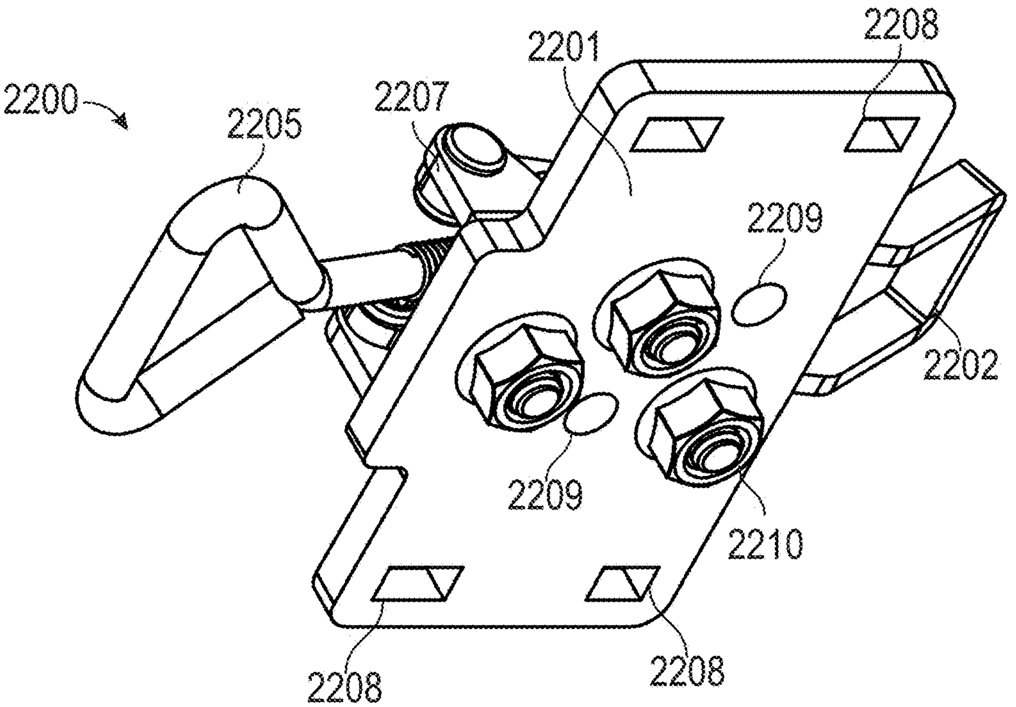
FIG. 106 shows a perspective view of an over-center latch assembly.
Figure 107:
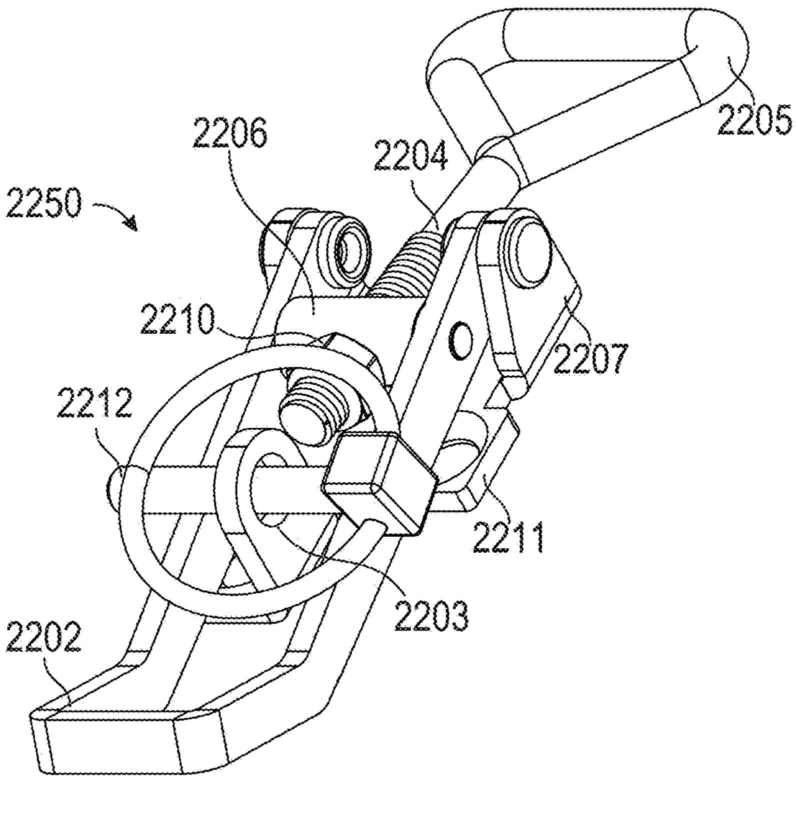
FIG. 107 shows a perspective view of an over-center latch.

FIGS. 106-107 show the an over-center latch assembly 2200 with an over-center latch 2250. The over-center latch assembly 2200 includes a base plate 2201, a handle 2202, a lock hole 2203, a lever 2204, a loop 2205, a center pin 2206, ears 2207, a slot 2208, holes 2209, nylon threaded locknuts 2210, a subbase 2211, and a locking mechanism 2212.

To assemble the over-center latch assembly 2200, the base plate 2201 acts as a base to which the subbase 2211 may attach to via the holes 2209. The holes 2209 may be threaded so as to receive screws, threaded rods, etc. to insert into the subbase 2211. Additionally, the base plate 2201 may be attached to the subbase 2211 via weld such as via plug weld through the holes 2209 to fasten to the subbase 2211. Alternatively, the subbase 2211 may be entirely removed such that components of the over-center latch assembly 2200 extend from the base plate 2201 itself.

The subbase 2211 includes ears 2207 that extend therefrom for attaching to the handle 2202. Additionally, the subbase 2211 includes the lock hole 2203 extending away from the subbase 2211 in generally a same direction as the ears 2207. The ears 2207 and the locking hole 2203 are configured to extend from the subbase 2211 in such a way that the handle 2202 may pivotably attach at two or more of the ears 2207 acting as a fulcrum for the handle 2202 and wherein the locking hole 2203 extends past the handle when a distal end of the handle is positioned nearest the base plate 2201 so as to be capable of receiving the locking mechanism 1412 through the locking hole 2203 in such a way that it retains the distal end of the handle 2202 adjacent the base plate 2201 (note that the over-latch assembly 2200 may also include the locking mechanism 1412 even though one is not shown in the figures). As mentioned above, the subbase 2211 may be removed in its entirety, in which case the ears 2207 and the locking hole 2203 would extend directly from the base plate 2201.

As mentioned above, the handle 2202 connects at its base to the ears 2207 and as such forms a pivotable connection at the ears 2207. A connection joint can be seen in FIGS. 106-107 in which a fastener extends through both the ears 1407 and the handle 1402 which can especially be seen in FIG. 107. Moreover, the handle 2202 includes an angled distal end to assist with unlocking the over-center latch assembly 2200 when grabbing the distal end of the handle 2202.

The handle 2202 includes a connection section for the center pin 2206 to attach to. The connection section is positioned on the handle 2202 at a point between the fulcrum of the handle 2202 (connecting to the ears 2207) and the distal end of the handle 2202. The center pin 2206 is secured at the connection section so as to be in rotational communication with the handle 2202 to act as a fulcrum for the lever 2204 and loop 2205. A base portion of the lever 2204 may extend through the center pin 2206 (be fixedly attached via weld, press-fit, etc., or be adjustably attached via threaded connection), wherein the lever 2204 extends from the center pin 2206 to include the loop 2205 at a distal end of the lever 2204. As described herein, the loop 2205 when assembled together with the concave 100, 1100 will connect to the hooks 118, 1118, wherein the handle 2202 can be lifted away from the base plate 2201 to loosen a connection between the loop 2205 and the hooks 118, 1118, or the handle 2202 can be rotated towards the base plate 2201 so as to tighten a connection and/or lock the over-center latch assembly 2200 to the hooks 118, 1118.

Should the over-center latch assembly 2200 include a threaded connection on the lever 2204 as shown, the over-center latch assembly 2200 can include a locking nut with a nylon insert 1410 so as to increase a holding capacity of the locking nut to stay in place and not loosen or tighten due to vibrations of the combine when in use.

Further, the over-center latch assembly 2200 can include the locking mechanism 2212 which as shown is a linchpin. The linchpin is a strong holding mechanism which is given by way of example and not of limitation. Other such examples given by way of example and not of limitation include a padlock, a hairpin, a hitch pin, a spring clip, a snap ring, a wing nut assembly, etc.

Furthermore, a preferred method of attaching the over-center latch assemblies 2200 to the flat surface 2007 of the extended mounting portions 206, 306, 506, 606, 806, 906, 1206, 1306, 1506, 1606, 1806, 1906 is via plug weld in the slots 2208.

From the foregoing, it can be seen that the present disclosure accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 8

| List of Reference Characters | |
|---|---|
| 50 | combine harvester |
| 52 | header |
| 54 | conveyer |
| 56 | threshing chamber |
| 58 | cleaning system |
| 60 | cab |
| 100 | concave |

TABLE 8-continued

| List of Reference Characters | |
|---|---|
| 102 | upper concave connecter |
| 103 | first side |
| 104 | lower concave connector |
| 105 | second side |
| 106 | first side frame |
| 108 | second side frame |
| 110 | center frame |
| 112 | rub bars |
| 114 | cross frame |
| 116 | cross frame apertures |
| 118 | hooks |
| 120 | alignment apertures |
| 200 | disruptor |
| 202 | rails |
| 204 | hinge points |
| 206 | extended mounting portions |
| 208 | alignment apertures |
| 210 | over-center latch assembly |
| 212 | back plate |
| 214 | back plate ramps |
| 216 | ridges |
| 218 | ridge stabilizers |
| 220 | rub bar contacts |
| 222 | cross supports |
| 300 | disruptor |
| 302 | rails |
| 304 | hinge points |
| 306 | extended mounting portions |
| 308 | alignment apertures |
| 310 | over-center latch assembly |
| 312 | back plate |
| 314 | back plate ramps |
| 316 | ridges |
| 318 | ridge stabilizers |
| 320 | rub bar contacts |
| 322 | cross supports |
| 400 | concave assembly |
| 500 | MOG limiter |
| 502 | rails |
| 504 | hinge points |
| 506 | extended mounting portions |
| 508 | alignment apertures |
| 510 | over-center latch assembly |
| 512 | cross bars |
| 600 | MOG limiter |
| 602 | rails |
| 604 | hinge points |
| 606 | extended mounting portions |
| 608 | alignment apertures |
| 610 | over-center latch assembly |
| 612 | cross bars |
| 700 | concave assembly |
| 800 | cover plate |
| 802 | rails |
| 804 | hinge points |
| 806 | extended mounting portions |
| 808 | alignment apertures |
| 810 | over-center latch assembly |
| 812 | back plate |
| 814 | back plate ramps |
| 816 | rub bar contacts |
| 818 | cross supports |
| 900 | cover plate |
| 902 | rails |
| 904 | hinge points |
| 906 | extended mounting portions |
| 908 | alignment apertures |
| 910 | over-center latch assembly |
| 912 | back plate |
| 914 | back plate ramps |
| 916 | rub bar contacts |
| 918 | cross supports |
| 1000 | concave assembly |
| 1100 | concave |
| 1102 | upper concave connecter |
| 1103 | first side |
| 1104 | lower concave connector |
| 1105 | second side |

TABLE 8-continued

| List of Reference Characters | |
|---|---|
| 1106 | first side frame |
| 1108 | second side frame |
| 1110 | center frame |
| 1112 | rub bars |
| 1114 | cross frame |
| 1116 | cross frame apertures |
| 1118 | hooks |
| 1120 | alignment apertures |
| 1200 | disruptor |
| 1202 | rails |
| 1204 | hinge points |
| 1206 | extended mounting portions |
| 1208 | alignment apertures |
| 1210 | over-center latch assembly |
| 1212 | back plate |
| 1214 | back plate ramps |
| 1216 | ridges |
| 1218 | ridge stabilizers |
| 1220 | rub bar contacts |
| 1222 | cross supports |
| 1300 | disruptor |
| 1302 | rails |
| 1304 | hinge points |
| 1306 | extended mounting portions |
| 1308 | alignment apertures |
| 1310 | over-center latch assembly |
| 1312 | back plate |
| 1314 | back plate ramps |
| 1316 | ridges |
| 1318 | ridge stabilizers |
| 1320 | rub bar contacts |
| 1322 | cross supports |
| 1400 | concave assembly |
| 1500 | MOG limiter |
| 1502 | rails |
| 1504 | hinge points |
| 1506 | extended mounting portions |
| 1508 | alignment apertures |
| 1510 | over-center latch assembly |
| 1512 | cross bars |
| 1600 | MOG limiter |
| 1602 | rails |
| 1604 | hinge points |
| 1606 | extended mounting portions |
| 1608 | alignment apertures |
| 1610 | over-center latch assembly |
| 1612 | cross bars |
| 1700 | concave assembly |
| 1800 | cover plate |
| 1802 | rails |
| 1804 | hinge points |
| 1806 | extended mounting portions |
| 1808 | alignment apertures |
| 1810 | over-center latch assembly |
| 1812 | back plate |
| 1814 | back plate ramps |
| 1816 | rub bar contacts |
| 1818 | cross supports |
| 1900 | cover plate |
| 1902 | rails |
| 1904 | hinge points |
| 1906 | extended mounting portions |
| 1908 | alignment apertures |
| 1910 | over-center latch assembly |
| 1912 | back plate |
| 1914 | back plate ramps |
| 1916 | rub bar contacts |
| 1918 | cross supports |
| 2000 | disruptor |
| 2002 | rails |
| 2004 | hinge points |
| 2006 | extended mounting portions |
| 2007 | flat surfaces |
| 2008 | alignment apertures |
| 2012 | back plate |
| 2016 | ridges |
| 2018 | ridge extensions |
| 2100 | concave assembly |

TABLE 8-continued

| List of Reference Characters | |
|---|---|
| 2200 | over-center latch assembly |
| 2201 | base plate |
| 2202 | handle |
| 2203 | lock hole |
| 2204 | lever |
| 2205 | loop |
| 2206 | center pin |
| 2207 | ears |
| 2208 | slot |
| 2209 | holes |
| 2210 | nylon threaded locknuts |
| 2211 | subbase |
| 2212 | locking mechanism |
| 2250 | over-center latch |

Glossary

Unless defined otherwise, all technical and scientific terms used above have the same meaning as commonly understood by one of ordinary skill in the art to which embodiments of the present disclosure pertain.

The terms “a,” “an,” and “the” include both singular and plural referents.

The term “or” is synonymous with “and/or” and means any one member or combination of members of a particular list.

As used herein, the term “exemplary” refers to an example, an instance, or an illustration, and does not indicate a most preferred embodiment unless otherwise stated.

The term “about” as used herein refers to slight variations in numerical quantities with respect to any quantifiable variable. Inadvertent error can occur, for example, through use of typical measuring techniques or equipment or from differences in the manufacture, source, or purity of components.

The term “substantially” refers to a great or significant extent. “Substantially” can thus refer to a plurality, majority, and/or a supermajority of said quantifiable variables, given proper context.

The term “generally” encompasses both of the terms “about” and “substantially.”

The term “configured” describes structure capable of performing a task or adopting a particular configuration. The term “configured” can be used interchangeably with other similar phrases, such as constructed, arranged, adapted, manufactured, and the like.

The term “continuous” means without spaces or gaps.

Terms characterizing sequential order (e.g., first, second, third), a position, and/or an orientation are not limiting and are only referenced according to the views presented.

When an element is referred to as being “connected,” “coupled,” “mated,” “attached,” “fixed,” etc. to another element, the element can be directly connected to the other element, or intervening elements may be present. In contrast, when an element is referred to as being “directly connected,” “directly coupled,” etc. to another element, there are no intervening elements present. Other words used to describe the relationship between elements should be interpreted in a like fashion (e.g., “between” versus “directly between,” “adjacent” versus “directly adjacent,” etc.). Similarly, terms such as (i) “communicatively connected” or (ii) “fluidly connected” include (i) all variations of information exchange and routing between two electronic devices, including intermediary devices, networks, etc., connected wirelessly or not and (ii) all variations of fluid exchange and routing between two fluidic bodies, including intermediary fluid paths, flows, etc., connected indirectly or not.

The “invention” is not intended to refer to any single embodiment of the particular invention but encompass all possible embodiments as described in the specification and the claims. The “scope” of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A disruptor for a concave in a combine harvester, comprising:

rails that are parallel to one another and curvilinear in shape such that the rails have a complementary geometry to a shape of the concave;

a back plate attached atop the rails comprising a continuous material extending between the rails;

ridges positioned on the back plate extending away from the back plate in a direction opposite the rails, wherein the ridges span a width of the back plate and are spaced equally apart from one another along a length of the back plate;

ridge stabilizers extending from the back plate to the ridges, wherein each ridge includes two ridge stabilizers on a first side of each of the ridges; and rub bar contacts positioned on the back plate and adjacent at least one ridge on a second side of the at least one ridge and shaped as a concave configured to interface with rub bars on the concave;

wherein the ridge stabilizers are wider at a base of the ridge stabilizers than at distal ends thereof.

2. A concave assembly comprising;

a concave;

a left disruptor configured to attach to a left side of the concave and including:

rails that are parallel to one another and curvilinear in shape such that the rails have a complementary geometry to a shape of the concave, a back plate attached atop the rails comprising a continuous material extending between the rails, and ridges positioned on the back plate extending away from the back plate in a direction opposite the rails, wherein the ridges span a width of the back plate and are spaced equally apart from one another along a length of the back plate; and a right disruptor configured to attach to a right side of the concave and including:

rails that are parallel to one another and curvilinear in shape such that the rails have a complementary geometry to a shape of the concave, a back plate attached atop the rails comprising a continuous material extending between the rails, and ridges positioned on the back plate extending away from the back plate in a direction opposite the rails, wherein the ridges span a width of the back plate and are spaced equally apart from one another along a length of the back plate;

wherein the ridges are configured to be inserted in between rub bars of the concave when attached to the concave such that the ridges extend past the rub bars.

3. The concave assembly of claim 2, wherein the concave comprises a cross frame and hooks at distal ends of the concave for attaching to the left and right disruptors.

4. The concave assembly of claim 3, wherein the rub bars abut the ridges forming a stair-like relationship between the rub bars and ridges.

5. A disruptor comprising:

a back plate comprising a curvilinear shape complementary to a shape of a concave of a combine harvester;

rails extending upwardly from lateral ends of the back plate;

ridges traversing a gap between the rails and extending upwardly from the rails; and ridge extensions comprising staircase-shaped leading edges atop the ridges.

6. A kit for a combine harvester, comprising:

a concave comprising an upper concave connector, a lower concave connector, a first side frame, a second side frame, and rub bars equally spaced throughout the concave extending from the first side frame to the second side frame and bounded by each of the upper concave connector, the lower concave connector, the first side frame, and the second side frame;

wherein the concave further comprises a center frame extending from the upper concave connector to the lower concave connector in between the first side frame and the second side frame;

a disruptor comprising:

rails attached to a back plate comprising a curvilinear shape configured to be fitted to the concave, wherein a width of the back plate extends from the first side frame to the center frame;

ridges attached to the back plate and extending upwardly from the back plate each comprising a rectangular cross-section and configured to extend upwardly through the rub bars of the concave; and a MOG limiter comprising:

rails comprising a curvilinear shape configured to be fitted to the concave; and cross bars extending between the rails, each parallel to one another and configured to extend upwardly through the rub bars of the concave.

* * * * *